(12) United States Patent
Weil et al.

(10) Patent No.: US 11,912,608 B2
(45) Date of Patent: Feb. 27, 2024

(54) GLASS MANUFACTURING

(71) Applicant: Owens-Brockway Glass Container Inc., Perrysburg, OH (US)

(72) Inventors: Scott Weil, Maumee, OH (US); Randy Ernsthausen, Perrysburg, OH (US); Thomas G. Green, Sylvania, OH (US); Shane T. Rashley, Bowling Green, OH (US); Phillip J. Rausch, Napoleon, OH (US); Roger P. Smith, Perrysburg, OH (US); Zhongming Wang, Ypsilanti, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 547 days.

(21) Appl. No.: 17/061,302

(22) Filed: Oct. 1, 2020

(65) Prior Publication Data

US 2022/0388884 A1 Dec. 8, 2022

Related U.S. Application Data

(63) Continuation-in-part of application No. 17/039,734, filed on Sep. 30, 2020, which is a continuation-in-part
(Continued)

(51) Int. Cl.
*C03B 5/225* (2006.01)
*C03B 5/235* (2006.01)
(Continued)

(52) U.S. Cl.
CPC ............ *C03B 5/225* (2013.01); *C03B 5/2353* (2013.01); *C03B 7/06* (2013.01); *C03B 21/02* (2013.01); *C03B 25/00* (2013.01)

(58) Field of Classification Search
None
See application file for complete search history.

(56) References Cited

U.S. PATENT DOCUMENTS

| | | | |
|---|---|---|---|
| 324,495 | A | 8/1885 | Walton et al. |
| 443,898 | A | 12/1890 | Colquhoun |
| | | (Continued) | |

FOREIGN PATENT DOCUMENTS

| | | | |
|---|---|---|---|
| CN | 2142840 U | 9/1993 | |
| CN | 204125342 U | 1/2015 | |
| | (Continued) | | |

OTHER PUBLICATIONS

PCT Invitation to Pay Additional Fees,PCT Int.Serial No. PCT/US2021/053259, Int. Filing Date: Oct. 1, 2021 Applicant: Owens-Brockway Glass Container Inc. dated May 19, 2022.
(Continued)

*Primary Examiner* — Jodi C Franklin

(57) ABSTRACT

According to an aspect of the disclosure, a glass manufacturing system includes a hot-end subsystem, including: a submerged combustion melter that melts feedstock to produce molten glass; a stiller that receives the molten glass from the submerged combustion melter and that includes a stilling tank to still the molten glass and that is configured to control outflow of the stilled molten glass to effectively decouple viscosity of the molten glass from the flow rate of the molten glass and thereby control finer molten glass levels; and a finer that is mechanically decoupled from the stiller, and that receives and fines the stilled molten glass to produce fined molten glass. Many other aspects of the system are also disclosed and claimed.

16 Claims, 25 Drawing Sheets

Related U.S. Application Data of application No. 17/039,713, filed on Sep. 30, 2020, and a continuation-in-part of application No. 16/993,825, filed on Aug. 14, 2020, and a continuation-in-part of application No. 16/788,609, filed on Feb. 12, 2020, and a continuation-in-part of application No. 16/788,631, filed on Feb. 12, 2020, now Pat. No. 11,680,005, and a continuation-in-part of application No. 16/788,635, filed on Feb. 12, 2020, now Pat. No. 11,667,555.

(60) Provisional application No. 63/085,640, filed on Sep. 30, 2020, provisional application No. 63/085,883, filed on Sep. 30, 2020, provisional application No. 63/085,646, filed on Sep. 30, 2020, provisional application No. 63/085,644, filed on Sep. 30, 2020.

(51) Int. Cl.
*C03B 21/02* (2006.01)
*C03B 7/06* (2006.01)
*C03B 25/00* (2006.01)

(56) References Cited

U.S. PATENT DOCUMENTS

| | | | |
|---|---|---|---|
| 1,143,317 | A | 6/1915 | Proeger |
| 1,378,460 | A | 5/1921 | Hopkinson |
| 1,451,707 | A | 4/1923 | Miller |
| 1,484,907 | A | 2/1924 | Schram |
| 1,552,497 | A | 9/1925 | Noble |
| 1,554,195 | A | 9/1925 | Bergman |
| 1,608,326 | A | 11/1926 | Lawson |
| 1,712,205 | A | 5/1929 | Good |
| 1,742,098 | A | 12/1929 | Rankin |
| 1,761,229 | A | 6/1930 | Pedersen |
| 1,834,631 | A | 12/1931 | Mulholland |
| 1,840,532 | A | 1/1932 | Rowe |
| 1,853,002 | A | 4/1932 | Howard |
| 1,853,003 | A | 4/1932 | Howard |
| 1,919,152 | A | 5/1933 | Peiler |
| 2,001,766 | A | 5/1935 | Brown |
| 2,010,334 | A | 8/1935 | Stewart |
| 2,275,155 | A | 3/1942 | Mongan, Jr. |
| 2,354,807 | A | 8/1944 | Fox et al. |
| 2,479,805 | A | 8/1949 | Batchell |
| 2,484,925 | A | 10/1949 | Baker et al. |
| 2,569,779 | A | 10/1951 | Porter |
| 2,773,111 | A | 12/1956 | Arbeit et al. |
| 2,808,446 | A | 10/1957 | Lambert |
| 2,836,934 | A | 6/1958 | McLaughlin |
| 2,955,948 | A | 10/1960 | Silverman |
| 2,982,522 | A | 5/1961 | Hamilton et al. |
| 3,030,736 | A | 4/1962 | Penberthy |
| 3,248,205 | A * | 4/1966 | Marceau ............... C03B 5/2356 65/121 |
| 3,260,587 | A * | 7/1966 | Marceau .................. C03B 5/20 65/346 |
| 3,442,633 | A | 5/1969 | Perry |
| 3,486,882 | A | 12/1969 | Raguin et al. |
| 3,511,629 | A | 5/1970 | Bauer et al. |
| 3,563,683 | A | 2/1971 | Hess |
| 3,580,714 | A | 5/1971 | Lucek |
| 3,580,976 | A | 5/1971 | Buss |
| 3,592,623 | A | 7/1971 | Shepherd |
| 3,607,195 | A | 9/1971 | Horio et al. |
| 3,659,029 | A | 4/1972 | de Bussy |
| 3,697,000 | A | 10/1972 | Giberson, Jr. |
| 3,725,022 | A | 2/1973 | Mills |
| 3,732,086 | A | 5/1973 | Heyne |
| 3,738,792 | A | 6/1973 | Feng |
| 3,754,885 | A | 8/1973 | Bowman |
| 3,764,287 | A | 10/1973 | Brocious |
| 3,833,354 | A | 9/1974 | Thummler et al. |
| 3,967,943 | A | 7/1976 | Seeley |
| 3,983,309 | A | 9/1976 | Faulkner et al. |
| 4,047,918 | A | 9/1977 | Heithoff |
| 4,061,487 | A | 12/1977 | Kiyonaga |
| 4,115,089 | A | 9/1978 | Metz et al. |
| 4,125,352 | A | 11/1978 | Gellert |
| 4,103,391 | A | 12/1978 | Boggum et al. |
| 4,197,109 | A | 4/1980 | Frazier et al. |
| 4,208,201 | A | 6/1980 | Rueck |
| 4,225,443 | A | 9/1980 | Harris et al. |
| 4,226,564 | A | 10/1980 | Takahashi et al. |
| RE30,674 | E | 7/1981 | Wenda et al. |
| 4,277,277 | A | 7/1981 | Propster |
| 4,282,020 | A | 8/1981 | Wheaton |
| 4,298,374 | A | 11/1981 | Savolskis et al. |
| 4,312,655 | A | 1/1982 | Pack |
| 4,313,722 | A | 2/1982 | Yigdall |
| 4,313,747 | A | 2/1982 | Barton |
| 4,318,872 | A | 3/1982 | Romano |
| 4,350,512 | A | 9/1982 | Krumwiede |
| 4,351,054 | A | 9/1982 | Olds |
| 4,351,252 | A | 9/1982 | Shindome et al. |
| 4,374,645 | A | 2/1983 | Monteyne |
| 4,539,034 | A | 9/1985 | Hanneken |
| 4,545,800 | A | 10/1985 | Won et al. |
| 4,549,893 | A | 10/1985 | Hindman et al. |
| 4,553,998 | A | 11/1985 | Jones |
| 4,557,743 | A | 12/1985 | Claes et al. |
| 4,571,149 | A | 2/1986 | Soroka et al. |
| 4,592,770 | A | 6/1986 | Pearman et al. |
| 4,632,687 | A | 12/1986 | Kunkle et al. |
| 4,704,153 | A | 11/1987 | Schwenninger et al. |
| 4,762,544 | A | 8/1988 | Davey |
| 4,780,121 | A | 10/1988 | Matesa |
| 4,780,122 | A | 10/1988 | Schwenninger et al. |
| 4,830,651 | A | 5/1989 | Smith |
| 4,877,449 | A | 10/1989 | Khinkis |
| 4,882,736 | A | 11/1989 | Pieper |
| 4,890,241 | A | 12/1989 | Hoffman et al. |
| 4,900,333 | A | 2/1990 | Bos |
| 4,921,521 | A | 5/1990 | Kremenets |
| 4,953,752 | A | 9/1990 | Tousignant et al. |
| 4,986,844 | A | 1/1991 | Fenton |
| 5,030,594 | A | 7/1991 | Heithoff |
| 5,032,163 | A | 7/1991 | Balestra |
| 5,037,246 | A | 8/1991 | Okano et al. |
| 5,057,133 | A | 10/1991 | Chen et al. |
| 5,069,704 | A | 12/1991 | Boutier et al. |
| 5,071,340 | A | 12/1991 | LaBianca |
| 5,073,183 | A | 12/1991 | Hammond et al. |
| 5,116,399 | A | 5/1992 | Lauwers |
| 5,301,620 | A | 4/1994 | Nagel et al. |
| 5,413,154 | A | 5/1995 | Hurst, Jr. et al. |
| 5,415,323 | A | 6/1995 | Fenelon |
| 5,426,663 | A | 6/1995 | Lythgoe |
| 5,447,547 | A | 9/1995 | Goldfarb et al. |
| 5,579,705 | A | 12/1996 | Suzuki et al. |
| 5,588,978 | A | 12/1996 | Argent et al. |
| 5,630,369 | A | 5/1997 | Edlinger |
| 5,620,491 | A | 8/1997 | Puhl et al. |
| 5,706,851 | A | 1/1998 | Lopez-Gomez et al. |
| 5,718,737 | A | 2/1998 | Mosch |
| 5,765,489 | A | 6/1998 | Hugentobler et al. |
| 5,785,940 | A | 7/1998 | Carroll et al. |
| 5,811,044 | A | 9/1998 | Rote et al. |
| 5,921,771 | A | 7/1999 | Kobayashi |
| 5,922,097 | A | 7/1999 | Kobayashi et al. |
| 6,032,492 | A | 3/2000 | Kammonen |
| 6,059,028 | A | 5/2000 | Kincheloe et al. |
| 6,059,070 | A | 5/2000 | Cudicio et al. |
| 6,086,361 | A | 7/2000 | Higashi et al. |
| 6,113,874 | A | 9/2000 | Kobayashi |
| 6,116,170 | A | 9/2000 | Yamada et al. |
| 6,119,484 | A | 9/2000 | Takei et al. |
| 6,125,658 | A | 10/2000 | Maugendre et al. |
| 6,125,660 | A | 10/2000 | Gorobinskaya et al. |
| 6,210,157 | B1 | 4/2001 | Kobayashi |
| 6,237,369 | B1 | 5/2001 | LeBlanc et al. |
| 6,266,390 | B1 | 7/2001 | Sommer, Jr. et al. |

(56) References Cited

U.S. PATENT DOCUMENTS

| | | |
|---|---|---|
| 6,269,852 B1 | 8/2001 | Muhr |
| 6,316,748 B1 | 11/2001 | Ide |
| 6,339,610 B1 | 1/2002 | Hoyer et al. |
| 6,349,570 B1 | 2/2002 | Coates et al. |
| 6,366,353 B1 | 4/2002 | Brown et al. |
| 6,408,650 B1 | 6/2002 | Boulos et al. |
| 6,460,376 B1 | 10/2002 | Jeanvoine et al. |
| 6,477,862 B1 | 11/2002 | Wacke |
| 6,588,233 B2 | 7/2003 | Nattermann |
| 6,588,234 B1 | 7/2003 | Kiefer et al. |
| 6,705,118 B2 | 3/2004 | Simpson et al. |
| 6,715,319 B2 | 4/2004 | Barrow et al. |
| 6,722,161 B2 | 4/2004 | LeBlanc |
| 6,735,237 B2 | 5/2004 | Duch et al. |
| 6,739,152 B2 | 5/2004 | Jeanvoine et al. |
| 6,776,011 B2 | 8/2004 | Hayes et al. |
| 6,810,689 B2 | 11/2004 | Romer et al. |
| 6,871,514 B2 | 3/2005 | Muschik et al. |
| 6,883,349 B1 | 4/2005 | Jeanvoine et al. |
| 6,888,917 B2 | 5/2005 | Sommer, Jr. et al. |
| 6,927,186 B2 | 9/2005 | Hulme et al. |
| 6,969,044 B2 | 11/2005 | Delzer et al. |
| 7,017,371 B2 | 3/2006 | Juul et al. |
| 7,017,373 B2 | 3/2006 | Bauer et al. |
| 7,062,912 B2 | 6/2006 | Penfornis et al. |
| 7,162,892 B2 | 1/2007 | Smith et al. |
| 7,165,927 B2 | 1/2007 | Doherty et al. |
| 7,273,583 B2 | 9/2007 | Rue et al. |
| 7,332,203 B2 | 2/2008 | Hernandez |
| 7,351,929 B2 | 4/2008 | Afsari et al. |
| 7,355,140 B1 | 4/2008 | Afsari et al. |
| 7,384,230 B2 | 6/2008 | Pfeiffer et al. |
| 7,409,838 B2 | 8/2008 | Kobayashi |
| 7,412,849 B2 | 8/2008 | Bonitz et al. |
| 7,441,999 B2 | 10/2008 | Nakao et al. |
| 7,528,957 B2 | 5/2009 | Lewis et al. |
| 7,578,988 B2 | 8/2009 | Jacques et al. |
| 7,584,632 B2 | 9/2009 | House et al. |
| 7,682,123 B2 | 3/2010 | Bachrach |
| 7,699,602 B2 | 4/2010 | Boatwright et al. |
| 7,735,338 B2 | 6/2010 | Mueller et al. |
| 7,753,639 B2 | 7/2010 | Hoshino |
| 7,771,153 B2 | 8/2010 | Doherty et al. |
| 7,854,144 B2 | 12/2010 | DeLamielleure et al. |
| 7,900,476 B2 | 3/2011 | Lehman et al. |
| 7,905,940 B2 | 3/2011 | Edlinger |
| 7,924,414 B2 | 4/2011 | Mound |
| 7,955,574 B2 | 6/2011 | Fryxell et al. |
| 7,972,104 B2 | 7/2011 | Shiwaku et al. |
| 7,992,412 B2 | 8/2011 | Yoshida et al. |
| 8,056,364 B2 | 11/2011 | Sakai et al. |
| 8,091,387 B2 | 1/2012 | Iguchi et al. |
| 8,136,373 B2 | 3/2012 | Sasaki et al. |
| 8,181,486 B2 | 5/2012 | Yoshida et al. |
| 8,196,432 B2 | 6/2012 | Jacques et al. |
| 8,197,172 B2 | 6/2012 | Doherty et al. |
| 8,222,170 B2 | 7/2012 | Ikenishi et al. |
| 8,357,459 B2 | 1/2013 | Tachiwana et al. |
| 8,425,173 B2 | 4/2013 | Lert et al. |
| 8,436,268 B1 | 5/2013 | Afsari et al. |
| 8,456,633 B2 | 6/2013 | Lewis et al. |
| 8,498,320 B2 | 7/2013 | Kim et al. |
| 8,561,430 B2 | 10/2013 | Palmieri et al. |
| 8,561,652 B2 | 10/2013 | Bordere et al. |
| 8,573,006 B2 | 11/2013 | Macleod et al. |
| 8,573,007 B2 | 11/2013 | Sakamoto et al. |
| 8,585,341 B1 | 11/2013 | Oren et al. |
| 8,650,908 B2 | 2/2014 | Brown et al. |
| 8,650,914 B2 | 2/2014 | Charbonneau |
| 8,656,741 B2 | 2/2014 | Brown |
| 8,656,742 B2 | 2/2014 | Lockhart et al. |
| 8,661,852 B2 | 3/2014 | Leister et al. |
| 8,689,588 B2 | 4/2014 | Hirayama et al. |
| 8,696,010 B2 | 4/2014 | Toebes et al. |
| 8,707,738 B2 | 4/2014 | Sakamoto et al. |
| 8,707,739 B2 | 4/2014 | Huber et al. |
| 8,707,740 B2 | 4/2014 | Huber et al. |
| 8,769,992 B2 | 7/2014 | Huber |
| 8,783,067 B2 | 7/2014 | Bauer |
| 8,783,068 B2 | 7/2014 | Macleod et al. |
| 8,785,337 B2 | 7/2014 | Barton et al. |
| 8,806,893 B2 | 8/2014 | Isono et al. |
| 8,833,107 B2 | 9/2014 | Ringuette et al. |
| 8,839,644 B2 | 9/2014 | Brown et al. |
| 8,857,218 B2 | 10/2014 | Brown et al. |
| 8,864,365 B2 | 10/2014 | Rodgers |
| 8,869,564 B2 | 10/2014 | Gross et al. |
| 8,875,544 B2 | 11/2014 | Charbonneau |
| 8,893,528 B2 | 11/2014 | Ringuette et al. |
| 8,899,224 B2 | 12/2014 | Cowles |
| 8,902,422 B2 | 12/2014 | Chesner et al. |
| 8,919,801 B2 | 12/2014 | Toebes et al. |
| 8,951,029 B2 | 2/2015 | Wilkie |
| 8,973,405 B2 | 3/2015 | Charbonneau et al. |
| 8,979,070 B2 | 3/2015 | Keizer et al. |
| 8,991,215 B2 | 3/2015 | Shock et al. |
| 8,997,525 B2 | 4/2015 | Shock et al. |
| 9,010,073 B2 | 4/2015 | Stamm Kristensen et al. |
| 9,021,838 B2 | 5/2015 | Charbonneau et al. |
| 9,044,117 B2 | 6/2015 | Daburger et al. |
| 9,073,691 B2 | 7/2015 | Morimoto et al. |
| 9,073,692 B2 | 7/2015 | Morimoto et al. |
| 9,096,452 B2 | 8/2015 | Charbonneau et al. |
| 9,096,453 B2 | 8/2015 | Charbonneau |
| 9,096,457 B2 | 8/2015 | Leese et al. |
| 9,126,741 B2 | 9/2015 | Ellis et al. |
| 9,133,051 B2 | 9/2015 | Brown et al. |
| 9,145,319 B2 | 9/2015 | Mobley et al. |
| 9,156,394 B2 | 10/2015 | Toebes et al. |
| 9,188,333 B2 | 11/2015 | Galley et al. |
| 9,206,068 B2 | 12/2015 | McGinnis et al. |
| 9,206,071 B2 | 12/2015 | Leese et al. |
| 9,212,078 B2 | 12/2015 | Bratton et al. |
| 9,227,780 B2 | 1/2016 | Krohn |
| 9,227,865 B2 | 1/2016 | Shock et al. |
| 9,290,400 B2 | 3/2016 | Kunisa et al. |
| 9,321,591 B2 | 4/2016 | Lert et al. |
| 9,324,894 B2 | 4/2016 | Dogimont et al. |
| 9,327,903 B2 | 5/2016 | Toebes et al. |
| 9,394,192 B2 | 7/2016 | Villeroy De Galhau et al. |
| 9,428,330 B2 | 8/2016 | Lopez |
| 9,468,131 B2 | 10/2016 | Brandt et al. |
| 9,481,592 B2 | 11/2016 | Huber et al. |
| 9,492,831 B2 | 11/2016 | Charbonneau et al. |
| 9,493,372 B2 | 11/2016 | Lefrere et al. |
| 9,505,556 B2 | 11/2016 | Razumov |
| 9,505,646 B2 | 11/2016 | Huber |
| 9,533,905 B2 | 1/2017 | Charbonneau et al. |
| 9,533,906 B2 | 1/2017 | Charbonneau |
| 9,539,927 B2 | 1/2017 | Fitzgerald et al. |
| 9,567,157 B2 | 2/2017 | Scudder et al. |
| 9,573,831 B2 | 2/2017 | Charbonneau et al. |
| 9,576,831 B2 | 2/2017 | Hatano et al. |
| 9,580,344 B2 | 2/2017 | Charbonneau |
| 9,587,825 B2 | 3/2017 | Lefrere et al. |
| 9,592,959 B2 | 3/2017 | Kinugawa et al. |
| 9,598,306 B2 | 3/2017 | Leese et al. |
| 9,611,164 B2 | 4/2017 | Jeanvoine et al. |
| 9,617,075 B2 | 4/2017 | Porat |
| 9,620,397 B2 | 4/2017 | Doherty et al. |
| 9,643,869 B2 | 5/2017 | Shock et al. |
| 9,643,870 B2 | 5/2017 | Huber |
| 9,643,871 B2 | 5/2017 | Cowles et al. |
| 9,650,277 B2 | 5/2017 | Charbonneau et al. |
| 9,656,903 B2 | 5/2017 | McGinnis et al. |
| 9,676,644 B2 | 6/2017 | Shock et al. |
| 9,688,178 B2 | 6/2017 | Pham |
| RE46,462 E | 7/2017 | Huber et al. |
| 9,700,175 B2 | 7/2017 | King |
| 9,731,990 B2 | 8/2017 | Baker |
| 9,731,991 B2 | 8/2017 | Dalstra |
| 9,752,389 B2 | 9/2017 | Pham et al. |
| 9,776,194 B2 | 10/2017 | Schindler |
| 9,776,813 B2 | 10/2017 | McMahon |

(56) References Cited

U.S. PATENT DOCUMENTS

| | | |
|---|---|---|
| 9,776,901 B2 | 10/2017 | Huber et al. |
| 9,776,902 B2 | 10/2017 | Mobley et al. |
| 9,802,850 B2 | 10/2017 | Ohmstede et al. |
| 9,810,363 B2 | 11/2017 | Ganzer et al. |
| 9,815,726 B2 | 11/2017 | Huber |
| 9,822,027 B2 | 11/2017 | Wang et al. |
| 9,827,683 B1 | 11/2017 | Hance et al. |
| 9,834,894 B1 | 12/2017 | Reed et al. |
| 9,840,430 B2 | 12/2017 | Shock et al. |
| 9,856,162 B2 | 1/2018 | Lindig et al. |
| 9,862,538 B2 | 1/2018 | Pham et al. |
| 9,881,823 B2 | 1/2018 | Doherty et al. |
| 9,902,639 B2 | 2/2018 | Mobley et al. |
| 9,930,837 B2 | 4/2018 | Rowling |
| 9,932,258 B1 | 4/2018 | Clark |
| 9,938,093 B2 | 4/2018 | Sherwood et al. |
| 9,956,609 B1 | 5/2018 | De Saro et al. |
| 9,957,184 B2 | 5/2018 | Huber et al. |
| 9,982,884 B2 | 5/2018 | Huber et al. |
| 10,011,510 B2 | 7/2018 | Demott et al. |
| 10,029,934 B2 | 7/2018 | Wang et al. |
| 10,041,666 B2 | 8/2018 | Luka et al. |
| 10,059,535 B2 | 8/2018 | Herman et al. |
| 10,059,536 B2 | 8/2018 | Tomioka et al. |
| 10,065,798 B2 | 9/2018 | Borders et al. |
| 10,077,200 B2 | 9/2018 | Ferrari |
| 10,077,610 B2 | 9/2018 | Pham et al. |
| 10,081,565 B2 | 9/2018 | Shock et al. |
| 10,099,391 B2 | 10/2018 | Hance et al. |
| 10,112,860 B1 | 10/2018 | Kobayashi et al. |
| 10,118,852 B2 | 11/2018 | Wang et al. |
| 10,125,041 B2 | 11/2018 | Sorg et al. |
| 10,138,151 B2 | 11/2018 | Cai et al. |
| 10,141,212 B2 | 11/2018 | Doherty et al. |
| 10,147,627 B2 | 12/2018 | Doherty et al. |
| 10,167,146 B2 | 1/2019 | Johnston |
| 10,167,220 B2 | 1/2019 | Boughton et al. |
| 10,167,221 B2 | 1/2019 | De Angelis et al. |
| 10,173,915 B2 | 1/2019 | Rue et al. |
| 10,196,294 B2 | 2/2019 | Faulkinbury |
| 10,202,239 B2 | 2/2019 | Razumov |
| 10,233,105 B2 | 3/2019 | Faulkinbury et al. |
| 10,246,362 B2 | 4/2019 | Huber |
| 10,265,871 B2 | 4/2019 | Hance et al. |
| 10,280,000 B2 | 5/2019 | Sullivan et al. |
| 10,280,001 B2 | 5/2019 | Oki et al. |
| 10,322,960 B2 | 6/2019 | Martin et al. |
| 10,337,732 B2 | 7/2019 | Faulkinbury et al. |
| 10,381,251 B2 | 8/2019 | Doherty et al. |
| 10,392,285 B2 | 8/2019 | Charbonneau et al. |
| 10,442,614 B2 | 10/2019 | Lucas et al. |
| 10,479,255 B2 | 11/2019 | Krenek et al. |
| 10,507,992 B2 | 12/2019 | Tackett et al. |
| 10,526,136 B2 | 1/2020 | Hawkins et al. |
| 10,569,242 B2 | 2/2020 | Stegemoeller et al. |
| 10,584,393 B2 | 3/2020 | Dry et al. |
| 11,084,749 B2 | 8/2021 | Rashley et al. |
| 2002/0025244 A1 | 2/2002 | Kim |
| 2002/0162358 A1* | 11/2002 | Jeanvoine ............ C03B 5/2257 65/135.1 |
| 2004/0065115 A1 | 4/2004 | Mueller et al. |
| 2004/0168474 A1* | 9/2004 | Jeanvoine ............ C03B 5/173 65/121 |
| 2004/0196887 A1 | 10/2004 | Schmidbauer et al. |
| 2004/0206124 A1 | 10/2004 | Jeanvonine et al. |
| 2004/0206125 A1 | 10/2004 | Schenk et al. |
| 2004/0224833 A1 | 11/2004 | Jeanvoine et al. |
| 2005/0236747 A1 | 10/2005 | Rue et al. |
| 2005/2367471 | 10/2005 | Rue et al. |
| 2006/0062870 A1 | 3/2006 | Cyphert et al. |
| 2006/0122450 A1 | 6/2006 | Kim et al. |
| 2006/0243301 A1 | 11/2006 | LeMond et al. |
| 2007/0014185 A1 | 1/2007 | Diosse et al. |
| 2007/0204654 A1 | 9/2007 | Fukumoto et al. |
| 2007/0212546 A1 | 9/2007 | Jeanvoine et al. |
| 2008/0057275 A1 | 3/2008 | Grzesik et al. |
| 2008/0096754 A1 | 4/2008 | Thomsen et al. |
| 2008/0103039 A1 | 5/2008 | Jones |
| 2008/0110207 A1 | 5/2008 | Fukuda et al. |
| 2008/0178537 A1 | 7/2008 | Spangler et al. |
| 2008/0187686 A1* | 8/2008 | Rodriguez Cuartas ............ C03B 5/2252 65/180 |
| 2008/0256981 A1 | 10/2008 | Jacques et al. |
| 2008/0276652 A1 | 11/2008 | Bauer et al. |
| 2009/0008410 A1 | 1/2009 | Kosich |
| 2009/0011290 A1 | 1/2009 | Chudnovsky et al. |
| 2009/0078410 A1 | 3/2009 | Krenek et al. |
| 2009/0107181 A1 | 4/2009 | Sakai |
| 2009/0176639 A1 | 7/2009 | Jacques et al. |
| 2009/0215607 A1 | 8/2009 | Dejneka et al. |
| 2009/0235695 A1 | 9/2009 | Pierrot et al. |
| 2009/0255296 A1 | 10/2009 | Viada |
| 2010/0089383 A1 | 4/2010 | Cowles |
| 2010/0193077 A1 | 8/2010 | Nelson et al. |
| 2010/0199721 A1 | 8/2010 | Antoine et al. |
| 2010/0229980 A1 | 9/2010 | Achenbach et al. |
| 2010/0233772 A1 | 9/2010 | Achenbach et al. |
| 2010/0251772 A1 | 10/2010 | Itoh et al. |
| 2010/0284768 A1 | 11/2010 | Olin-nunez et al. |
| 2010/0307196 A1 | 12/2010 | Richardson |
| 2011/0061642 A1 | 3/2011 | Rouchy et al. |
| 2011/0083473 A1 | 4/2011 | Engels et al. |
| 2011/0098171 A1 | 4/2011 | Pedeboscq et al. |
| 2011/0197635 A1 | 8/2011 | McDermott et al. |
| 2011/0236845 A1 | 9/2011 | Aoki et al. |
| 2011/0236846 A1 | 9/2011 | Rue et al. |
| 2011/0308280 A1* | 12/2011 | Huber ............ F23D 14/32 65/347 |
| 2012/0011890 A1 | 1/2012 | Sakai et al. |
| 2012/0070252 A1 | 3/2012 | Waltert |
| 2012/0077135 A1 | 3/2012 | Charbonneau |
| 2012/0144863 A1 | 6/2012 | Shinohara et al. |
| 2012/0159991 A1 | 6/2012 | Dejneka et al. |
| 2012/0210751 A1 | 8/2012 | Rue et al. |
| 2013/0048148 A1 | 2/2013 | Matye |
| 2013/0066951 A1 | 4/2013 | Charboneau et al. |
| 2013/0086949 A1 | 4/2013 | Charboneau |
| 2013/0086950 A1 | 4/2013 | Huber et al. |
| 2013/0133373 A1 | 5/2013 | Lafon et al. |
| 2013/0239618 A1 | 9/2013 | Ishikawa et al. |
| 2013/0260980 A1 | 10/2013 | Touslee et al. |
| 2013/0276481 A1 | 10/2013 | Kobayashi et al. |
| 2014/0007622 A1 | 1/2014 | Shock et al. |
| 2014/0007623 A1 | 1/2014 | Charbonneau |
| 2014/0017499 A1 | 1/2014 | Yamamoto |
| 2014/0041322 A1 | 2/2014 | Pham et al. |
| 2014/0044508 A1 | 2/2014 | Luharuka et al. |
| 2014/0090421 A1 | 4/2014 | Shock et al. |
| 2014/0090423 A1 | 4/2014 | Charbonneau et al. |
| 2014/0090424 A1 | 4/2014 | Charbonneau et al. |
| 2014/0116089 A1 | 5/2014 | Yuasa et al. |
| 2014/0144185 A1 | 5/2014 | Shock et al. |
| 2014/0165655 A1 | 6/2014 | Nakagawa |
| 2014/0356608 A1 | 12/2014 | Lentes et al. |
| 2014/0371116 A1 | 12/2014 | Hojaji et al. |
| 2015/0013386 A1 | 1/2015 | Villeroy De Galhau et al. |
| 2015/0044003 A1 | 2/2015 | Pham |
| 2015/0044004 A1 | 2/2015 | Pham et al. |
| 2015/0135775 A1 | 5/2015 | Charbonneau et al. |
| 2015/0166403 A1 | 6/2015 | Yamamoto |
| 2015/0175464 A1* | 6/2015 | Lefrere ............ F27B 3/045 65/135.1 |
| 2015/0191304 A1 | 7/2015 | Herman et al. |
| 2015/0203286 A1 | 7/2015 | Ness |
| 2015/0225187 A1 | 8/2015 | Razumov |
| 2015/0291465 A1 | 10/2015 | Cowles et al. |
| 2015/0307382 A1 | 10/2015 | Wang et al. |
| 2015/0307389 A1 | 10/2015 | He et al. |
| 2015/0336834 A1 | 11/2015 | Mobley et al. |
| 2015/0344344 A1 | 12/2015 | Kobayashi et al. |
| 2015/0344345 A1 | 12/2015 | Kobayashi et al. |
| 2015/0360856 A1 | 12/2015 | Oren et al. |
| 2015/0368039 A1 | 12/2015 | Cochrum et al. |

(56) References Cited

U.S. PATENT DOCUMENTS

| | | |
|---|---|---|
| 2016/0002084 A1 | 1/2016 | Charbonneau et al. |
| 2016/0002091 A1 | 1/2016 | Leese et al. |
| 2016/0039433 A1 | 2/2016 | Oren et al. |
| 2016/0060154 A1 | 3/2016 | Cowles et al. |
| 2016/0075586 A1 | 3/2016 | Charboneau et al. |
| 2016/0075587 A1 | 3/2016 | Baker |
| 2016/0083279 A1 | 3/2016 | Cai et al. |
| 2016/0107914 A1 | 4/2016 | Baker et al. |
| 2016/0130095 A1 | 5/2016 | Oren et al. |
| 2016/0145139 A1 | 5/2016 | Fredholm et al. |
| 2016/0153654 A1 | 6/2016 | Richardson, III |
| 2016/0168001 A1 | 6/2016 | Demott et al. |
| 2016/0207814 A1 | 7/2016 | Demott et al. |
| 2016/0207817 A1 | 7/2016 | Hojaji et al. |
| 2016/0244279 A1 | 8/2016 | Oren et al. |
| 2016/0251152 A1 | 9/2016 | Krupa |
| 2016/0297065 A1 | 10/2016 | Lopez |
| 2016/0297605 A1 | 10/2016 | Lopez |
| 2016/0340219 A1 | 11/2016 | Miller |
| 2017/0007622 A1 | 1/2017 | Giliyar et al. |
| 2017/0008086 A1 | 1/2017 | Jones |
| 2017/0008795 A1 | 1/2017 | Charbonneau et al. |
| 2017/0015579 A1 | 1/2017 | Charbonneau et al. |
| 2017/0044040 A1 | 2/2017 | Madeni et al. |
| 2017/0057855 A1 | 3/2017 | Swiler et al. |
| 2017/0059153 A1 | 3/2017 | Baker et al. |
| 2017/0059154 A1 | 3/2017 | Luka et al. |
| 2017/0073262 A1 | 3/2017 | Charbonneau et al. |
| 2017/0107139 A1 | 4/2017 | Baker et al. |
| 2017/0113958 A1 | 4/2017 | Charbonneau et al. |
| 2017/0158544 A1 | 6/2017 | Shock et al. |
| 2017/0203989 A1 | 7/2017 | Shock et al. |
| 2017/0240450 A1 | 8/2017 | Meng et al. |
| 2017/0253518 A1* | 9/2017 | Sorg ................... C03B 5/04 |
| 2017/0259311 A1 | 9/2017 | Benichou et al. |
| 2017/0284872 A1 | 10/2017 | Cowles et al. |
| 2017/0341965 A1* | 11/2017 | Claussen ................. C03B 5/43 |
| 2018/0002120 A1 | 1/2018 | Allegretti et al. |
| 2018/0002213 A1 | 1/2018 | Demott et al. |
| 2018/0002214 A1 | 1/2018 | Gullinkala et al. |
| 2018/0009693 A1 | 1/2018 | Demott et al. |
| 2018/0016174 A1 | 1/2018 | Demott et al. |
| 2018/0022628 A1 | 1/2018 | Demott et al. |
| 2018/0029915 A1 | 2/2018 | Huber |
| 2018/0044214 A1 | 2/2018 | Huber |
| 2018/0057387 A1 | 3/2018 | Faulkinbury |
| 2018/0058770 A1 | 3/2018 | Adrian et al. |
| 2018/0065877 A1 | 3/2018 | Faulkinbury |
| 2018/0065878 A1 | 3/2018 | Dalstra |
| 2018/0105446 A1 | 4/2018 | Faulkinbury et al. |
| 2018/0111866 A1 | 4/2018 | Macphee et al. |
| 2018/0118600 A1 | 5/2018 | Francis, Jr. et al. |
| 2018/0141127 A1 | 5/2018 | Richard |
| 2018/0141752 A1 | 5/2018 | Nakanishi et al. |
| 2018/0155231 A1 | 6/2018 | Kenyon et al. |
| 2018/0237322 A1 | 8/2018 | Lewis |
| 2018/0237323 A1 | 8/2018 | D'Agostini et al. |
| 2018/0243800 A1 | 8/2018 | Kumar et al. |
| 2018/0244554 A1 | 8/2018 | Mighton et al. |
| 2018/0283789 A1 | 10/2018 | Kobayashi et al. |
| 2018/0313532 A1 | 11/2018 | Luka et al. |
| 2019/0023484 A1 | 1/2019 | Shin |
| 2019/0084861 A1 | 3/2019 | Takahashi et al. |
| 2019/0106273 A1 | 4/2019 | Hess et al. |
| 2019/0112214 A1 | 4/2019 | Sorg et al. |
| 2019/0119038 A1 | 4/2019 | Komelsen et al. |
| 2019/0127147 A1 | 5/2019 | Wagner et al. |
| 2019/0129371 A1 | 5/2019 | Wagner et al. |
| 2019/0129399 A1 | 5/2019 | Wagner et al. |
| 2019/0135555 A1 | 5/2019 | Wagner et al. |
| 2019/0161376 A1 | 5/2019 | Faulkinbury et al. |
| 2019/0161377 A1 | 5/2019 | Cowles et al. |
| 2019/0177200 A1 | 6/2019 | Huber |
| 2019/0183037 A1 | 6/2019 | Czapka et al. |
| 2019/0194053 A1 | 6/2019 | Demott et al. |
| 2019/0217258 A1 | 7/2019 | Bishop |
| 2019/0218044 A1 | 7/2019 | Keskitalo et al. |
| 2019/0241356 A1 | 8/2019 | Schaffner et al. |
| 2019/0256281 A1 | 8/2019 | Cochrum et al. |
| 2019/0263701 A1 | 8/2019 | Shock et al. |
| 2019/0264912 A1 | 8/2019 | Faulkinbury et al. |
| 2019/0276225 A1 | 9/2019 | Warren et al. |
| 2019/0284076 A1 | 9/2019 | Wang et al. |
| 2019/0284079 A1 | 9/2019 | Wang et al. |
| 2019/0291141 A1 | 9/2019 | Koyanaka et al. |
| 2019/0322505 A1 | 10/2019 | Tengvert et al. |
| 2019/0337832 A1 | 11/2019 | Francis, Jr. et al. |
| 2019/0337834 A1 | 11/2019 | Demott et al. |
| 2019/0352208 A1 | 11/2019 | Demott et al. |
| 2020/0031639 A1 | 1/2020 | Rauwolf |
| 2020/0047997 A1 | 2/2020 | Van Staalduinen |
| 2020/0079584 A1 | 3/2020 | Hawkins et al. |
| 2020/0079674 A1 | 3/2020 | Demott et al. |
| 2020/0095060 A1 | 3/2020 | Hawkins et al. |
| 2020/0102147 A1 | 4/2020 | Sullivan et al. |
| 2020/0109075 A1 | 4/2020 | Demott et al. |
| 2020/0118853 A1 | 4/2020 | Harasaki |
| 2020/0199990 A1 | 6/2020 | Friesen |
| 2020/0262641 A1 | 8/2020 | Friesen |
| 2021/0094861 A1 | 4/2021 | Wang et al. |
| 2021/0246060 A1 | 8/2021 | Vempati et al. |
| 2021/0246061 A1 | 8/2021 | Vempati et al. |
| 2022/0098076 A1 | 3/2022 | Holmes et al. |

FOREIGN PATENT DOCUMENTS

| | | |
|---|---|---|
| CN | 205115275 U | 3/2016 |
| CN | 10569307 A | 6/2016 |
| CN | 106746541 A | 2/2017 |
| CN | 107555764 A | 1/2018 |
| CN | 21184132 U | 8/2020 |
| DE | 2044237 A1 | 5/1971 |
| DE | 2825528 A1 | 12/1979 |
| DE | 19526212 A1 | 1/1997 |
| DE | 19644673 A1 | 4/1998 |
| DE | 102006025512 A1 | 12/2007 |
| DE | 102008006572 A1 | 7/2009 |
| EP | 0555171 A2 | 8/1993 |
| EP | 1118597 A1 | 7/2001 |
| EP | 2243747 A1 | 10/2010 |
| EP | 2578547 A2 | 10/2013 |
| EP | 2685170 A1 | 1/2014 |
| EP | 3088369 A1 | 11/2016 |
| EP | 3138820 A1 | 3/2017 |
| EP | 3388399 A1 | 10/2018 |
| ES | 1037414 U | 2/1998 |
| FR | 411768 A | 6/1910 |
| FR | 474628 A | 3/1915 |
| FR | 1306851 | 11/1961 |
| GB | 230598 | 3/1925 |
| GB | 281382 | 11/1927 |
| GB | 803457 | 10/1958 |
| GB | 1157010 A | 7/1969 |
| GB | 1269060 | 3/1972 |
| GB | 1422449 A | 1/1976 |
| GB | 2114968 A | 9/1983 |
| GB | 2355981 B | 5/2003 |
| GB | 2430451 A | 3/2007 |
| JP | S61044728 | 3/1986 |
| JP | S6199017 | 5/1986 |
| JP | H09263409 A | 10/1997 |
| JP | 11035338 | 2/1999 |
| JP | 2009120456 | 6/2009 |
| JP | 2017065965 A1 | 4/2017 |
| JP | 6792810 B2 | 11/2020 |
| WO | WO9838136 A1 | 9/1998 |
| WO | WO02/100741 A1 | 12/2002 |
| WO | WO2004026776 A1 | 4/2004 |
| WO | WO2004/063729 A1 | 7/2004 |
| WO | WO2013/188167 A1 | 12/2013 |
| WO | WO2013188167 A1 | 12/2013 |
| WO | WO2014057126 A1 | 4/2014 |
| WO | WO2014/189506 A1 | 11/2014 |
| WO | WO 2016/120350 A1 | 8/2016 |

(56) References Cited

FOREIGN PATENT DOCUMENTS

| | | |
|---|---|---|
| WO | WO2016/176073 A1 | 11/2016 |
| WO | WO201709117 | 1/2017 |
| WO | WO 2017/185571 A1 | 11/2017 |
| WO | WO2017/223034 A1 | 12/2017 |
| WO | WO 2018/026775 A1 | 2/2018 |
| WO | WO 2018/050678 A1 | 3/2018 |
| WO | 2018094678 A1 | 5/2018 |
| WO | WO 2018/094678 A1 | 5/2018 |
| WO | WO2018108323 A1 | 6/2018 |
| WO | WO2018/170392 A2 | 9/2018 |
| WO | WO2019/206438 A1 | 10/2018 |
| WO | WO2019/072992 A1 | 4/2019 |
| WO | WO201972992 A1 | 4/2019 |
| WO | WO2019072992 A1 | 4/2019 |
| WO | 2019154434 A2 | 8/2019 |
| WO | WO2019/154434 A2 | 8/2019 |
| WO | 2019199588 A1 | 10/2019 |
| WO | 2019206437 A1 | 10/2019 |
| WO | 2019206438 A1 | 10/2019 |
| WO | WO2019/199588 A1 | 10/2019 |
| WO | WO2019/206437 A1 | 10/2019 |
| WO | 2019238673 A1 | 12/2019 |
| WO | WO2019/238673 A1 | 12/2019 |
| WO | 2020019064 A1 | 1/2020 |
| WO | WO2020/019064 A1 | 1/2020 |
| WO | 2020074242 A1 | 4/2020 |
| WO | WO2020/074242 A1 | 4/2020 |
| WO | WO2020/106539 A1 | 5/2020 |
| WO | WO2022072405 A1 | 4/2022 |

OTHER PUBLICATIONS

PCT Invitation to Pay Additional Fees, Where applicable, Protest Fee, Int. App. No.; PCT/US2021/053252, Int. Filing Date: Oct. 1, 2021, dated Jan. 20, 2022.
PCT Search Report and Written Opinion, Int. Serial No. PCT/US2021/053252, Int. Filing Date: Oct. 1, 2021, Applicant: Owens-Brockway Glass Container Inc., dated Mar. 14, 2022.
Int. Search Report and Writ Opinion, Int. Serial No. PCT/US2020/053202, Int. Filing Date: Sep. 29, 2020, Applicant: Owens-Brockway Glass Container Inc., dated Dec. 3, 2020.
S. Laux, et al., Advanced Heat Recovery for Oxy-Fuel Fired Glass Furnaces with Optimelt Plus Technology, Praxair Optimelt Plus Presentation, 2016.
Int. Search Report and Writ Opin, Int. Serial No. PCT/US2021/052753, Int. Filing Date: Sep. 30, 2021, Applicant: Owens-Brockway Glass Container Inc., dated Apr. 25, 2022.
Int. Search Report and Writ Opin, Int. Serial No. PCT/US2021/052762, Int. Filing Date: Sep. 30, 2022, Applicant: Owens-Brockway Glass Container Inc., dated Mar. 25, 2022.
Int. Search Report and Writ Opin, Int. Serial No. PCT/US2020/039096, Int. Filing Date: Jun. 23, 2020, Applicant: Owens-Brockway Glass Container Inc., dated Nov. 2, 2020.
8185PCT Int. Search Report, Int. Serial No. PCT/US2013/042254, Int. Filing Date: May 22, 2013, Applicant: Johns Manville.
8185PCT Int. Preliminary Report on Patentability, Int. Serial No. PCT/US2013/042254, Int. Filing Date: May 22, 2013, Applicant: Johns Manville.
Int. Search Report and Writ Opin, Int. Serial No. PCT/US2020/053204, Int. Filing Date: Sep. 29, 2020, Applicant Owens-Brockway Glass Container Inc., dated Feb. 1, 2021.
Int. Search Report and Writ Opin, Int. Serial No. PCT/US2020/053394, Int. Filing Date: Sep. 30, 2020, Applicant: Owens-Brockway Glass Container Inc., dated Dec. 7, 2020.
Int. Search Report and Writ Opin, Int. Serial No. PCT/US2021/045313, Int. Filing Date: Aug. 10, 2021, Applicant: Owens-Brockway Glass Container Inc., dated Nov. 12, 2021.
Int. Search Report and Writ Opinion, Int. Serial No. PCT/US2021/052567, Int. Filing Date: Sep. 29, 2021, Applicant: Owens-Brockway Glass Container Inc., dated Mar. 17, 2022.
PCT Int. Search Report and Writ Opinion, Int. App. No.: PCT/US2021/052792, Int. Filing Date: Sep. 30, 2021, Applicant: Owens-Brockway Glass Container Inc., dated Jan. 24, 2022.
PCT Search Report and Writ Opinion, Int. Serial No. PCT/US2021/017647, Int. Filing Date: Feb. 11, 2021, Applicant: Owens-Brockway Glass Container Inc., dated Jun. 4, 2021.
PCT Search Report and Writ Opinion, PCT Int. Serial No. PCT/US2021/017578, PCT Int Filing Date: Feb. 11, 2021, Applicant: Owens-Brockway Glass Container Inc., dated May 27, 2021.
PCT Search Report and Writ Opinion, PCT Int. Serial No. PCT/US2021/017654, PCT Int. Filing Date: Feb. 11, 2021, Applicant: Owens-Brockway Glass Container Inc., dated May 28, 2021.
Ingredient Masters Inc. website, Bulk Bags (FIBC Bulk Bags), https://www.ingredientmasters.com/bulk-bags/ , Date: May 16, 2019.
PCT Search Report and Writ Opinion, Int. Serial No. PCT/US2021/053264, Int. Filing Date: Oct. 1, 2021, Applicant: Owens-Brockway Glass Container Inc.,dated Feb. 4, 2022.
PCT Search Report and Writ Opinion, Int. Serial No. PCT/US2021/053252, Int. Filing Date:Oct. 1, 2021, Applicant: Owens-Brockway Glass Container Inc., dated Mar. 14, 2022.
PCT Search Report and Writ Opinion, Int. Serial No. PCT/US2021/053261, Int. Filing Date:Oct. 1, 2021, Applicant: Owens-Brockway Glass Container Inc., dated Apr. 12, 2022.
U.S. Notice of Allowance, U.S. Appl. No. 11/684,972, filed Mar. 12, 2007, Title: Non-Hazardous Bulk Material Analyzer System, dated Dec. 6, 2010.
Int. Preliminary Report on Patentability, Int. Serial No. PCT/US2015/041543, Int. Filing Date: Jul. 22, 2015, Applicant: Halliburton Energy Services, Inc., dated Jan. 23, 2018.
Int. Preliminary Report on Patentability, Int. Serial No. PCT/US2016/044496, Int. Filing Date: Jul. 28, 2016, Applicant: Halliburton Energy Services, Inc. dated Jan. 29, 2019.
U.S. Office Action, U.S. Appl. No. 16/308,945, filed Dec. 11, 2018, dated Apr. 13, 2020.
Int. Search Report and Writ Opinion, Int. Serial No. PCT/US2021/052930, Int. Filing Date: Sep. 30, 2021, Applicant: Owens-Brockway Glass Container Inc., dated Jan. 31, 2022.
Int. Search Report and Writ Opinion, Int. Serial No. PCT/US2021/052525, Int. Filing Date: Sep. 21, 2021, Applicant: Owens-Brockway Glass Container Inc., dated Feb. 11, 2022.
Int. Search Report and Writ Opinion, Int. Serial No. PCT/US2021/053266, Int. Filing Date: Oct. 1, 2021, Applicant: Owens-Brockway Glass Container Inc., dated Apr. 14, 2022.
"Modular Process Skid", Wikipedia, https://en.wikipedia.org/w/index.php?title=Modular_process_skid&oldid=834074661, May 9, 2018.
International Search Report and Written Opinion, Int. Application No. PCT/US2021/053261, Int. Filing Date: Oct. 1, 2021, Applicant: Owens-Brockway Glass Container Inc., dated Apr. 12, 2022.
PCT Invitation to Pay Additional Fees, PCT Int.Serial No. PCT/US2021/053246, Int. Filing Date: Oct. 1, 2021, Applicant: Owens-Brockway Glass Container Inc. dated May 19, 2022.

\* cited by examiner

GLASS MANUFACTURING

This patent application discloses innovations in glass manufacturing systems and methods that involve submerged combustion melting of feedstock materials into molten glass.

BACKGROUND

A conventional glass factory includes a custom architectural installation specifically designed for glass manufacturing, and a glass manufacturing system supported and sheltered by the architectural installation. With reference to prior art FIGS. 6 through 10, a conventional glass container factory is illustrated and described as an example. Those of ordinary skill in the art would recognize that other glass factories, for example, for producing glass fibers, glass display screens, architectural glass, vehicle glass, or any other glass products, share many aspects with a glass container factory. The example glass factory architectural installation of FIGS. 6 through 10 includes a concrete foundation including a main level or forming floor with a four-feet-thick slab, and a basement below the forming floor for waste glass handling. The architectural installation also includes one or more factory buildings or enclosures on the foundation each including walls, a roof, and an upper level or raised platform above the forming floor.

The glass manufacturing system typically includes three major subsystems that occupy a large volumetric envelope both inside and outside of the factory building. First, a feedstock subsystem includes a "batch house" located outside of the factory building. The batch house towers over the factory building and is generally configured to receive and store feedstock or "glass batch" including raw materials, for example, sand, soda ash, and limestone, and also including cullet in the form of recycled, scrap, or waste glass. Second, a tall and long hot-end subsystem located within the factory building is generally configured to receive the glass batch from the batch house, melt the glass batch into molten glass, form glassware from the molten glass, apply a protective coating to the glassware, and anneal the coated glassware. Third, a cold-end subsystem also located in the factory building is generally configured to apply a lubricious coating to the annealed glassware, inspect the coated glassware, and prepare the inspected glassware for shipping to customers.

The batch house is usually several stories tall, and includes a covered unloading platform and a pit to receive the glass batch from underneath railcars or trucks that arrive loaded with glass batch materials. The batch house also includes multi-story silos to store the glass batch, and glass batch elevators and glass batch conveyors to move the glass batch from the pit to tops of the silos. The batch house further includes cullet pads at ground level to receive and store cullet, crushers to crush cullet to a size suitable for melting, and cullet elevators and conveyors to move crushed cullet to one of the silos in the batch house. The batch house additionally includes batch mixers to mix the glass batch received from the silos, conveyors with scales to weigh and deliver each glass batch material from the silos to the mixers, mixer conveyors to move the glass batch from the mixers to the hot-end subsystem, and dust collectors to collect dust from the various equipment. With reference to FIG. 8, the height of a batch house architectural installation is 96 feet (29.3 meters) above a forming floor level, the width of the batch house architectural installation is 95 feet and one inch (29 meters), and the horizontal depth of the batch house architectural installation is 60 feet (18.3 meters). With reference to FIG. 9, the height of the batch house equipment including the elevators is 93 feet and eight inches (28.5 meters) above a forming floor level, and a vertical depth of a batch house pit or basement is 19 feet and six inches (5.9 meters) below the forming floor level.

The hot-end subsystem includes a multi-story, continuously-operated furnace and a batch charger to charge feedstock materials into the furnace. The furnace melts the glass batch into molten glass, and refines the molten glass, and includes a long, refractory-built tank elevated by the raised platform of the factory building, and also includes a melter section that melts the glass batch into molten glass. The melter section is heated by fuel and oxidant combustion burners that are mounted in opposite sidewalls of a cross-fired furnace or in an end wall of an end-fired furnace. The combustion burners produce long flames over the surface of the molten glass. The melter section may also be heated by bottom-mounted in-melt booster electrodes, and further typically includes bottom-mounted bubblers and/or stirrers to ensure homogeneous mixing, reacting, and complete melting of the different batch materials. In addition to the melter section, the furnace includes a finer section positioned downstream from the melter section. The finer section is connected by a water-cooled throat to the melter section and is constructed to facilitate the thermally- and/or chemically-induced removal of gas bubbles from the glass. The furnace also includes a pair of multi-story, heat-recycling, brickwork regenerators on either side of the tank that receive, hold, and recycle heat from and to the melter section. As for the batch charger, it receives the glass batch from the mixer conveyors and screw feeds or reciprocally pushes the glass batch into the furnace. Typically, the batch charger reciprocably pushes piles of glass batch onto an exposed surface of molten glass in the melter section, and the piles slowly drift away from the charger and submerge into the molten glass.

The furnace operates continuously for many years until it becomes necessary to suspend operation to reconstruct the furnace by replacing worn refractory material inside the furnace with new refractory material. Notably, such relining of the furnace typically requires several months of work at a cost of millions of dollars. Of course, the operation of the furnace can be slowed for downtime when downstream equipment is being changed or repaired, but the furnace must operate continuously, such that glass batch must continue to be charged into the furnace and molten glass must continue flowing out of the furnace, to avoid freezing of glass in corners of the furnace tank and various other issues. During such downtime, the molten glass is dumped to the basement where it is water cooled and carried away for recycling as cullet. The longer such furnace downtime operation occurs, the more energy that is spent unnecessarily.

Also, glass color changes present many challenges to furnace operation. For example, when it is desired to change from a first glass color to a second glass color different from the first, a color transition process normally takes about three to four days, resulting in many days of producing waste glass. And too frequently the color transition process results in various issues that can require up to a week to resolve. For example, glass chemistry reduction/oxidation imbalances lead to excessive glass foaming that can be difficult to bring under control, and/or various commercial variations appear in glass containers initially produced from the transitioned second color glass. Accordingly, the frequency of glass color changes are minimized; about two per year typically, and once per month at most.

Downstream of the furnace, the hot-end subsystem includes a forehearth to receive the molten glass from the furnace, and to cool the molten glass to a uniform viscosity suitable for downstream forming operations. Typically, it takes more than twenty-four hours from the time a given volume of glass batch is introduced into the furnace until the given volume exits the forehearth as chemically homogenized and thermally-conditioned molten glass.

At a downstream end of the forehearth, the hot-end subsystem further includes a gob feeder to receive the molten glass from the forehearth, produce a stream of molten glass, and cut the stream into glass gobs that freefall into gob handling equipment. Gob handling equipment includes a lengthy series of distributors, scoops, chutes, deflectors, and funnels extending over ten feet (3 meters) in height. The gob handling equipment also includes ancillary lubrication equipment that applies lubricants to the gob handling equipment and liquid separators that separate or otherwise process the lubricants.

Downstream of the gob handling equipment, the hot-end subsystem further includes gravity-fed forming molds to receive the gobs from the gob handling equipment and form the glassware from the gobs. Glassware handling equipment located downstream of the molds includes a conveyor to move the glassware downstream of the forming molds, take-out mechanisms to pick up and place the glassware on dead plates, and pushers to push the glassware off the dead plates and onto the conveyor.

Moreover, downstream of molds and glassware handling equipment, the hot-end subsystem includes an annealing lehr at the end of the conveyor to anneal the glassware. The annealing lehr is a long and wide gas-fired oven with a conveyor running longitudinally therethrough and having a pusher to push long, transversely extending rows of containers into the oven.

Finally, the hot-end subsystem includes ancillary equipment including hot-end coating equipment along the conveyor to apply a protective coating to the glassware, roof-mounted furnace ventilators in fluid communication with furnace exhaust ports, and a cullet hopper or bath in the basement beneath the gob feeder to receive rejected gobs, or molten streams of waste glass when the furnace continues to run during a forming equipment changeover or other downtime.

The cold-end subsystem fits within a single story of the factory building, and includes conveyors to carry the annealed glassware downstream of the annealing lehr and to and between cold-end stations. The cold-end subsystem further includes a cold-end coating station to lubricate the glassware, and one or more inspection stations to inspect the coated glassware for any unacceptable commercial variations that will cause the glassware to be scrapped. The cold-end subsystem also includes scrap handling equipment to return the glassware scrap to the batch house, a packaging station to package acceptable glassware together, a palletizing station to palletize the packaged glassware, and a warehouse to store pallets of packaged glassware.

The batch house, furnace, and gob handling equipment require a specialized, dedicated, and permanent architectural installation that is considered a heavy industrial building including a pit, a basement, a reinforced foundation to support heavy furnace brickwork, and one or more three story building(s) that are plumbed with customized plumbing equipment and wired to handle very high industrial voltage electrical systems, which may require a dedicated substation, all of which must be constructed by skilled and expensive outside industrial construction personnel. The time to construct a new glass factory of the conventional type is about two to four years. And a conventional glass furnace cannot be relocated from one plant to another because, once assembled, the furnace can only be broken apart. And even if the conventional glass furnace could be relocated, it would involve a lengthy and cost-prohibitive process of brick-by-brick deconstruction and reassembly.

With reference to FIG. 10, the batch house occupies a large footprint of about 5,700 square feet or about 530 square meters. Also, with reference to FIGS. 8 and 9, the batch house has a large volumetric envelope of about 658,000 cubic feet or about 18,600 cubic meters. With reference again to FIG. 10, the rest of the installation, not including the batch house, but including the hot-end and the cold-end portions, occupies a large footprint of about 22,570 square feet or about 2,100 square meters. Also, with reference to FIG. 7, the rest of the installation has a large volumetric envelope of about 1,557,000 cubic feet or about 44,000 cubic meters.

The production output of such a size for a conventional glass manufacturing system is about 140 tons of glass per day (TPD). In fact, the particular system illustrated in FIGS. 6 through 10 is rated at a 140 TPD production capacity. Accordingly, a capacity-adjusted size of the system can be characterized by the volumetric envelope of the system divided by the production output of the system. For example, a total of 62,600 cubic meters divided by 140 TPD, is about 447 cubic meters per each ton of glass produced per day. Also, the batch house size of 18,600 cubic meters is divided by 140 TPD for a capacity-adjusted size of about 133 cubic meters per each ton of glass produced per day. Further, the rest of the installation has a size of 44,000 cubic meters and is divided by 140 TPD for a capacity-adjusted size of about 314 cubic meters per each ton of glass produced per day. As used in the preceding sentences, the term "about" means within plus or minus five percent.

Although such glass manufacturing systems and methods efficiently produce high-quality products for large-scale production runs, the presently disclosed subject matter introduces a revolutionary glass factory, glass manufacturing system, and individual subsystems and portions thereof that are more compact and economical, at least for smaller scale production runs or incremental additions to existing large-scale production runs.

BRIEF DESCRIPTION OF THE DRAWINGS

FIG. 6 is a front perspective schematic view of a conventional glass factory and glass manufacturing system, in accordance with the prior art, and drawn to scale.

FIG. 7 is another front perspective view of the factory and system of FIG. 6.

FIG. 8 is a rear perspective schematic view of the factory and system of FIG. 6.

DETAILED DESCRIPTION

Figure 1:
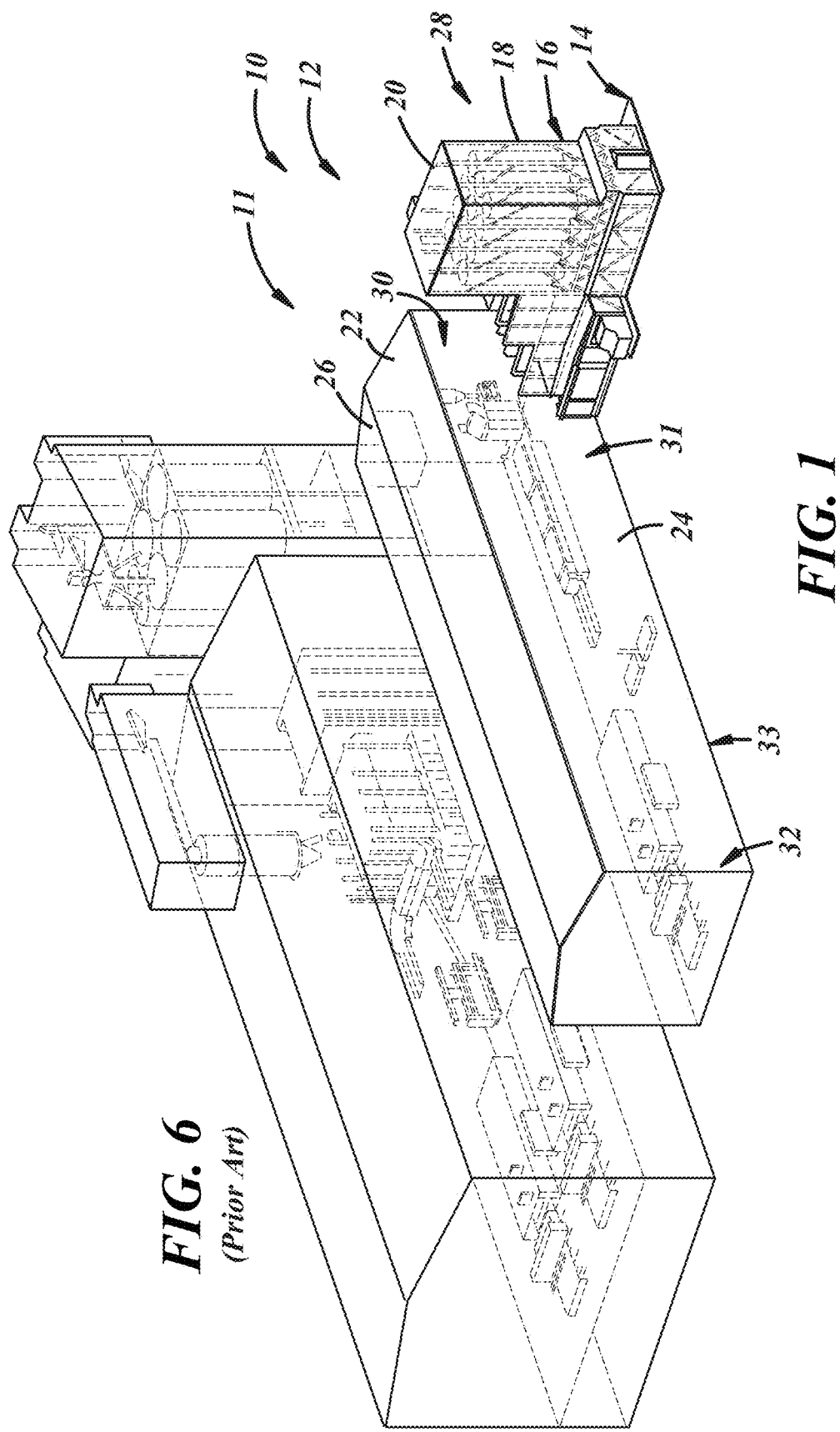
FIG. 1 is a front perspective schematic view of a glass factory and glass manufacturing system, in accordance with an illustrative embodiment of the present disclosure, and drawn to scale.
Figure 2:
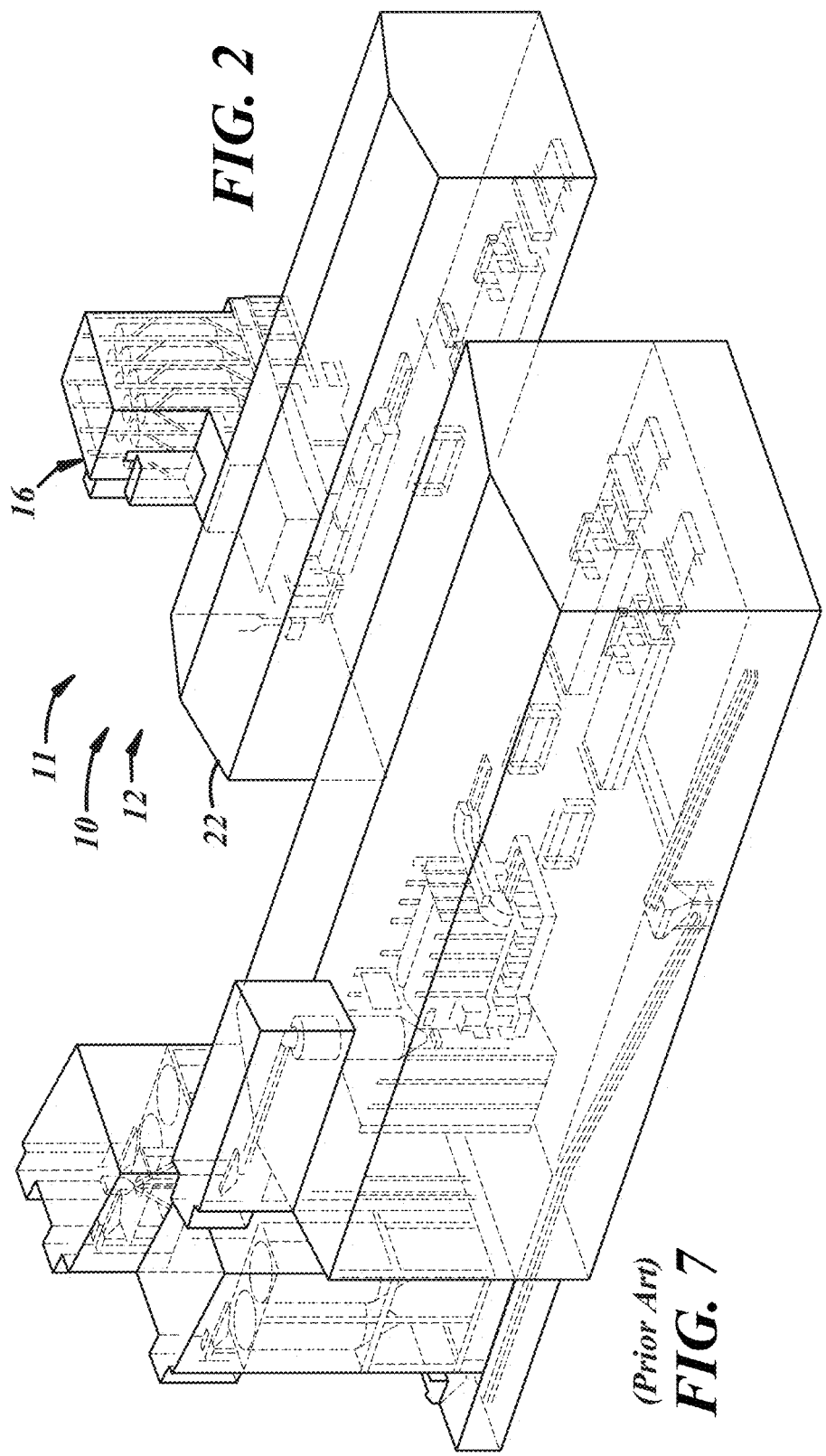
FIG. 2 is another front perspective view of the factory and system of FIG. 1.

In accordance with an aspect of the present disclosure, a new glass factory and/or glass manufacturing system has a volumetric envelope that is significantly reduced compared to that of conventional glass factories and/or glass manufacturing systems. Also, the new glass factory and/or manufacturing system may include prefabricated modular equipment configurations to facilitate rapid and mobile production capacity expansion in smaller increments and at lower capital cost than conventional glass manufacturing systems. Further, the new glass factory and/or manufacturing system may omit one or more conventional glass manufacturing subsystems or aspects thereof, as described in further detail below.

With reference to FIGS. 1 through 5, a new glass factory 10 is illustrated and described, with reference to a glass container factory 10 as an example. Those of ordinary skill in the art would recognize that other glass factories, for example, for producing glass fibers, glass display screens, architectural glass, vehicle glass, or any other glass products, share many aspects with a glass container factory. Accordingly, the presently disclosed and claimed subject matter is not limited to glass containers, glass container manufacturing systems, and glass container factories and, instead, encompasses any glass products, glass product manufacturing systems, and glass product factories.

The new glass factory 10 includes a new architectural installation 12 and a new glass manufacturing system 11 supported and sheltered by the installation 12. The installation 12 includes a concrete foundation 14 (FIGS. 1 and 3) having a forming floor which generally may include, for example, a four to six-inch-thick slab and at least one melter isolation pad and at least one forming machine isolation pad. Such isolation pads are less than four feet (1.2 meters) in thickness, and may be less than or equal to three feet (0.9 meters) in thickness. With specific reference to FIGS. 1-3, the installation 12 requires no basement below the forming floor, and also includes a factory building 22 on the foundation 14 including walls 24 and a roof 26, and a feedstock building 16 on the same foundation 14 or on its own foundation and including walls 18 and a roof 20. As used herein, the term "basement" includes the lowest habitable level of the glass factory 10 below a forming floor of the factory 10 and can include a first level or a below grade or below ground level portion that may require excavation of earthen material. Also, as used herein, the term "habitable" means that there is standing room for an adult human in the particular space involved and there is some means of ingress/egress to/from the space while walking such as a doorway, stairway, and/or the like. In contrast, according to the present disclosure, no basement is required, such that the architectural installation 12 includes a concrete slab with earthen material directly underneath the slab, wherein the slab establishes the forming floor.

The new glass manufacturing system 11 includes three major subsystems that occupy a volumetric envelope much smaller than conventional systems such that the glass factory 10 likewise requires a smaller volumetric envelope than conventional glass factories. First, a feedstock subsystem 28 is configured to receive and store feedstock or "glass batch." The glass batch includes glassmaking raw materials, like sand, soda ash, and limestone, and also may include cullet in the form of recycled, scrap, or waste glass. The feedstock subsystem 28 does not require a dedicated conventional three-story batch house or conventional batch house batch elevators, batch mixers, and/or the like. Second, a hot-end subsystem 30 receives the glass batch from the feedstock subsystem 28, melts the glass batch into molten glass, forms glassware from the molten glass, and anneals the coated or uncoated glassware. The hot-end subsystem 30 does not require a massive conventional glass furnace, lengthy conventional gob handling equipment, and/or glassware pick-and-place and pusher equipment. Third, a cold-end subsystem 32 inspects the glassware, packages the inspected glassware for shipping to customers, and stores the packaged glassware before shipping to customers. The cold-end subsystem 32 does not require a large conventional warehouse because the glassware can be made to order instead of being made to stock.

The installation 12 is no more than seventeen meters in height above the forming floor and is otherwise also much smaller than a conventional glass factory. Also, the installation 12, not including the feedstock building 16, is less than two stories (and certainly less than three stories) in height (e.g., the installation is less than thirteen meters tall), thereby enabling use of a light industrial building to be used to enclose the hot and cold end portions of the glass factory 10. As used herein, the phrase "light industrial building" means an architectural installation including a building less than thirteen meters tall and supported on footings surrounding a concrete mat slab, for example, 4 to 6 inches thick, and having earthen material directly underneath the slab.

Figure 3:
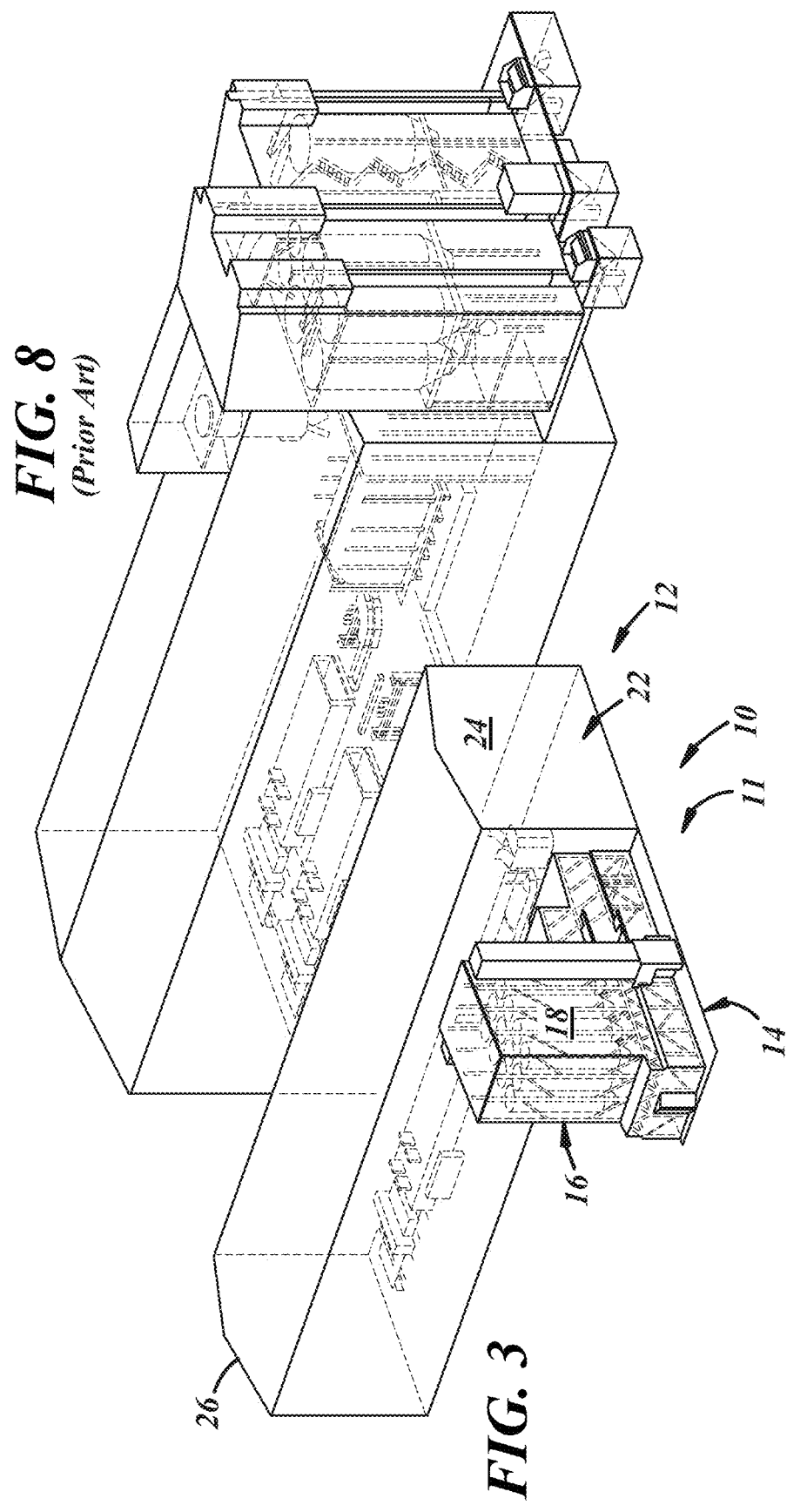
FIG. 3 is a rear perspective schematic view of the factory and system of FIG. 1.
Figure 4:
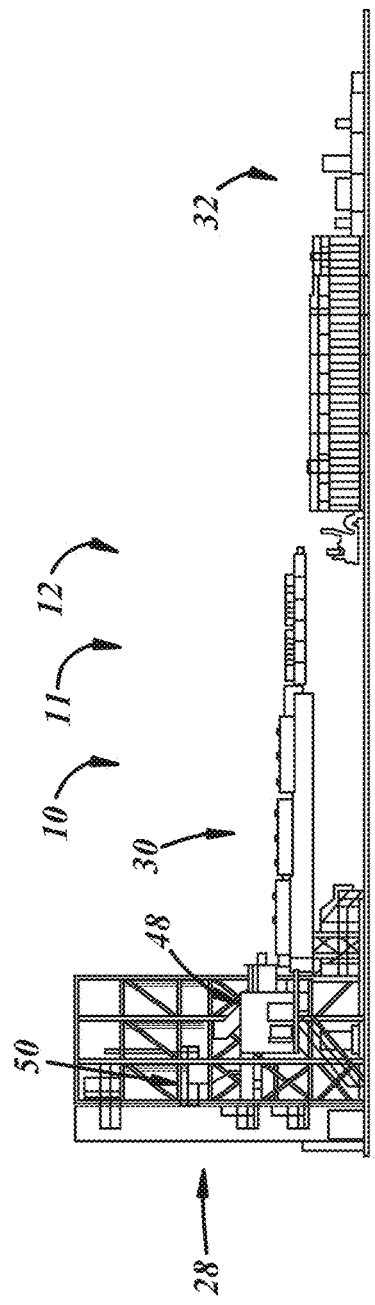
FIG. 4 is an elevational schematic view of the factory and system of FIG. 1.
Figure 9:
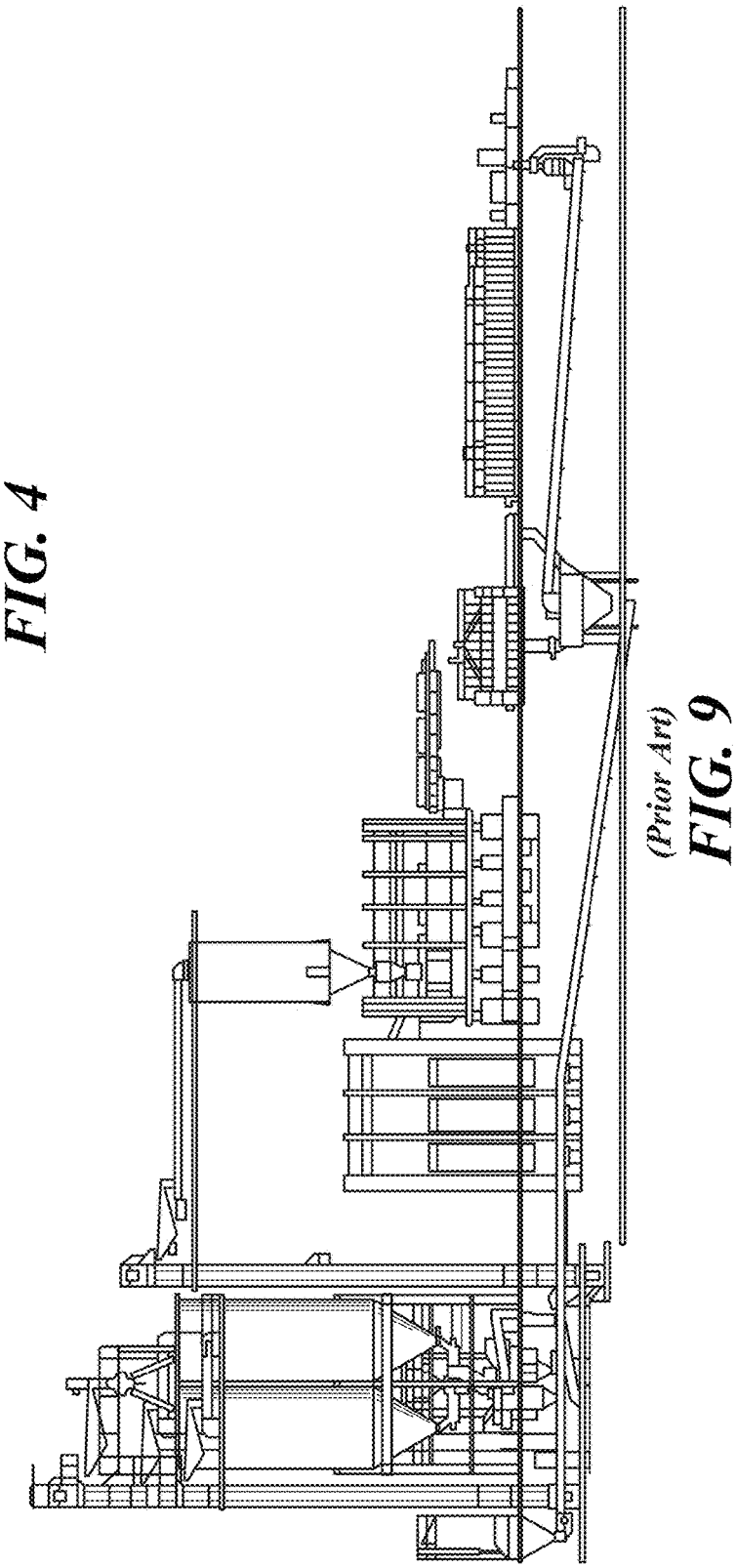
FIG. 9 is an elevational schematic view of the factory and system of FIG. 6.
Figure 5:
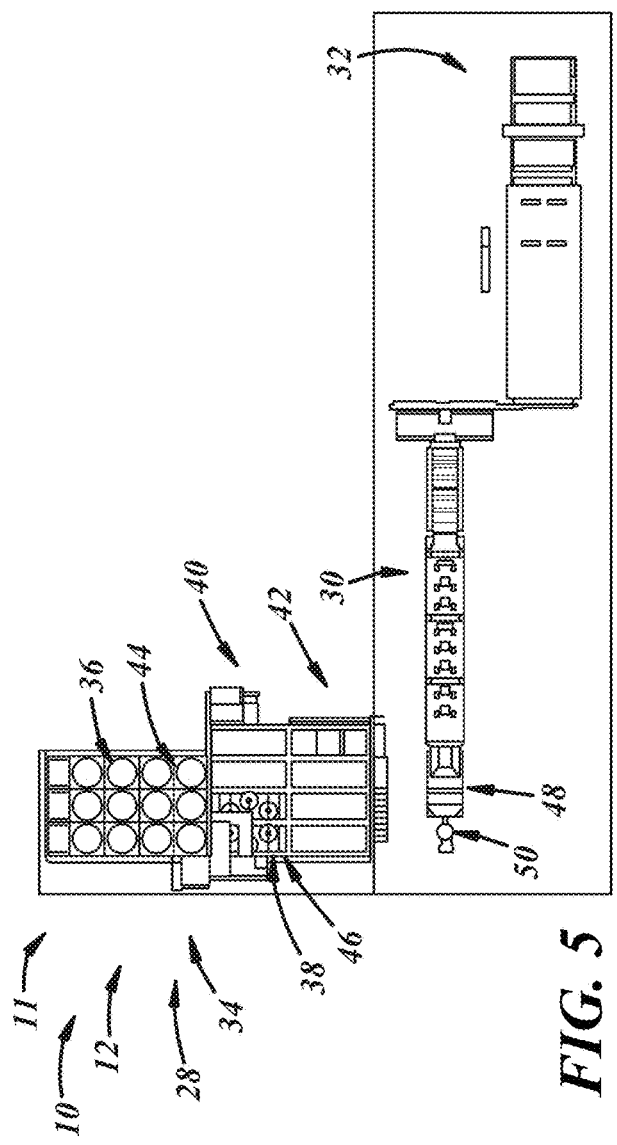
FIG. 5 is a plan schematic view of the factory and system of FIG. 1.
Figure 10:
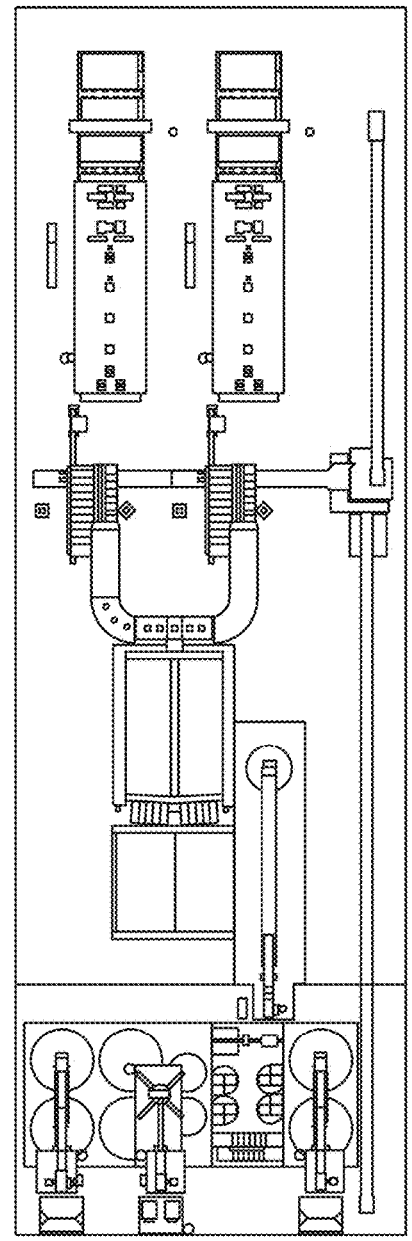
FIG. 10 is a plan schematic view of the factory and system of FIG. 6.

More specifically, with reference to FIGS. 3 and 5, the feedstock building 16 occupies a smaller footprint of about 3,500 square feet or about 325 square meters. Also, with reference to FIGS. 3 and 4, the feedstock building 16 has a smaller volumetric envelope of about 189,000 cubic feet or about 5,350 cubic meters. With reference again to FIG. 5, the rest of the installation 12, not including the feedstock building 16, but including the hot end and the cold end portions, occupies a smaller footprint of about 12,500 square feet or about 1,160 square meters. The footprint of this portion of the installation 12 may have a maximum length less than about 70 meters, a maximum width less than about 20 meters, and a to maximum height less than about 15 meters. Also, with reference to FIG. 2, the rest of the installation 12 has a smaller volumetric envelope of about 525,000 cubic feet or about 15,000 cubic meters.

The production output of such a size for the new glass manufacturing system 11 may range from 100 TPD to 120 TPD, including all ranges, subranges, values, and endpoints of that range. In fact, the particular system 11 illustrated in FIGS. 1-5 is about 110 TPD. Accordingly, a capacity-adjusted size of the presently disclosed system 11 can be characterized by the volumetric envelope of the presently disclosed system 11 divided by the production output of the system 11. For example, a total of about 20,350 cubic meters divided by 110 TPD, is about 185 cubic meters per each ton of glass produced per day by the glass manufacturing system 11. Also, the feedstock building size of about 5,350 cubic meters is divided by 110 TPD for a capacity-adjusted size of about 49 cubic meters per each ton of glass produced per day by the glass manufacturing system 11. Further, the rest of the installation 12 has a size of about 15,000 cubic meters and is divided by 110 TPD for a capacity-adjusted size of about 136 cubic meters per each ton of glass produced per day by the glass manufacturing system 11. As used herein, the term "about" means within plus or minus five percent.

Therefore, the capacity-adjusted size of the new glass manufacturing system 11 including the feedstock building 16 is less than 200 cubic meters per each ton of glass produced per day by the glass manufacturing system 11, certainly less than 250 cubic meters per each ton of glass produced per day, and much less than the 440+ cubic meters per each ton of glass produced per day of the conventional factory. Accordingly, the capacity-adjusted size of the new glass manufacturing system 11 including the feedstock building 16 is 170 to 204 cubic meters per each ton of glass produced each day, including all ranges, subranges, values, and endpoints of that range. Thus, the capacity-adjusted size of the presently disclosed glass factory 10 may be less than half that of the conventional factory.

Similarly, the capacity-adjusted size of the feedstock building 16 is less than 50 cubic meters per each ton of glass produced per day by the glass manufacturing system 11, certainly less than 75 cubic meters per each ton of glass produced per day, and much less than the 125+ cubic meters per each ton of glass produced per day of the conventional factory. Accordingly, the capacity-adjusted size of the feedstock building 16 is 45 to 54 cubic meters per each ton of glass produced each day, including all ranges, subranges, values, and endpoints of that range. Thus, the capacity-adjusted size of the presently disclosed feedstock building 16 may be less than half that of the conventional batch house.

Likewise, the capacity-adjusted size of the hot-end and cold-end installation 31,33 is less than 150 cubic meters per each ton of glass produced per day by the glass manufacturing system 11, certainly less than 200 cubic meters per each ton of glass produced per day, and much less than the 300+ cubic meters per each ton of glass produced per day of the conventional factory. Accordingly, the capacity-adjusted size of the hot-end and cold-end installation 31,33 of the new glass manufacturing system 11 is 125 to 150 cubic meters per each ton of glass produced each day, including all ranges, subranges, values, and endpoints of that range. Thus, the capacity-adjusted size of the presently disclosed hot-end and cold-end installation 31,33 of the presently disclosed glass factory 10 may be less than half that of the conventional hot-end and cold-end installation of the conventional factory.

Turning first to the feedstock subsystem 28, this portion of the new glass factory 10 facilitates storage and supply of feedstock for the hot-end subsystem 30. Notably, however, the feedstock subsystem 28 need not include a conventional batch house or any one or more of the following conventional batch house elements: a pit to receive glass batch from underneath railcars or trucks, glass batch elevators, or a glass batch mixer.

Instead, the feedstock subsystem 28 is a pneumatically-closed glass manufacturing feedstock subsystem that includes a bulk material storage sub-system 34 (FIG. 5), including an array of majors silos 36 (FIG. 5) and majors pneumatic inlet conduit configured to pneumatically convey bulk material from pneumatic conveying vessels to the array of majors silos 36, and also including an array of minors containers 38 (FIG. 5) and minors pneumatic inlet conduit configured to pneumatically convey bulk material from pneumatic conveying stations to the array of minors containers 38. The feedstock subsystem 28 also includes a bulk material transfer subsystem 40 (FIG. 5) including a transfer bin that pneumatically seals to the majors silos 36 and the minors containers 38 and receives bulk material therefrom, and an automatically guided vehicle configured to move the transfer bin between the arrays 36,38 and the bulk material transfer sub-system 40. The feedstock subsystem 28 also includes a bulk material transmission subsystem 42 (FIG. 5)

including a pneumatic hopper that pneumatically seals to the transfer bin and receives bulk material therefrom, and a pneumatic outlet conduit coupled to the pneumatic hopper and configured to transmit bulk material to a glass melting furnace separate from and downstream of the feedstock subsystem 28. The system is pneumatically closed from the pneumatic inlet conduit to the pneumatic outlet conduit. The feedstock subsystem 28 may include the apparatus and involve the methods disclosed in the discussion below regarding FIGS. A-1 through A-23.

As shown in FIG. 5, the majors array 36 includes a plurality of bulk material container systems 44, each including a frame having dimensions less than or equal to an intermodal freight container and including longitudinally extending corner columns, a base including horizontally extending base cross-members, and a silo platform including horizontally extending platform cross-members and a panel coupled to the platform cross-members. A silo is carried within each frame and includes a body having a body lower end and a body upper end, and a spout coupled to the body lower end and including a spout lower end. Utilities are coupled to the upper end of the silo and include a filter, a pressure relief valve, pneumatic conduit, and a level gauge, and dosing equipment is coupled to the spout lower end. Corner columns of adjacent systems are coupled together to establish the silo array. The bulk material container systems 44 are preassembled at an equipment fabricator, are shipped from the fabricator to a product manufacturer in an intermodal freight container, and are erected at the product manufacturer.

As shown in FIG. 5, the minors array 38 includes a plurality of bulk material container systems 46, each including a frame with dimensions less than or equal to an intermodal freight container and including longitudinally extending corner columns, and a container platform including horizontally extending platform cross-members and a panel coupled to the platform cross-members. A plurality of containers is carried within the frame in a partial circumferential array and includes bodies having body lower ends and body upper ends, and spouts coupled to the body lower ends and including spout lower ends. Utilities are coupled to the upper ends of the containers and include filters, pressure relief valves, pneumatic conduit, and level gauges. Dosing equipment is coupled to each spout lower end. Corner columns of adjacent systems are coupled together and the partial circumferential arrays of the containers establish a complete circumferential array of the containers 38.

Additionally, although shown as a separate architectural installation in the drawing figures, at least a portion of the architectural installation of the feedstock subsystem 28 may be integrated with the architectural installation 31,33 of the hot and cold end subsystems 30,32. For example, a majors section of the feedstock subsystem 28 including a majors silo array and the enclosure and foundation portion of the feedstock building 16 corresponding to the majors silo array may be located outside of the architectural installation 31,33 of the hot and cold end subsystems 30,32, and the rest of the feedstock subsystem 28 may be located within the enclosure of the architectural installation 31,33 of the hot and cold end subsystems 30,32 with no increase—and perhaps some decrease—in footprint or volumetric envelope described above. In another example, a weatherproof majors silo array may be located outside of the architectural installation 31,33 of the hot and cold end subsystems 30,32 on a suitable foundation, and access to the majors silo array may be provided by an above ground enclosed tunnel or hallway traversable by automatically guided vehicles.

Turning now to the hot-end subsystem 30 and with reference to FIGS. 4 and 5, this portion of the new glass factory 10 includes a submerged combustion melting (SCM) furnace or SC "melter" 48 to melt the glass batch into molten glass, and a batch charger 50 to receive the glass batch from the feedstock subsystem 28 and charge the glass batch into the SCM furnace 48. The batch charger 50 moves the feedstock directly into the SCM furnace 48, for example, through a side wall, a roof, or a floor of the SCM furnace 48.

In contrast to conventional glass furnaces, SCM furnaces include submerged combustion burners that are mounted in floors or sidewalls of the furnaces and that fire fuel and oxidant mixtures directly into and under the surface of the molten glass. The fuel and oxidant mixtures of the burners produce powerful flows of combustion gases through the molten glass that cause violent sloshing and turbulence of the molten glass, so much so that the furnace tends to shake. The burners produce intense internal shearing forces of the molten glass, thereby causing rapid heat transfer and particle dissolution throughout the molten glass. This is in contrast to the much slower kinetics of a conventional glass furnace in which the molten glass is comparatively still, and heated radiantly with above-melt burners and, in some cases, with in-melt booster electrodes. And although the SCM furnace 48 rapidly produces chemically homogenized molten glass, the glass melt is foamy, having about 30 vol % to 60 vol % entrained gas bubbles.

The relatively high heat-transfer and mixing efficiency of the SCM furnace 48 allows for a fundamentally different melter design than that of a conventional glass furnace. Specifically, an SCM furnace 48 is typically 50% to 90% smaller than a conventional glass furnace by tonnage weight of molten glass holding capacity at steady-state. Because the SCM furnace walls can be externally cooled, the furnace 48 is able to be shut down and emptied, and then restarted, quickly and efficiently when necessitated by production schedules or other considerations. This type of operational flexibility is simply not possible for a conventional glass furnace. Additionally, the SCM furnace 48 may include non-submerged overhead burners to pre-heat the furnace 48 during start-up and, optionally, to impinge on the turbulent molten glass during operation to suppress foaming.

The SCM furnace 48, which is shown in FIGS. 4 and 5, generally includes a tank including a floor, a roof, and a perimeter wall extending between the floor and the roof and establishing an interior to receive feedstock, melt the feedstock into molten material, and contain the molten material produced from the feedstock. The perimeter wall may include a front end wall, a rear end wall, side walls, and angled walls between the side walls and the end walls. In other embodiments, any configuration of the perimeter wall may be used including walls constituting a purely rectangular shape, or a cylindrical wall, or any other suitable configuration. The furnace 48 also includes a batch inlet at an upstream end of the tank, a molten glass outlet at a downstream end of the tank, submerged combustion melting burners extending through the tank (e.g. through the floor) to melt the feedstock into the molten glass in the interior of the tank, and an exhaust outlet through the roof.

In an example embodiment of batch charging, the batch charger 50 (FIGS. 4 and 5) includes a charger conduit including an inlet to receive feedstock and an outlet at an outlet portion of the charger conduit to transmit feedstock, and an auger or other feedstock mover coupled to the charger conduit to convey feedstock in a direction from the inlet toward the outlet. A gate may be detachably coupled to the outlet portion of the charger conduit and configured to be coupled directly to a wall of a melting vessel. The auger may have a helical flight with an outer diameter of varying size. A stripper may be movably carried by the charger conduit and moved by an actuator with respect to the charger conduit to facilitate transmission of feedstock and/or to strip away clogged feedstock and/or molten material. More specifically, the batch charger 50 may include the apparatus and involve the methods disclosed in U.S. Patent Application Ser. No. 63/085,883, filed on Sep. 30, 2020 and which is assigned to the assignee hereof and is incorporated herein by reference in its entirety.

In another example embodiment of batch charging, a batch feeding apparatus includes a detachable feeder alcove configured to be coupled to an SCM furnace 48 for providing batch material to the SCM furnace 48 and including at least one side wall and a cover, and a batch feeder sealingly coupled to the cover and that feeds batch material to the feeder alcove. The batch feeding apparatus also may include an extendable panel that extends downwardly below a batch inlet of the feeder alcove to molten glass, and is configured to maintain contact with the molten glass to seal off a feeder alcove interior. Additionally, the batch feeding apparatus may include a heating device, a cleaning device, and/or a storage device. More specifically, the apparatus may include the apparatus and involve the methods disclosed in U.S. patent application Ser. No. 17/039,713, filed on Sep. 30, 2020 and which is assigned to the assignee hereof and is incorporated herein by reference in its entirety.

To facilitate a smaller and more flexible glass furnace, construction of the SCM furnace 48 may be modular; including individual fluid-cooled panels fluidically and mechanically coupled together to create a desired shape and size of the furnace 48. The panels can be prefabricated off-site and assembled quickly on-site at the glass factory 10 by coupling panel fluid connectors together and fastening the panels together. Panels can be added to or removed from an existing SCM furnace to expand or reduce the size of the furnace 48. Likewise, panels of an existing SCM furnace can be easily removed and replaced with replacement panels or with reinforced panels at furnace locations experiencing high-wear, such that the furnace 48 can be selectively rebuilt and need not be entirely rebuilt or repaneled during any given repair. The panels include inner plates having internal surfaces and refractory retainers extending from the internal surfaces, outer plates having fluid connectors, sidewalls connecting the inner and outer plates in a fluid-tight manner, and internal baffles tack welded or intermittently connected to and between the plates to define a serpentine fluid conduit that primarily directs fluid to flow through the baffles, but permits fluid to slip between the baffles and the plates to reduce hot spots. The panels are in fluid communication with one another via conduit coupled to the fluid connectors of the outer plates. A refractory material, for instance, an aluminum silicate-based material or a cullet-based material, is cast, sprayed, troweled, or otherwise applied to the internal surfaces of the inner plates, and held thereto via the refractory retainers. More specifically, the SCM furnace 48 may include the apparatus and involve the methods disclosed in U.S. Pub. No. 2021/0094863, which is assigned to the assignee hereof and is incorporated herein by reference in its entirety. Likewise, the SCM furnace 48 may include the apparatus and involve the methods disclosed in U.S. patent application Ser. No. 16/993,825, filed on Aug. 14, 2020 and which is assigned to the assignee hereof and is incorporated herein by reference in its entirety.

Additionally, the SCM furnace 48 includes an exhaust system in fluid communication with the interior of the tank via the exhaust outlet thereof, and generally may include a fluid-cooled flue coupled to and in fluid communication with the exhaust outlet of the SCM furnace 48, and a refractory-lined hood coupled to and in fluid communication with the fluid-cooled flue at a downstream end of the flue. The exhaust system also may include a dilution air input conduit coupled to and in fluid communication with the refractory-lined hood. The exhaust system also may include a non-cooled, non-refractory outlet conduit coupled to and in fluid communication with the refractory-lined hood, and a dust cleanout duct coupled to and in fluid communication with the refractory-lined hood. The fluid-cooled flue extends upwardly from the roof of the furnace tank at the exhaust outlet. More specifically, the SCM furnace 48 may include the apparatus and involve the methods disclosed in U.S. Patent Application Ser. No. 63/085,646, filed on Sep. 30, 2020 and which is assigned to the assignee hereof and is incorporated herein by reference in its entirety.

The SCM furnace 48 also includes a cooling system skid including a cooling fluid manifold, a cooling fluid source, a pump, conduit, valves, flow meters, regulators, temperature sensors, controllers, and the like, and a pallet or other sub-structure to carry the aforementioned cooling system equipment. The SCM furnace 48 further includes a utility skid including electrical cabling and connectors, prefabricated fuel and oxidizer manifolds, inlets, and connectors, and the like, and a pallet or other sub-structure to carry the aforementioned utility equipment. Of course, the SCM furnace 48 includes SCM burners that may be assembled on site at the glass factory 10 or preassembled to floor panels of the SCM furnace 48.

Installed, the height of the SCM furnace 48 including the exhaust system is less than ten meters tall, and may be less than nine meters tall. Given the relatively small size of the SCM furnace 48, its modularity, and the fact that no basement is needed under the SCM furnace 48, the SCM furnace 48 can be easily relocated to different portions of the factory building, for example, to accommodate reconfiguration of a production line, addition of a production line, or the like. All controls and external connectors may be carried by one panel of the SCM furnace 48. SCM furnace reconstruction requires less than two weeks at a small fraction of the cost of reconstructing conventional glass furnaces. Notably, the SCM furnace 48 need not include in-melt booster electrodes, or bubblers or stirrers because the in-melt burners provide sufficient heat and turbulence to thoroughly melt and mix the glass batch into chemically and thermally homogeneous molten glass. Accordingly, energy expended on such ancillary equipment can be avoided. Also, the SCM furnace 48 does not require use of a reinforced foundation because there are no heavy furnace brickwork regenerators, it does not necessitate use of a two to three story building with a basement, and it does not necessitate roof-mounted furnace ventilators. Accordingly, nearly any light industrial building having a ceiling height of less than 15 meters can now be used to house a glass factory. Similarly, such a building having standard plumbing and 480 volts electrical supply can be used. As just one example, a typical warehouse in an area zoned for light industry could be used.

In an example embodiment of operation of the SCM furnace or SC melter 48, good quality flint glass may be reliably produced. The method involves controlling four specific process parameters of the SC melter 48 that have been determined to have at least some influence on promoting flint glass production. The identified SC melter process parameters include (1) the oxygen-to-fuel ratio of the submerged burners, (2) the temperature of the glass melt maintained in the SC melter 48, (3) the specific throughput rate of molten glass from the SC melter 48, and (4) the residence time of the glass melt. When each of these SC melter process parameters is maintained within a predetermined range, the glass melt and the molten glass extracted therefrom through an outlet of the SC melter 48 exhibit a colorless or nearly colorless visual appearance. In fact, the molten glass obtained from the SC melter 48 can consistently meet exacting flint glass specifications that are often mandated by the commercial container and flat glass articles industries. An oxygen-to-fuel ratio of a combustible gas mixture for the burners ranges from stoichiometry to 30% excess oxygen relative to stoichiometry, a temperature of a glass melt in the SC melter 48 is between 1200° C. and 1500° C., a residence time of the glass melt is maintained between 1 hour and 10 hours, and a specific throughput rate of molten glass discharged from the SC melter 48 ranges from 2 tons per day per meter squared of cross-sectional area of the submerged combustion melter [tons/day/$m^2$] to 25 tons/day/$m^2$. Such SC melter operation may include the apparatus and involve the methods disclosed in U.S. Pub. No. 2021/0246060, which is assigned to the assignee hereof and is incorporated herein by reference in its entirety.

The vitrifiable feed material includes a base glass portion that provides primary glass-forming oxides, an oxidizing agent comprising a sulfate compound, and a decolorant comprising either selenium or manganese oxide. The vitrifiable feed material comprises between 0.20 wt % and 0.50 wt % of the sulfate compound, expressed as $SO_3$, and further comprises between 0.008 wt % and 0.016 wt % of selenium or between 0.1 wt % and 0.2 wt % of manganese oxide. The vitrifiable feed material is formulated to be introduced into a glass melt that is contained within a submerged combustion melter and that comprises a total iron content expressed as $Fe_2O_3$ in an amount ranging from 0.04 wt % to 0.06 wt % and has a redox ratio that ranges from 0.1 to 0.4. The vitrifiable feedstock may include the materials and involve the methods disclosed in U.S. Pub. No. 2021/0246061, which is assigned to the assignee hereof and is incorporated herein by reference in its entirety.

In another example embodiment of operation of the SCM furnace or SC melter 48, a redox ratio of a glass melt can be adjusted in several ways depending on a desired outcome, by controlling one, any combination of two, or three operating conditions of the SC melter 48 that have been determined to have an influence on the redox ratio of the glass melt. The particular SC melter operating conditions include (1) the oxygen-to-fuel ratio of the combustible gas mixture injected by each of the submerged burners, (2) the residence time of the glass melt, and (3) the gas flux through the glass melt. The redox ratio of the glass melt is considered to be "adjusted" when the redox ratio is shifted relative to what is otherwise inherently attributable to the composition of the vitrifiable feed material in the absence of controlling the operating condition(s). The redox ratio may be shifted up (more reduced glass) or down (more oxidized glass) depending on the color of the glass being produced to help minimize the need to include certain redox agents in the vitrifiable feed material. The redox ratio may also be increased to shift the glass melt to a more reduced state, or it can be decreased to shift the glass melt to a more oxidized state, to help transition between glass colorations without necessarily having to alter the quantity of redox agents included in the vitrifiable feed material being fed to the submerged combustion melter. The ability to adjust the redox ratio of the glass melt through control of the operating condition(s) can help achieve certain glass colorations with less reliance on the composition of the vitrifiable feed material, can allow for rapid changes in redox ratio, and can permit modifications to the composition of the vitrifiable feed material that otherwise might not be possible. Such SC melter operation may include the apparatus and involve the methods disclosed in U.S. Pub. No. 2021/0246062, which is assigned to the assignee hereof and is incorporated herein by reference in its entirety.

The hot-end subsystem 30 also may include a stilling vessel, stilling chamber, or "stiller" to receive the molten glass from the turbulent confines of the SCM furnace 48, allow the molten glass to settle, and begin the process of fining the molten glass. The stilling vessel receives foamy molten glass discharged from the SCM furnace 48, which has a tendency to have a fluctuating flow rate, and delivers molten glass at a controlled flow rate to a downstream finer. In this way, the SCM furnace 48 can be operated at maximum performance to produce molten glass, and downstream glass fining can be practiced more efficiently, with a minimal size apparatus, and with better overall control, because the molten glass input flow to the finer can be regulated with precision. The stilling vessel can be operated to partially fine and/or reduce the foam content of an intermediate pool of molten glass that pools within the stilling vessel while also preventing heat loss from the glass before delivering the molten glass feed to the downstream finer.

The stilling vessel includes a stilling tank and a feeding spout appended to the stilling tank. To control the flow rate of the molten glass from the feeding spout, movement of a reciprocal needle is controlled to regulate the flow rate (either by mass or volume) through an orifice of the feeding spout. As such, the stilling vessel effectively decouples viscosity of the molten glass from the flow rate of the molten glass, thereby providing improved control of finer molten glass level, e.g., twice as accurate as that of previous SCM and finer arrangements. Without the stilling vessel, the SCM furnace 48 would have to be operated more conservatively and/or the size or length of the finer would have to be significantly increased. The stilling vessel may include the stilling vessel disclosed in U.S. Pub. No. 2021/0094857, which is assigned to the assignee hereof and is incorporated herein by reference in its entirety. The stilling vessel may include the liquid-cooled flow control needle disclosed in U.S. patent application Ser. No. 17/039,734, filed on Sep. 30, 2020 and which is assigned to the assignee hereof and is incorporated herein by reference in its entirety.

Additionally, the hot-end subsystem 30 also includes a downstream finer that may be mechanically decoupled from the stilling vessel. The finer serves to fine molten glass including removal of foam or gas bubbles from the surface of the molten glass and from the bulk of the molten glass. A forehearth may be located at a downstream end of the finer to receive fined molten glass from the finer, and condition the molten glass to a uniform viscosity for downstream forming operations, and may include a glass feeder at a downstream end thereof to feed the conditioned molten glass to downstream forming equipment.

In an example fining embodiment, a fining tank includes a housing that defines a fining chamber and contains a molten glass bath in the fining chamber, and that further defines each of a glass inlet, a glass outlet, and an auxiliary access passage, and wherein the molten glass bath flows in a flow direction from the glass inlet to the glass outlet. Unfined molten glass produced in a submerged combustion melter is received into the fining chamber of the fining tank through the glass inlet, the unfined molten glass having a volume percentage of gas bubbles and a density and, upon being introduced into the fining chamber, combining with the molten glass bath. Additive particles are introduced into the fining chamber of the fining tank through the auxiliary access passage, and comprise a glass reactant material and one or more fining agents, wherein the one or more fining agents are released into the molten glass bath upon consumption of the additive particles in the molten glass bath to thereby accelerate the removal of bubbles from the molten glass bath. Fined molten glass is discharged from the glass outlet of the fining tank, having a volume percentage of gas bubbles that is less than the volume percentage of gas bubbles in the unfined molten glass and further having a density that is greater than the density of the unfined molten glass. Such a finer may include one or more of the apparatuses and methods disclosed in U.S. Pub. No. 2021/0094861, which is assigned to the assignee hereof and is incorporated herein by reference in its entirety.

In another example fining embodiment, a fining vessel includes a housing that defines a fining chamber, and that has a roof, a floor, and an upstanding wall extending between the roof and the floor, and that further defines an inlet to the fining chamber and an outlet from the fining chamber. The fining vessel also includes a skimmer extending in a direction downwardly with respect to the roof of the housing towards the floor of the housing and further extending across the fining chamber between opposed lateral sidewalls of the upstanding wall. The skimmer has a distal free end that together with corresponding portions of the floor and upstanding wall defines a submerged passageway. A dissolvable fining material component is disposed directly beneath the skimmer, and comprises a mixture of a glass compatible base material and one or more fining agents. Such a finer may include one or more of the apparatuses and methods disclosed in U.S. Pub. No. 2021/0094856, which is assigned to the assignee hereof and is incorporated herein by reference in its entirety. A similar finer includes a plurality of nozzles supported in the floor of the housing directly beneath the skimmer, and being configured to dispense a carrier gas into the fining chamber, the carrier gas including a main gas that contains suspended particles of one or more fining agents. Such a finer may include one or more of the apparatuses and methods disclosed in U.S. Pub. No. 2021/0094858, which is assigned to the assignee hereof and is incorporated herein by reference in its entirety.

Downstream of the forehearth, the hot-end subsystem 30 includes a glass feeder that receives the fined and conditioned molten glass from the finer and produces a molten charge therefrom. The feeder may include a bowl or spout at a downstream end of the forehearth to accept molten glass from the forehearth, and a plunger to push molten glass out of the glass feeder spout. Also, the feeder may include an orifice ring being located at an outlet of the spout and cooperating with the plunger to control flow of and perhaps provide heat to the molten glass. In some embodiments, the feeder also may include shears below the orifice ring to cut the molten charge from the molten glass stream.

Downstream of the glass feeder, the hot-end subsystem 30 also may include molten glass handling equipment that may be shorter in vertical height than conventional gob handling equipment, and that may result in greater quality and less commercial variations in glass products. In a first example, a glass charge transporter can be located below the glass feeder, or laterally adjacent to the glass feeder, or even above the glass feeder. The transporter may include a transport cup can be formed of heat resistant material, for example platinum, graphite, and/or other suitable material, or combinations of various materials. The transport cup can be supported by a movable carrier that is configured to transport the molten glass portion away from the feeder axis to the glassware forming sub-system. For example, the carrier can transport the molten glass portion vertically, and/or laterally/horizontally away from the feeder axis, to the glassware forming sub-system. The movable carrier can support one or a plurality of transport cups.

In an additional example embodiment, the glass feeder may involve bottom-feeding of blank molds using vacuum and injection molding techniques. The glass feeder may include a spout, a circumferentially closed conduit in communication with the spout, and a feeder plunger to push a molten glass stream downward from the spout, through the circumferentially closed conduit and upward into a blank mold. This latter example of a glass feeder may include the subject matter disclosed in U.S. Patent Application Ser. No. 63/085,640, filed on Sep. 30, 2020 and which is assigned to the assignee hereof and is incorporated herein by reference in its entirety.

Notably, the glass feeder need not be, and preferably is not, a gob feeder, such that the feeder need not, and preferably does not, produce a freefalling gob. Likewise, the hot-end subsystem 30 need not, and preferably does not, include lengthy gob handling equipment (distributors, scoops, chutes, deflectors, and funnels) and related lubrication equipment. In contrast to a large positive vertical height differential (about fourteen feet or about 4.3 meters) between an outlet of a glass charge feeder and openings of forming molds required by conventional systems, the presently disclosed system may occupy zero to two feet (0 to 0.6 meters), including all ranges, subranges, values, and endpoints of that range, of positive vertical height to deliver the molten glass between a molten glass feeder and downstream forming molds. In fact, the distance between the outlet of the glass feeder and the inlets of the forming molds of the presently disclosed system may be negative such that the forming mold inlets may be located above the glass feeder outlet. Accordingly, the glass feeder may require an operational envelope of no more than one or two feet of vertical height, and perhaps zero positive height differential, between the finer and downstream forming molds. Consequently, the molten charge produced by the glass feeder of the present disclosure need not suffer from unequal cooling, damage, or deformity sometimes associated with significant contact with lubricant and gob handling equipment. In fact, the presently disclosed glass feeders and techniques result in molten charges that have relatively improved thermal homogeneity. This tends to result in fewer container commercial variations, and more consistent container wall thickness thereby requiring less container material, and reducing container weight and annealing time due to a thinner average wall thickness of the containers.

Downstream of the glass feeder, the hot-end subsystem 30 further includes forming molds to receive the gobs from the glass feeder and form the glassware from the glass charges. The forming molds may be part of a conventional individual section machine, or may be part of other types of forming machines. Downstream of the forming molds, the hot-end subsystem 30 includes glassware handling equipment, which may include takeout mechanisms to pick up and place the glassware on dead plates, and pushers to push the glassware off the dead plates and onto a conveyor of the glassware handling equipment so that the containers are conveyed downstream for further processing.

Moreover, the hot-end subsystem 30 may include an annealing lehr at the end of the conveyor to anneal the glassware. The annealing lehr may be a conventional lehr, or may be any other type of annealing equipment to anneal the glass containers.

Additionally, the hot-end subsystem 30 may include hot-end coating equipment along the conveyor to apply a protective coating to the glassware before it enters the annealing lehr. Notably, however, the hot-end subsystem 30 need not include conventional ancillary equipment including roof-mounted furnace ventilators, and a cullet hopper or bath in a basement.

Finally, the hot-end subsystem 30 may include a glassware manufacturing waste glass handling system, which can enable the glassware manufacturing system to be contained within a production building without a basement, and wherein cullet, process, and/or shear water can be collected and recycled within the system to minimize cost from environmental disposal. The waste glass handling system includes a sump pit in the forming floor, a waste liquid trench surrounding a glassware forming machine and flowing to the sump pit, and at least one of a cullet material handler or a molten waste glass sluice configured to receive molten glass from the molten glass feeder, hot glassware rejects from the glassware forming machine, and/or molten glass from the SCM furnace 48 and/or the finer. The forming floor may be sloped or crowned from the glassware forming machine to the waste liquid trench. The waste glass material handler may be at least partially recessed in a cullet trench, and may be mounted to the forming floor and disposed at a level of the forming floor. Liquid waste collected by the sump pit is recycled to the system. The waste glass handling system also may include an enclosure over the cullet trench to establish a cullet trench conduit, and steam removal ductwork in fluid communication with the cullet trench conduit to remove steam from the cullet trench conduit. The waste glass handling system further may include a cold cullet return conveyor carried by the forming floor configured to transport cold glassware rejects from a location downstream of an annealing lehr, and a reject conveyor configured to transport hot glassware rejects from the glassware forming machine to the waste glass material handler, and a hot mold charge chute configured to direct rejected mold charges from the glassware forming machine to the waste glass material handler. Because the waste glass handling system is carried by the forming floor, e.g., sits on an upper surface of the forming floor or is carried in a trench in the forming floor, there is no need for a traditional glass factory basement to accommodate waste glass handling equipment. For example, the waste glass handling system may include the waste glass handling system disclosed in U.S. Patent Application Ser. No. 63/085,644, filed on Sep. 30, 2020 and which is assigned to the assignee hereof and is incorporated herein by reference in its entirety. Additionally, recycled, scrap, and waste cullet can be crushed and returned to the feedstock handling subsystem via one or more cullet crushers and cullet return conveyors.

Unlike conventional glass furnaces, the SCM furnace 48 may be operated intermittently such that it need not be run continuously like a conventional glass furnace, although it could be run continuously. The SCM furnace 48 operates until it is desired to suspend operation for any of a number of reasons: to change color of the glass, to change base composition of the glass, to allow time to repair or change downstream forming equipment, or to interrupt production for downtime of any other type. For example, when it is desired to change from a first glass color to a second glass color different from the first, operation of the SCM furnace 48 can be stopped, the molten glass dumped out of the SCM furnace 48 for recycling during a subsequent production run of the first color. This may be facilitated via the cullet handling system discussed above, with or without additional use of a water-cooled roller to help create more surface area on the molten glass to speed cooling and make conveying easier. In any event, operation of the SCM furnace 48 can be restarted with fresh glass batch materials to produce the second color, without the typical operational issues associated with color changes in conventional glass furnaces. Molten glass can also be dumped from the finer and the forehearth through drains provided through sloped bottoms thereof and, again, this may be facilitated via the cullet handling system discussed above, with or without additional use of the water-cooled roller. Accordingly, use of the SCM furnace 48 facilitates a color change to be carried out in less than 30 hours (in contrast to three to five days for conventional arrangements), such that container color changes can be made much more frequently than ever before and there is no need to stockpile weeks or months of inventory of a particular color between color changes.

Turning now to the cold-end subsystem 32, this portion of the new glass factory 10 fits within a single story, and includes conveyors to carry the annealed glassware downstream of the lehr and to and between cold-end stations. The cold-end subsystem 32 may include a cold-end coating station to lubricate the glassware, and includes one or more inspection stations to inspect the coated glassware for any unacceptable commercial variations that result in glassware scrap. The cold-end subsystem 32 also includes scrap handling equipment to return the glassware scrap back to the upstream feedstock subsystem, a packaging station to package acceptable glassware together, a palletizing station to palletize the packaged glassware, and a warehouse to store pallets of packaged glassware. Notably, because there is no need to produce weeks or months of glassware stock of a given color with the new system, the cold-end subsystem 32 does not require a large conventional warehouse and instead, can include a finished glassware storage area on the order of 10% to 20% of the size of a typical warehouse at a glass factory.

The present disclosure provides a mobile and modular glass manufacturing system 11 that can be moved from one standard industrial location to another, completely unlike conventional glass manufacturing systems that require dedicated, customized, permanent glass factory installations. Also, the time to construct the presently disclosed new glass factory 10 is about three to six months. Accordingly, a permanent site and facility in a heavy industrial zone need not be purchased; rather, an existing site and facility for the system 11 can be temporarily leased in a light industrial zone, until it is desirable to relocate the system to another site and facility.

In conjunction with the above description of an illustrative embodiment of a glass factory 10 and glass manufacturing system 11, glassware may be produced by the following glass manufacturing process, which may or may not include all of the disclosed steps or be sequentially processed or processed in the particular sequence discussed, and the presently disclosed manufacturing process encompasses any sequencing, overlap, or parallel processing of such steps, and use of any suitable glass manufacturing system.

A glass manufacturing method includes submerged combustion melting of feedstock into molten glass, stilling the molten glass into stilled molten glass, streaming the stilled molten glass by gravity into a finer, and fining the molten glass into fined molten glass in the finer. The glass manufacturing method also may include conditioning the fined molten glass for downstream forming operations, producing a molten charge from the fined molten glass, wherein the molten charge is not a freefalling glass gob, transporting the molten charge in a manner that excludes use of gob chutes, and forming the molten charge into glassware. In an example embodiment, the transporting step includes feeding the molten charge directly from a glass feeder into a forming mold, and pushing molten glass out of the glass feeder and into and through a circumferentially closed conduit extending between and coupled to the forming mold to communicate molten glass to the forming mold.

Additionally, the glass manufacturing method further may include handling waste glass without using a basement below a forming floor, including collecting waste liquid in a sump pit in the forming floor, collecting waste liquid in a waste liquid trench surrounding a forming machine and flowing to the sump pit, and receiving molten glass streams from a glass feeder and hot glassware rejects from the forming machine in a waste glass handler on the forming floor. Further, the glass manufacturing method may include annealing the glassware, inspecting the glassware, and packaging the glassware. The entire method may be carried out in a volumetric envelope of less than 20,000 cubic meters and has a production capacity of about 110 tons of glass per day, for a capacity-adjusted size of less than 200 cubic meters per each ton of glass produced per day.

Turning now to a detailed description of an embodiment of a feedstock subsystem for the above-described glass manufacturing system, and first by way of additional background, a conventional glass factory includes a custom architectural installation specifically designed for glass manufacturing, and a glass manufacturing system supported and sheltered by the architectural installation. The conventional custom glass factory architectural installation includes a factory building that houses a glass furnace, glass container forming equipment, and the like. The installation also includes a feedstock subsystem that includes a "batch house" located outside of the factory building. The batch house towers over the factory building and is generally configured to receive and store feedstock or "glass batch" materials including glassmaking raw materials, for example, sand, soda ash, and limestone, and also including cullet in the form of recycled, scrap, or waste glass. The batch house is usually about seven stories tall, about 35 meters including above and below floor level, and includes a covered unloading platform and a pit to receive the glass batch from underneath railcars or trucks that arrive loaded with glass batch materials. The batch house also includes multi-story silos to store the glass batch, and glass batch elevators and conveyors to move the glass batch from the unloading systems at bottom of the pit to tops of the silos. The batch house further includes cullet pads at ground level to receive and store cullet, crushers to crush cullet to a size suitable for melting, and cullet elevators and conveyors to move crushed cullet to one of the silos in the batch house. The batch house additionally includes a mixer to mix the glass batch received from the silos, conveyors integrated with scales to weigh and deliver each glass batch material from the silos to the mixer, mixer conveyors to move the glass batch from the mixers to the hot-end subsystem, and dust collectors to collect dust from the various equipment.

The batch house requires a specialized, dedicated, and permanent architectural installation including a pit, and a two to three story building. The time to construct a new glass batch house of the conventional type is about one to two years. And a conventional batch house cannot be relocated from one location to another. The batch house installation occupies a large footprint on the order of 530 square meters, and a large volumetric envelope on the order of 18,600 cubic meters. A batch house installation of this size typically supports a conventional glass manufacturing system with a production output of about 140 tons of glass per day. Accordingly, a capacity-adjusted size of the batch house can be characterized by the volumetric envelope of the batch house divided by the production output enabled by the batch house, which is about 133 cubic meters per each ton of glass produced per day.

Although conventional glass manufacturing batch houses and methods enable efficient production of high-quality products for large-scale production runs, the presently disclosed subject matter introduces a revolutionary glass feedstock subsystem or "batch house" that has a volumetric envelope that is significantly reduced compared to that of conventional batch houses, includes prefabricated modular equipment configurations to facilitate easier installation, and removal and relocation, and may omit one or more conventional batch house subsystems or aspects thereof, as described in further detail below.

With reference to FIGS. A-1 and A-2, a new glass feedstock subsystem or "batch house" A-10 is illustrated and described, with reference to a glass container factory A-12 as an example. Those of ordinary skill in the art would recognize that other glass factories, for example, for producing glass fibers, glass display screens, architectural glass, vehicle glass, or any other glass products, share many aspects with a glass container factory. Accordingly, the presently disclosed and claimed subject matter is not limited to use with glass containers, glass container manufacturing systems, and glass container factories and, instead, encompasses any glass products, glass product manufacturing systems, and glass product factories.

As shown in an example embodiment in FIGS. A-1 and A-2, the batch house A-10 includes an architectural installation A-14 and a batch handling system A-16 supported and sheltered by the installation A-14. The installation A-14 includes a concrete foundation A-18 having a floor A-20 generally having a four to six inches thick mat or slab. The installation A-14 requires no basement and no pit below the floor A-20, and also includes a factory building or enclosure A-22 on the foundation A-18 including walls A-24 and a roof A-26. The installation A-14 is less than three stories and, more specifically, is less than A-15 meters in height above a floor of the installation A-14. The feedstock subsystem A-10 is configured to receive and store feedstock or "glass batch" materials. The glass batch materials include glassmaking raw materials, like sand, soda ash, and limestone, and also may include cullet in the form of recycled, scrap, or waste glass. The feedstock subsystem A-10 does not require conventional batch house elevators, mixers, and/or the like.

The batch house A-10 or feedstock building A-22 occupies a footprint and volumetric envelope much smaller than that of conventional batch houses. The feedstock building A-22 occupies a footprint of about 3,500 square feet or about 325 square meters, and a volumetric envelope of about 189,000 cubic feet or about 5,350 cubic meters. The production output of molten glass that is enabled by a batch house this size is about 110 TPD, such that a capacity-adjusted size of the presently disclosed batch house A-10 can be characterized by the volumetric envelope of the presently disclosed system divided by the production output of the system. For example, the feedstock building A-22 size of 5,350 cubic meters is divided by 110 TPD for a capacity-adjusted size of about 49 cubic meters per each ton of glass produced per day.

With reference to FIG. A-1, the batch handling system A-16 includes pneumatic input conduit A-28 that may extend through one or more walls A-24 of the batch house enclosure A-22 for accessibility to batch transporters, e.g., trucks or rail cars, that bring batch materials to the batch house A-10. The input conduit A-28 has any suitable couplings for coupling to batch transporters in a pneumatically sealed manner, wherein the batch transporters may have pumps, valves, and/or other equipment suitable to pressurize the input conduit A-28 to push batch material into the batch house A-10 and/or the batch handling system A-16 may include pumps, valves, and/or other equipment suitable to apply vacuum to the input conduit A-28 to pull batch material into the batch house A-10.

With reference to FIG. A-2, the batch handling system A-16 includes pneumatic output conduit A-30 that may extend through one or more walls A-24 or the roof A-26 of the enclosure A-22 for transmission to a hot end subsystem A-32 of a glass manufacturing system A-34.

With reference to FIG. A-3, the pneumatic output conduit A-30 is schematically shown coupled to a portion of the hot end subsystem A-32 and is preferably sealingly coupled thereto. For example, the hot end subsystem A-32 may include a receiver hopper A-36, a mixer A-38 in downstream communication with the receiver hopper A-36, a vessel or day bin A-40 in downstream communication with the mixer A-38, a batch charger A-42 in downstream communication with the day bin A-40, and a glass melter A-44 in downstream communication with the batch charger A-42 to receive batch materials from the batch charger A-42 and melt the batch materials into molten glass. The schematically illustrated batch charger A-42 is a top feed charger that dumps batch material into an opening in a roof A-46 of the glass melter A-44. In another embodiment, however, the batch charger A-42 may include a below-melt charger that extends through a side wall, a bottom wall, or a lower corner wall of the glass melter A-44. In yet another embodiment, the batch charger A-42 may be a top feed charger that is configured to feed batch material through a sidewall or a roof of an alcove appended to an upstream portion of the glass melter A-44. The output conduit A-30 has any suitable couplings for coupling to the receiver hopper A-36 in a pneumatically sealed manner.

With reference to FIGS. A-3 and A-4, the batch handling system A-16 includes a base frame A-48 establishing a habitable first or lower level A-50 of the system A-16 and including columns A-52 extending upwardly from the foundation A-18, cross members A-54 connecting the columns A-52, and obliquely angled supports A-56 between at least some of the columns A-52. The base frame A-48 spans a majors section A-58 of the system A-16, a minors section A-60 of the system A-16, and a transmission section A-62 of the system A-16. As used herein, the term "habitable" means that there is standing room for an adult human in the particular space involved and there is some means of ingress/egress to/from the space while walking such as a doorway, stairway, or the like.

In the majors section A-58, the system A-16 also includes a dosing equipment frame A-64 carried on the base frame A-48 to carry silo dosing equipment A-66 and including lower and upper cross members A-68, vertical columns A-70 therebetween, and obliquely angled supports A-72 between at least some of the columns A-70. Also in the majors section A-58, the system A-16 further includes a silo array A-74 carried on the dosing equipment frame A-64 and including a plurality of silo modules A-76.

With additional reference to FIGS. A-5 through A-8, each silo module A-76 includes a frame A-78 that may have dimensions less than or equal to maximum interior dimensions of an intermodal freight container and including longitudinally extending corner columns A-80, a base A-82 including horizontally extending base cross-members A-84, a silo platform A-86 including horizontally extending platform cross-members A-88, a panel A-90 coupled to the platform cross-members A-88, and one or more brackets A-91 coupled to the side wall A-92 of the silo A-94 and to cross members A-84 of the frame A-78. Each silo module A-76 also includes a silo A-94 carried within the frame A-78 and including a body A-96 having a body lower end A-98 and a body upper end A-100, and a spout A-102 coupled to the body lower end A-98 and including a spout lower end A-104, as well as pneumatic conduit A-106 longitudinally carried at each corner of the frame A-78, and utilities A-108 coupled to the upper end A-100 of the silo A-94 and including a filter A-110, a pressure relief valve A-12, pneumatic conduit A-114, and a level gauge A-116. Each silo module A-76 may be pre-assembled, for example, at an equipment fabricator, and then shipped from the fabricator to a glass product manufacturer in an intermodal freight container, and then erected on site at the product manufacturer. As shown in FIG. A-8, a silo module A-76 may be carried on a pallet A-118 suitable for use in an intermodal freight container. Frames A-78 of adjacent modules A-76 are coupled together to connect the array A-74, and an uppermost level A-120 of the array A-74 may be habitable.

With additional reference to FIG. A-9, the inlet conduit A-28 extends upwardly to an upper portion A-122 of the batch house A-10 to an upper portion A-124 of a plurality of majors silos A-76. The inlet conduit A-28 is routed to particular silos A-94 in some cases directly, and in other cases, via upstream branches that direct flow of batch material to downstream valves and inlets of multiple silos. Five inlet conduits A-126 through A-134 are illustrated and correspond to sand, soda, limestone, alumina, and saltcake, i.e., major materials or "majors" for glassmaking. The sand inlet conduit A-126 is directed to four silos, the soda inlet conduit A-128 is directed to three silos, the limestone inlet conduit A-130 is directed to two silos, the alumina inlet conduit A-132 is directed to one silo, and the saltcake inlet conduit A-134 is directed to one silo. A twelfth silo is a dust recovery silo A-136 that is not coupled to the inlet conduit A-28 but is coupled to an internal conduit A-138 that receives recovered dust from other equipment of the batch handling system A-16. The silos A-94 are coupled to dosing equipment A-66 that is carried by the dosing equipment frame A-64 beneath the silo array A-74 and that is connectable to a movable batch dosing container or transport bin A-140 to dose appropriate amounts of batch materials into the transport bin A-140.

With reference to FIG. A-10, the dosing equipment A-66 may be supported by the dosing equipment frame A-64 by brackets A-142 and includes a receiver A-144 for coupling to the spout A-102 of the lower end A-100 of a corresponding silo A-94, and conduit, valve(s), augers, and/or other equipment suitable to move and dose batch material to docking equipment that is adapted to dock the dosing equipment A-66 to the transport bin A-140 to allow flow of batch material from the dosing equipment A-66 to the transport bin A-140 without being exposed or open to the surrounding environment. The transport bin A-140 may include one or more normally closed closures A-146 at a bin inlet A-148 to prevent the batch material in the transport bin A-140 from being open to the surrounding environment. The door A-150 is shown as open for illustrative purposes.

With reference to FIG. A-11, the transport bin A-140 is shown carried by a transport bin cradle A-152 supported on a frame or table A-154 separate from the cradle A-152 and having a platform A-156 and legs A-158 depending from the platform A-156 to support the platform A-156. The cradle A-152 may be supported on a weigh scale A-160, which in turn is supported on the table A-154.

With reference to FIG. A-4, the system A-16 also includes an automatically guided vehicle (AGV) A-162 separate from the table A-154. The AGV A-162 is traversable between the legs A-158 of the table A-154 and under the platform A-156 of the table A-154, and is raisable from a lowered position to lift the table A-154 with the scale A-160 and transport bin A-140 and cradle, and carry and move same among locations under the silos A-94 and dosing equipment A-66 to receive batch material from the silos A-94 via the dosing equipment A-66, and to further move the transport bin A-140 to the minors section A-60 of the system A-16 to receive minors therefrom, and, ultimately, to move the transport bin A-140 to a transmission station. Of course, the AGV A-162 is lowerable, for example, to move around without the transport bin A-140.

With reference to FIGS. A-12 and A-13, a fragmentary portion of the minors section A-60 is shown and includes the base frame A-164 housing minors small bag unloaders A-166, a minors dosing equipment module A-168 carried on the base frame A-164 and partially establishing a habitable second or intermediate level A-170 of the minors section A-60 of the system A-14, and a minors container module A-172 carried on the minors dosing equipment module A-168 and establishing a habitable third or upper level A-174 of the minors section A-60 of the system A-16.

Each minors container module A-172 includes a frame A-176 with dimensions less than or equal to maximum interior dimensions of an intermodal freight container and including lower and upper cross members A-178, vertical columns A-180 therebetween, and obliquely angled supports A-182 between at least some of the columns A-180, and a container platform A-184 supporting the containers A-186. Each container module A-172 also may include a plurality of containers A-186 carried within the frame A-176 in a partial circumferential array A-188 wherein the containers A-186 receive minors from the minors unloaders A-166 via pneumatic conduit A-190 that include any suitable couplings for coupling to the unloaders A-166 and the container modules A-172 in a pneumatically sealed manner. The containers A-186 include bodies A-192 having body lower ends A-194 and a body upper ends A-196, and spouts coupled to the body lower ends A-194 and including spout lower ends, and utilities A-198 coupled to the upper ends A-194 of the containers A-186 and including filters, pressure relief valves, pneumatic conduit, and level gauges.

Each minors dosing module A-168 includes a frame A-200 with dimensions less than or equal to maximum interior dimensions of an intermodal freight container and including lower and upper cross members A-202, vertical columns A-204 therebetween, and obliquely angled supports A-206 between at least some of the columns A-204, and an equipment platform A-208 carried by the cross members A-202 and supporting minors dosing equipment A-210. The minors dosing equipment A-210 is supported by the dosing equipment frame A-200 and includes a receiver A-212 for coupling to the spout A-102 of the lower end A-98 of a corresponding silo A-94, and conduit, valve(s), and augers, and/or other equipment suitable to move and dose batch material to docking equipment that is adapted to dock the dosing equipment A-210 to the transport bin to allow flow of batch material from the dosing equipment A-210 to the transport bin A-140 without being exposed or open to the surrounding environment.

Corner columns and/or cross-members of adjacent minors container and dosing equipment modules A-168, A-172 are coupled together and partial circumferential container and dosing equipment arrays A-214, A-216 establish a complete circumferential array A-218 as shown in FIG. A-14. The array of minors containers may be adjacent to the array of majors silos in a downstream direction.

With reference to FIG. A-15, a small bag unloader module A-220 includes a frame A-222 with dimensions less than or equal to maximum interior dimensions of an intermodal freight container and including lower and upper cross members A-224, vertical columns A-226 therebetween, and obliquely angled supports A-228 between at least some of the columns A-226, and a bag unloader platform A-230 supporting one or more bag unloaders A-166 and associated pneumatic transfer conduit and equipment A-232 constituting one or more pneumatic conveying stations A-234 that pneumatically convey batch material minors to the array of minors containers A-218.

Similarly, with reference to FIG. A-16, a big bag or bulk unloader module A-236 includes a frame A-238 with dimensions less than or equal to maximum interior dimensions of an intermodal freight container and including lower and upper cross members A-240, vertical columns A-242 therebetween, and obliquely angled supports A-244 between at least some of the columns A-242, and a bulk unloader platform A-246 supporting one or more bulk unloaders A-248 and associated pneumatic transfer conduit and equipment A-250.

Likewise, with reference to FIGS. A-17 and A-18, control room and electrical room modules A-252, A-254 include frames A-256, A-258 with dimensions less than or equal to maximum interior dimensions of an intermodal freight container and including lower and upper cross members A-260, A-262, vertical columns A-264, A-266 therebetween, and obliquely angled supports A-268, A-270 between at least some of the columns A-264, A-266, and platforms A-272, A-274 supporting control panels and associated equipment A-276, A-278.

With additional reference to FIG. A-19, multiple modules A-168, A-254 may be carried, for example, end to end, on a pallet A-280 suitable for use in an intermodal freight container.

With reference to FIG. A-20, the AGV A-162 is configured to move the transport bin A-140 among locations under the minors containers A-186 and dosing equipment A-210 to receive batch material from the minors containers A-186 via the dosing equipment A-210, and to further move the transport bin A-140 to the transmission station A-62. The minors may include magnesium, potassium, sulfur, chromium, iron, cobalt, titanium, barium, strontium, nickel, chromium, manganese, copper, tin, bismuth, carbon, selenium, and/or vanadium.

With reference to FIG. A-21, an example flow path A-282 of the AGV A-162 and transport bin A-140 is illustrated. In the example flow path A-282, and among the majors, alumina is collected first, sand is collected second, limestone is collected third, saltcake is collected fourth, recycled dust is collected fifth, and soda is collected sixth. In the example flow path A-282, and following collection of the majors, minors are collected last at one or both of two stations each corresponding to one half of the circumferential minors container array A-218. Then the AGV A-162 carries the transport bin A-140 to the transmission station A-62 for transmission through the outlet conduit A-30 to the hot end A-32 of the glass manufacturing system A-34.

With reference to FIGS. A-22 and A-23, a transmission section A-62 of the system A-16 includes a batch transmission station A-284. The station A-284 may include a transfer bin handler A-286 including a transfer bin elevator A-288 including elevator columns A-290 and an elevator carriage A-292 translatable along the elevator columns A-290 and carrying movable pins, and a transfer bin conveyor A-294 including conveyor rails A-296 and a conveyor pallet A-298 translatable along the conveyor rails A-296 and carrying stationary locators. The station A-284 also includes a pneumatic hopper A-302 that may be located below the transfer bin conveyor A-294 and having a sealingly closeable inlet A-304, and a pneumatic conveying sub-system A-306 including an air pump, valves, and/or other equipment suitable to pressurize and push batch material to a downstream location. A pneumatic conduit A-308 may be coupled to the air pump and/or to the pneumatic hopper A-302 to convey bulk material out of the pneumatic hopper A-302 and through the outlet conduit A-30. The pneumatic hopper A-302 includes the normally closed inlet A-304 that is configured to receive batch material from a normally closed outlet of the transport bin A-140. The transport bin A-140 and/or the pneumatic hopper A-302 include one or more actuators or other devices suitable to open the normally closed inlet A-304 and outlet. Although the illustrated embodiment includes the separate pneumatic hopper A-302 to convey batch material downstream, in other embodiments, the transport bin A-140 can be adapted similarly to the pneumatic hopper A-302 such that it is configured to convey batch material downstream through the outlet conduit A-30 directly from the transport bin A-140.

Those of ordinary skill in the art would recognize that the batch handling system A-16 is pneumatically closed between the pneumatic input conduit A-28 and the pneumatic output conduit A-30. This is in contrast to conventional systems where batch material is open to the surrounding environment. The phrase "pneumatically closed" means that the path, and the batch materials following that path, from inlet conduit A-28 to outlet conduit A-30 is/are enclosed, although not necessarily always sealed air-tight, and not openly exposed to the surrounding environment.

Moreover, although the drawings illustrate a 3×4 array configuration of twelve silo modules, the presently disclosed modular designs permit larger or smaller arrays, for example, 2×3, 4×6, or any other desired array size and configuration. Likewise, although the drawings illustrate a circular array of six minors containers, the presently disclosed modular designs permit larger or smaller arrays, for example, a square array of four minors containers, a matrix array of two rows of four minors containers for a total of eight minors container, or any other suitable configuration and size array. Additionally, the modules A-168, A-172, A-220, A-236, A-252, A-254 may share common exterior dimensions such that the modules A-168, A-172, A-220, A-236, A-252, A-254 can be carried together on a common pallet A-118, A-280, and can be easily aligned with one another to facilitate positioning and assembling them together on site. In fact, many of the modules may have identical exterior dimensions. In this regard, each of FIGS. A-3, A-4, A-13, A-14, and A-19 are to scale. Additionally, those of ordinary skill in the art will recognize various other characteristics of the modules A-168, A-172, A-220, A-236, A-252, A-254, and other aspects of the system A-16, from the drawings themselves.

There thus has been disclosed a glass manufacturing system and method, that fully satisfy one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A glass manufacturing system, comprising:
   a hot-end subsystem, including:
      a submerged combustion melting furnace that melts feedstock to produce molten glass;
      a finer that receives and refines the molten glass from the submerged combustion melting furnace to produce fined molten glass;
      a forehearth that conditions the fined molten glass to a uniform temperature and viscosity for downstream forming operations;
      a glass feeder that receives the conditioned molten glass from the forehearth and produces a molten charge therefrom;
      a forming machine including a forming mold that receives the molten charge and forms glass product from the molten charge; and
      an annealing lehr that receives and anneals the glass product; and
   a cold-end subsystem, including:
      an inspection station downstream of the annealing lehr; and
      a packaging station downstream of the inspection station
   wherein the hot-end subsystem and the cold-end subsystem produce between 95 and 126 tons of glass per day, and are encompassed by an installation having a capacity-adjusted size of less than 440 cubic meters per each ton of glass produced per day.

2. The glass manufacturing system set forth in claim 1, further comprising:
   a feedstock subsystem, including:
      a batch material storage sub-system;
      a batch material transfer sub-system; and
      a batch material transmission sub-system to transmit batch material from the feedstock subsystem to the hot-end subsystem,
   wherein the capacity-adjusted size is less than 200 cubic meters per each ton of glass produced per day.

3. The glass manufacturing system set forth in claim 1, wherein the glass feeder is not a gob feeder and does not produce a freefalling gob.

4. The glass manufacturing system set forth in claim 1, wherein the glass feeder feeds the molten glass directly into the forming mold.

5. The glass manufacturing system set forth in claim 4, wherein the glass feeder cuts the molten glass upstream of the forming mold to establish the molten charge in the forming mold.

6. The glass manufacturing system set forth in claim 1, wherein a vertical height differential between an outlet of the glass feeder and an open end of the forming mold is less than three meters.

7. The glass manufacturing system set forth in claim 1, wherein the installation has a maximum length less than about 70 meters, a maximum width less than about 20 meters, and a maximum height less than about 15 meters.

8. A glass factory comprising:
the glass manufacturing system set forth in claim 1; and
an architectural installation including:
a forming floor carrying the forming machine,
walls,
a roof, and
excluding a basement.

9. The glass factory set forth in claim 8, wherein the architectural installation includes a light industrial building.

10. The glass manufacturing system set forth in claim 1, wherein the hot-end subsystem and the cold-end subsystem produce between 100 and 120 tons of glass per day, and wherein the capacity-adjusted size is less than 300 cubic meters per each ton of glass produced per day.

11. The glass manufacturing system set forth in claim 1, further comprising a feedstock subsystem.

12. A glass factory comprising:
the glass manufacturing system set forth in claim 11; and
an installation including
a feedstock building that includes a foundation, walls, and a roof, wherein the height of the feedstock building is less than seventeen meters tall.

13. The glass factory of claim 12, wherein the installation also includes a factory building that includes a forming floor carrying the forming machine, walls, and a roof, wherein the height of the factory building is less than thirteen meters tall.

14. The glass factory of claim 13, wherein the forming floor includes a four to six inch thick slab and one or more isolation slabs less than four feet thick.

15. A glass factory comprising:
the glass manufacturing system set forth in claim 1; and
an installation including a factory building that includes a forming floor carrying the forming machine, walls, and a roof, wherein the height of the factory building is less than thirteen meters tall.

16. The glass factory of claim 15, wherein the forming floor includes a four to six inch thick slab and one or more isolation slabs less than four feet thick.

* * * * *

UNITED STATES PATENT AND TRADEMARK OFFICE
CERTIFICATE OF CORRECTION

PATENT NO. : 11,912,608 B2
APPLICATION NO. : 17/061302
DATED : February 27, 2024
INVENTOR(S) : Scott Weil et al.

It is certified that error appears in the above-identified patent and that said Letters Patent is hereby corrected as shown below:

In the Specification

Figure 11:
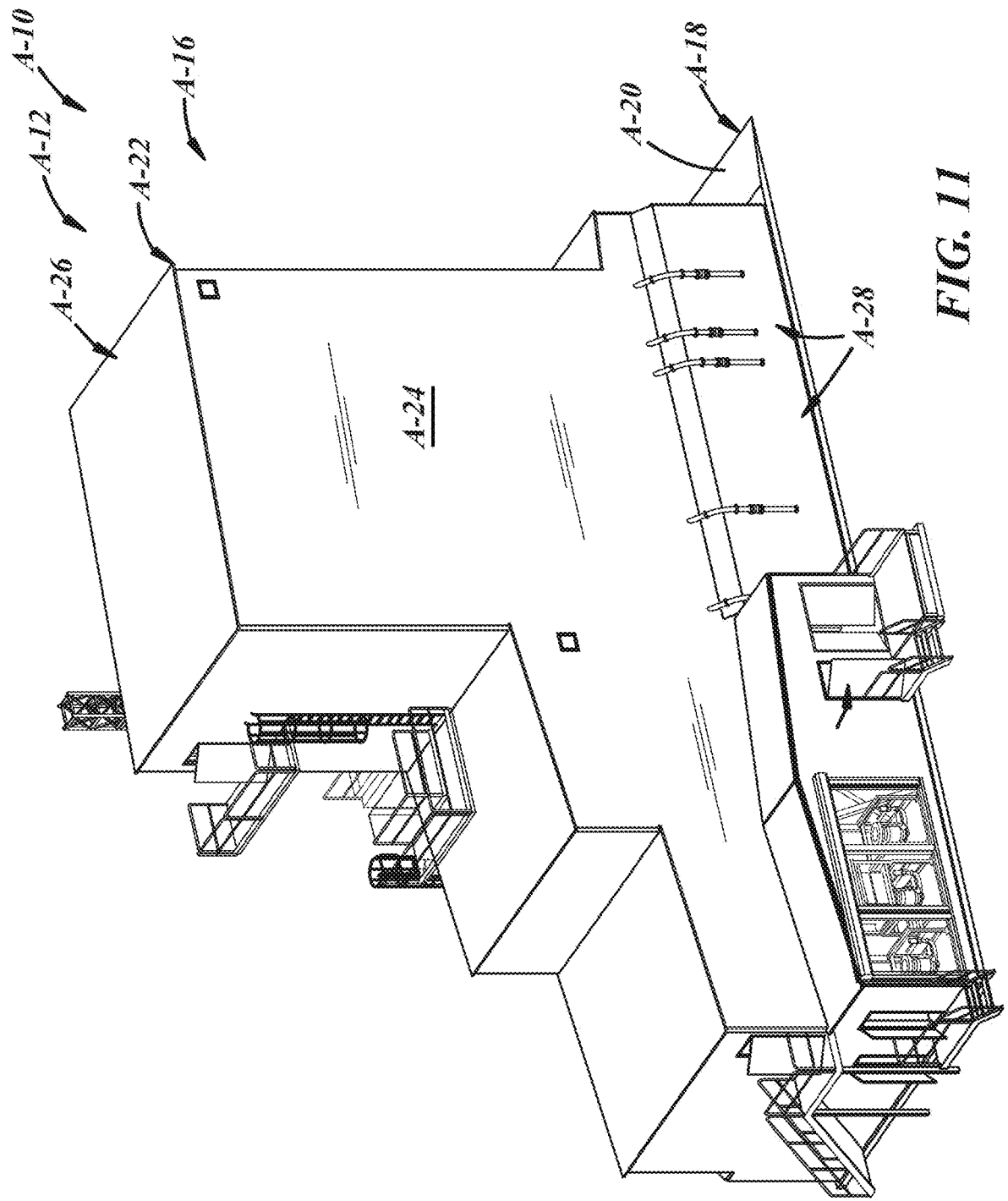
FIG. 11 illustrates an upper front perspective view of a feedstock subsystem of a glass manufacturing system according to an illustrative embodiment of the present disclosure.
Figure 12:
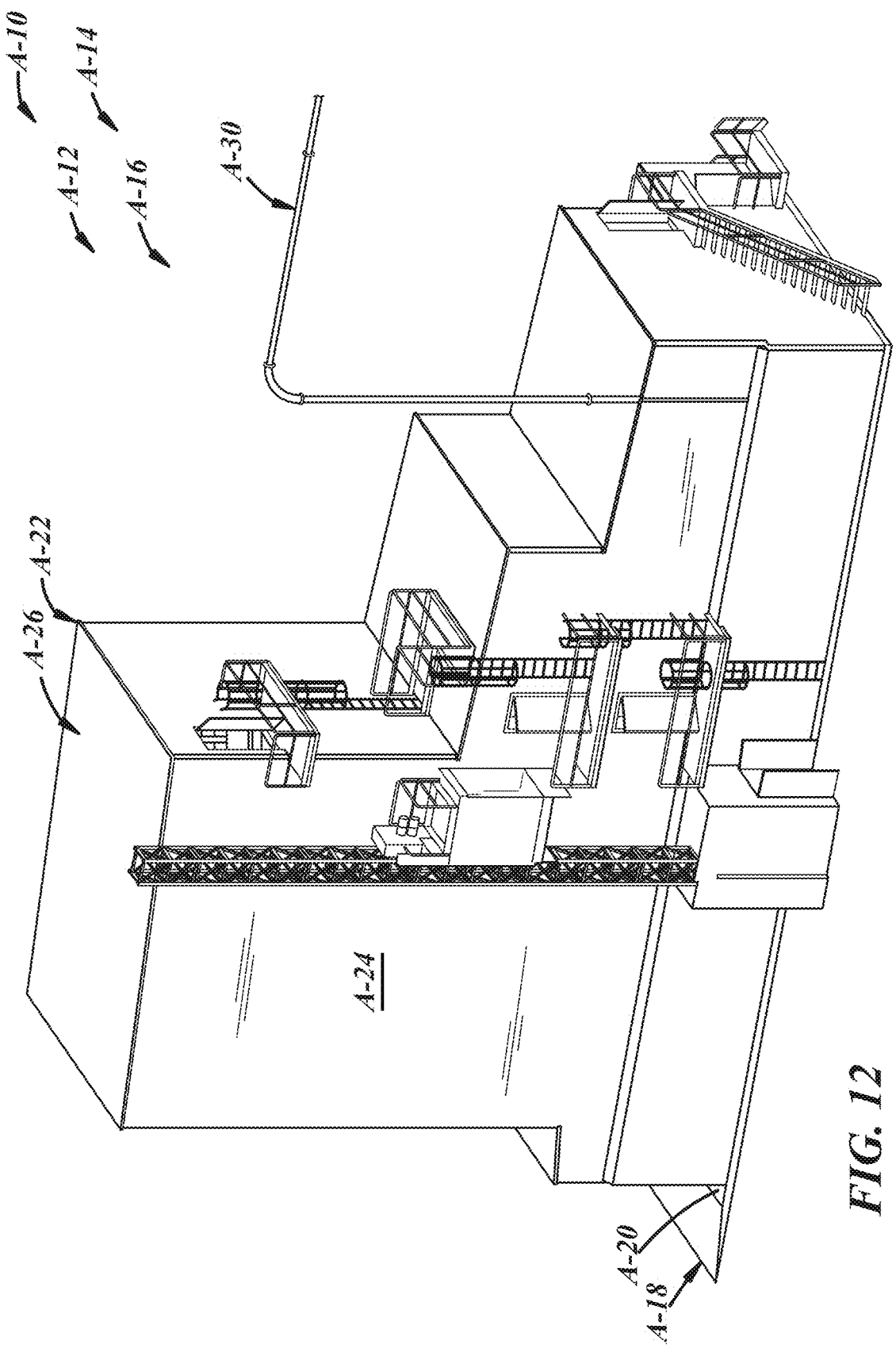
FIG. 12 illustrates an upper rear perspective view of the feedstock subsystem of FIG. 11.
Figure 13:
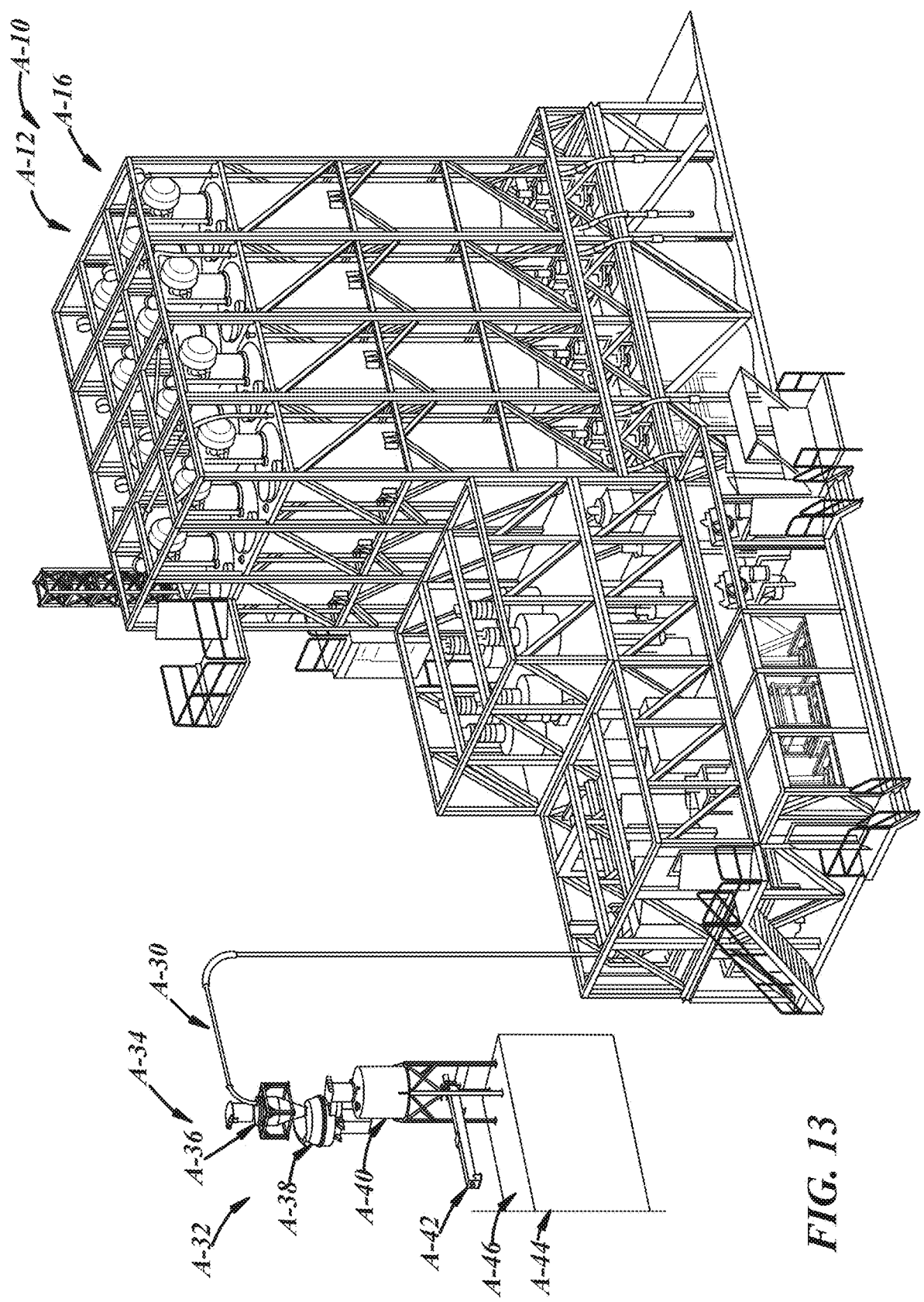
FIG. 13 illustrates an upper front perspective view of the feedstock subsystem of FIG. 11 with an enclosure removed therefrom and also illustrating a portion of a hot-end subsystem of the glass manufacturing system.
Figure 14:
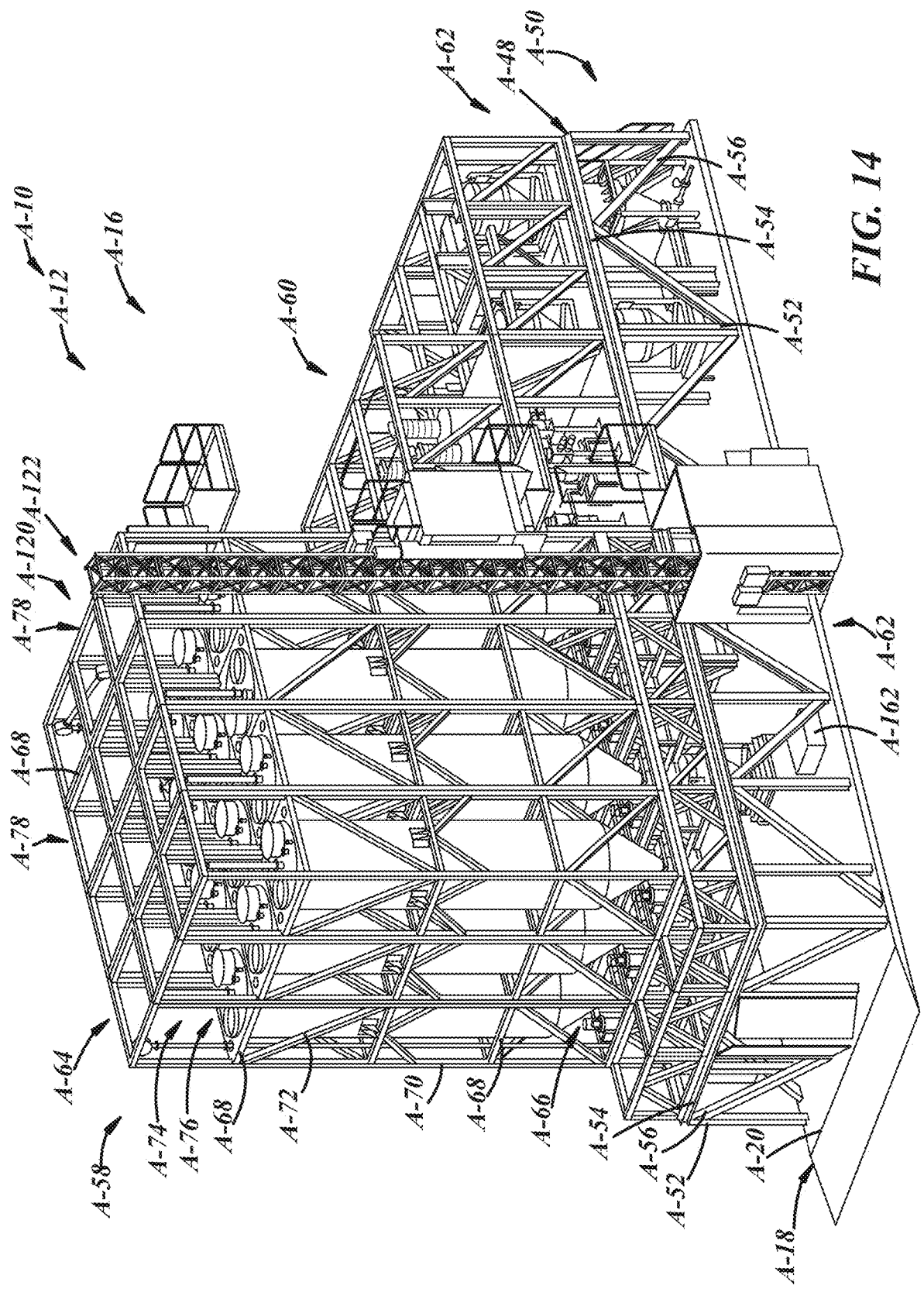
FIG. 14 illustrates an upper rear perspective view of the feedstock subsystem of FIG. 11 with the enclosure removed therefrom.
Figure 15:
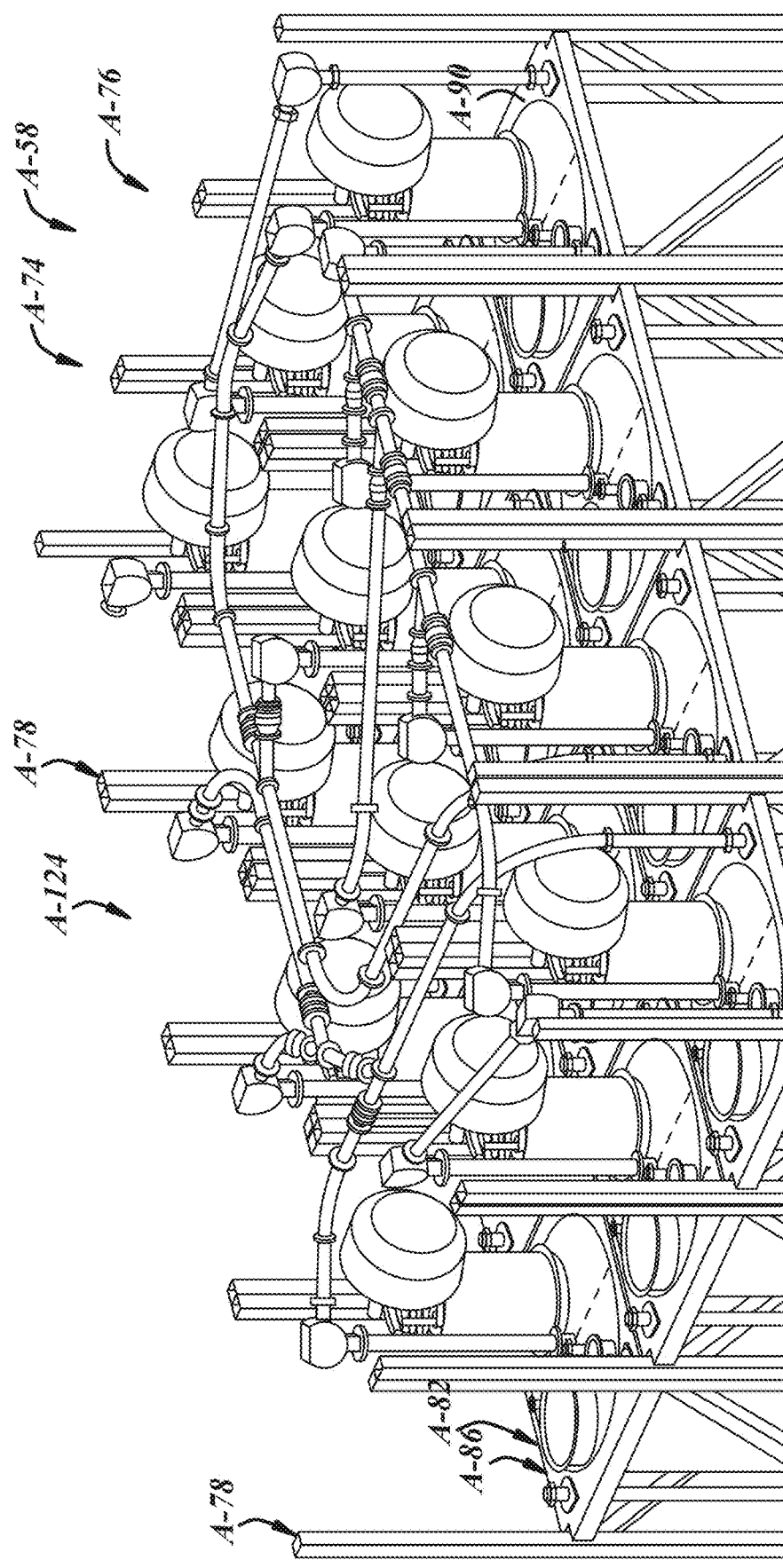
FIG. 15 illustrates a fragmentary perspective view of an upper portion of a majors silo array of the feedstock subsystem of FIG. 11.
Figure 16:
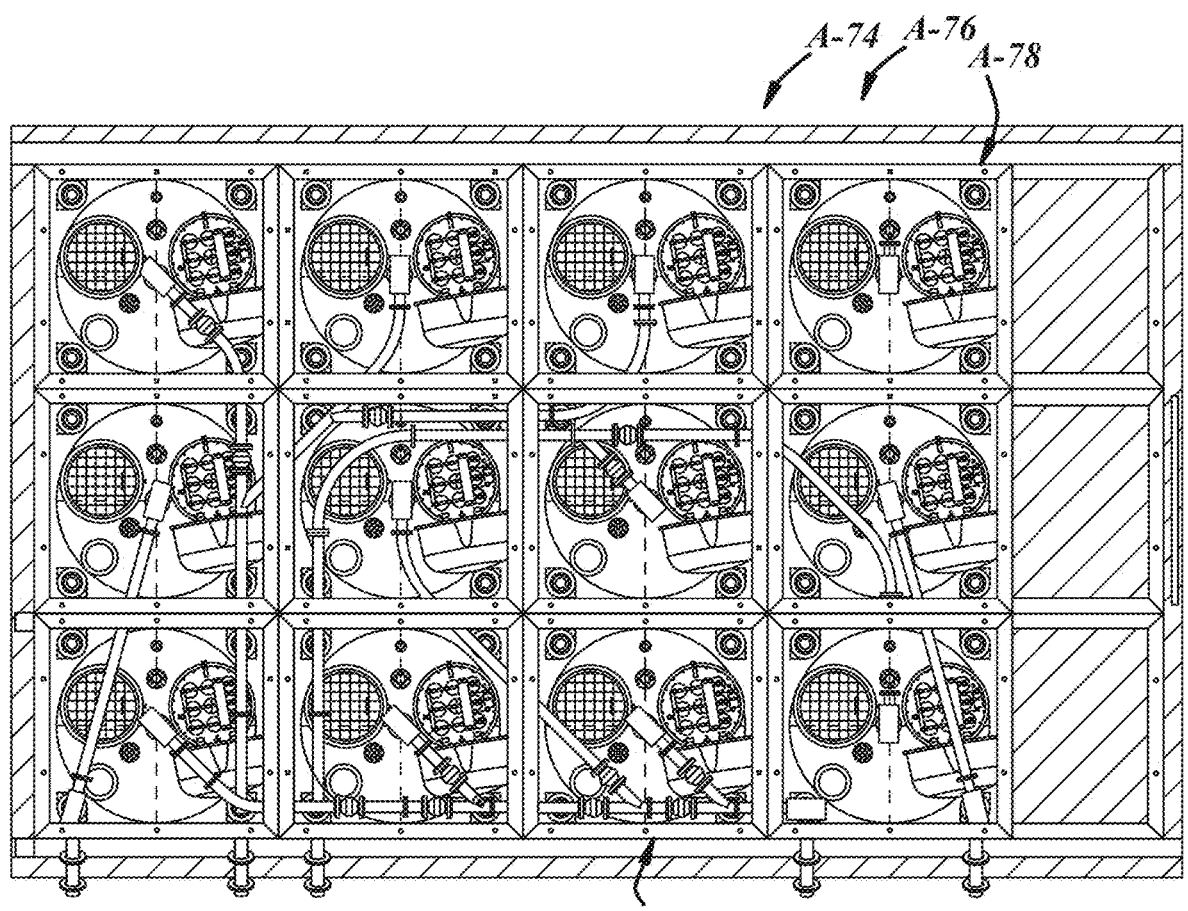
FIG. 16 is a top view of the majors silo array shown in FIG. 15.
Figure 17:
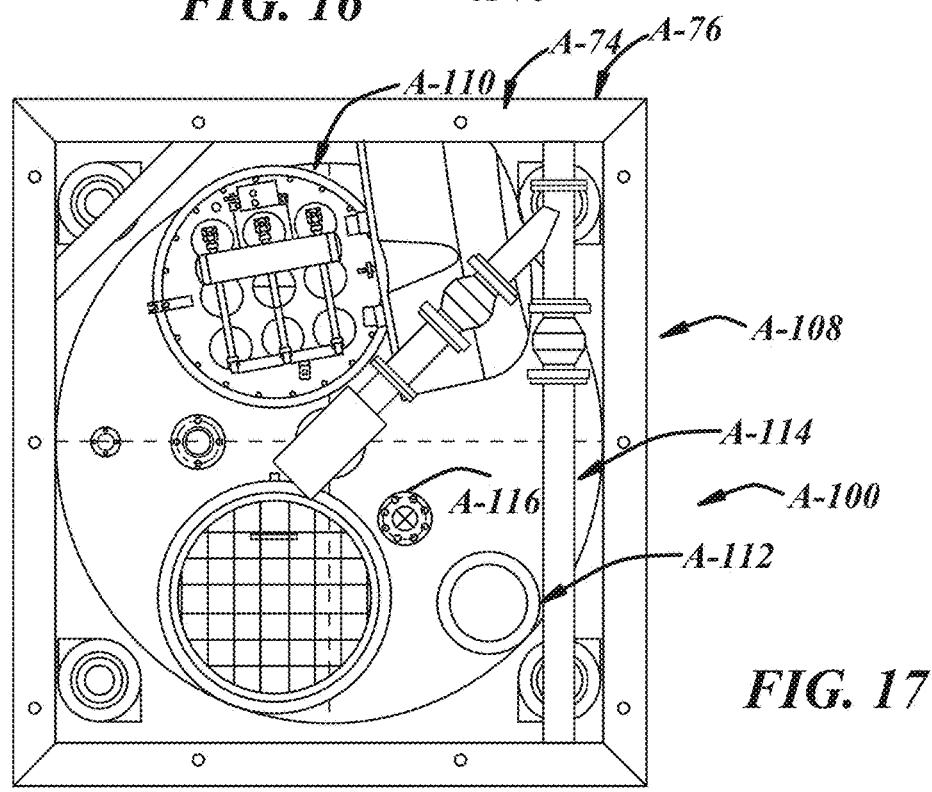
FIG. 17 is an enlarged top view of a major's silo of the major's silo array shown in FIG. 16.
Figure 18:
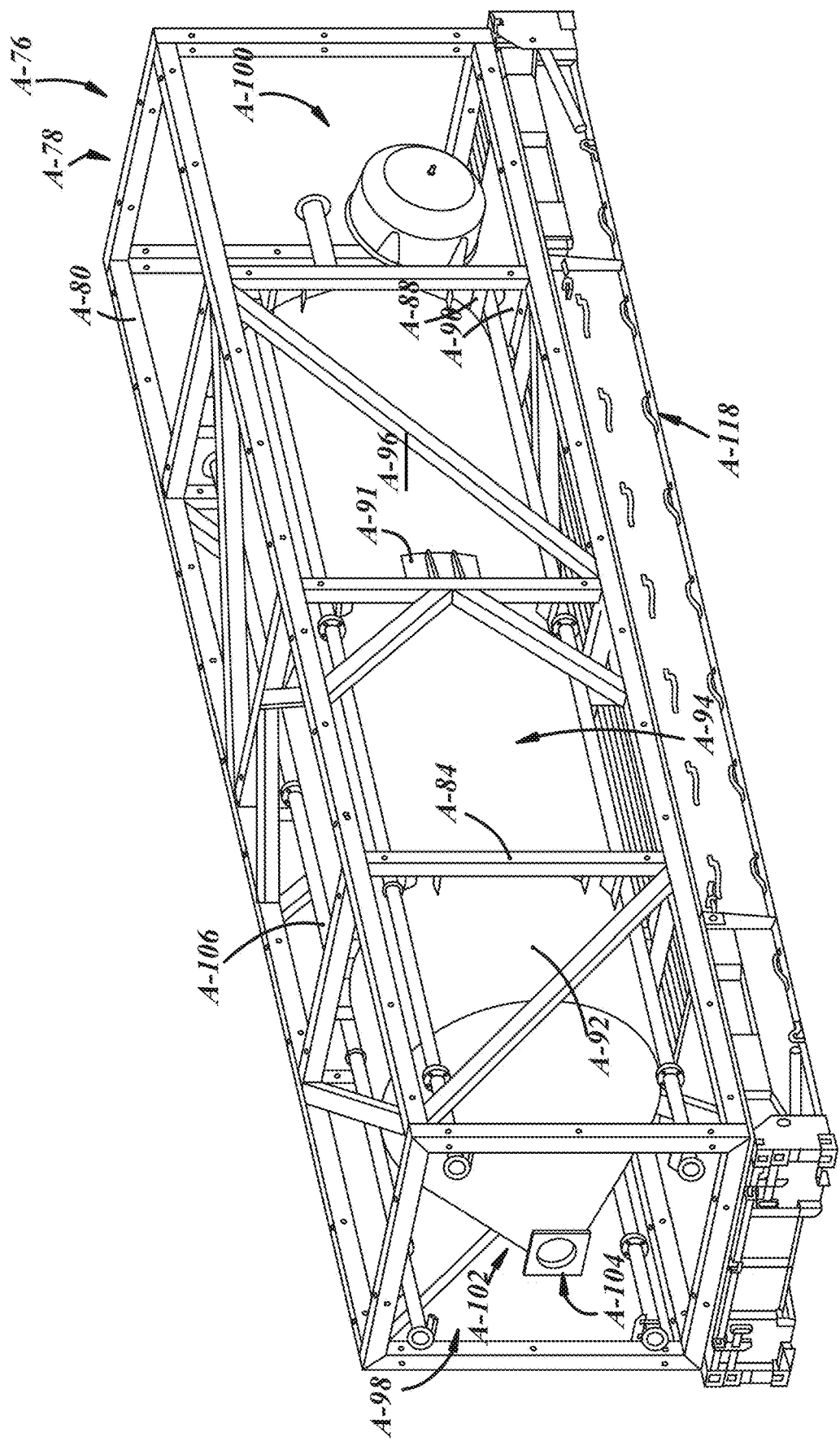
FIG. 18 is a perspective view of a major's silo carried on a pallet.
Figure 19:
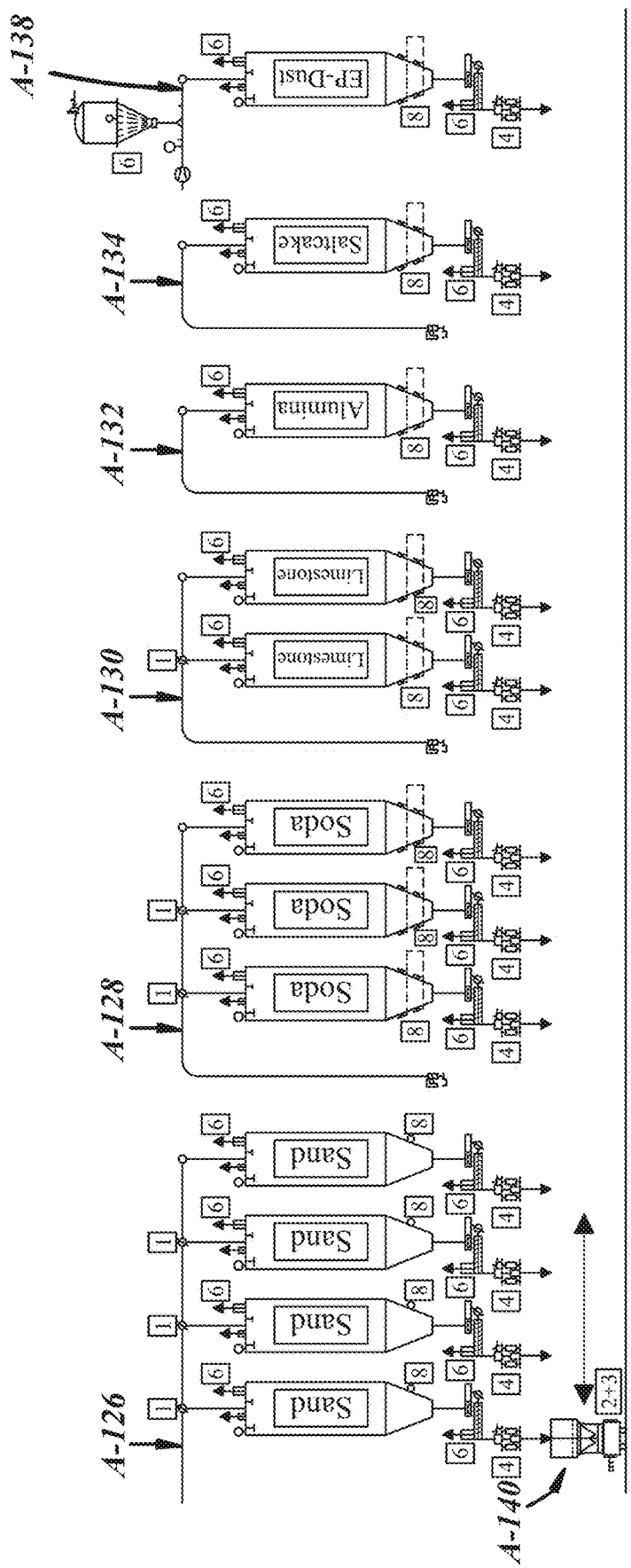
FIG. 19 is a fragmentary schematic view of a major's section of the feedstock subsystem of FIG. 11.
Figure 20:
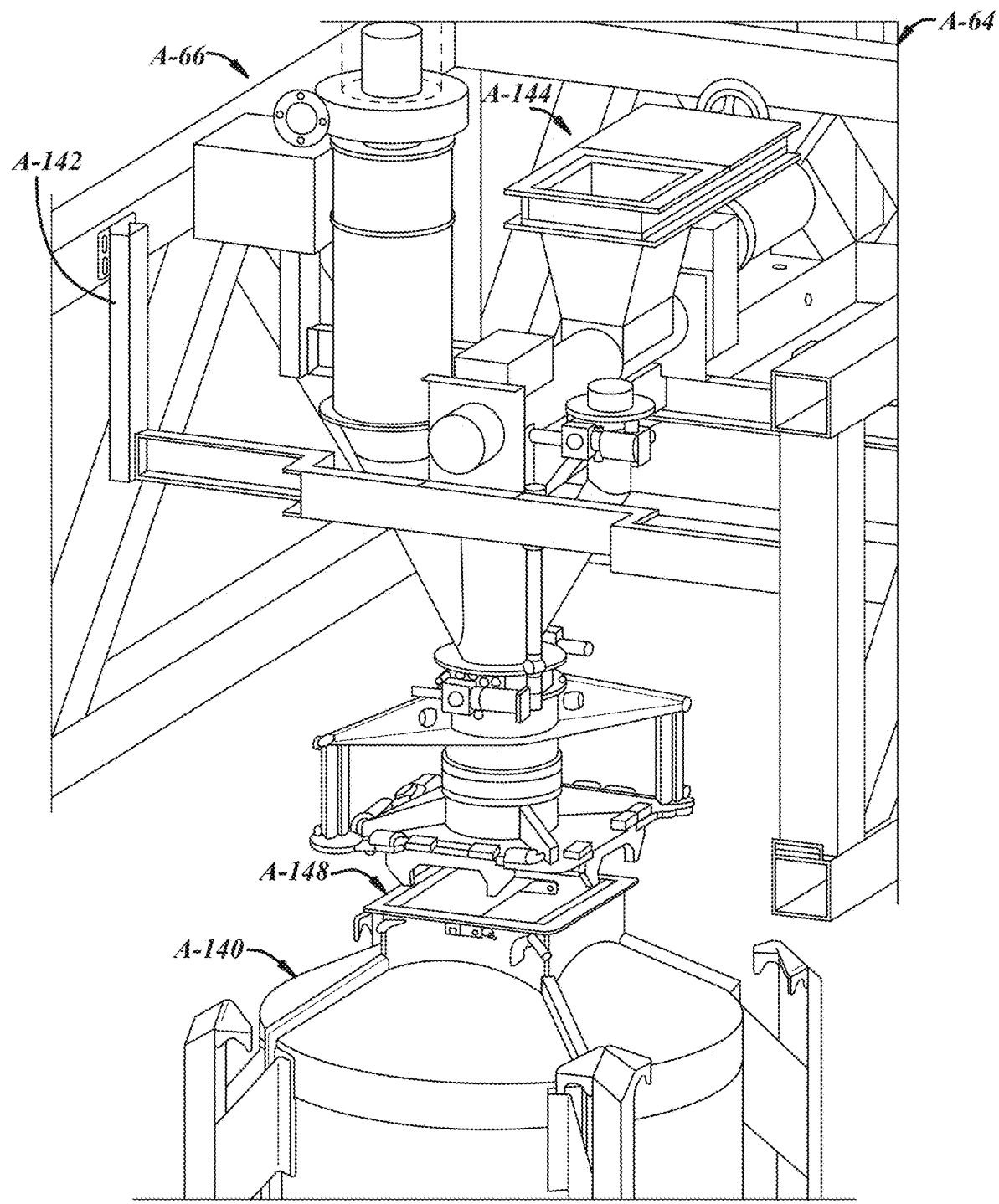
FIG. 20 is a fragmentary perspective view of a dosing portion of the majors silo array shown in FIG. 11 and also illustrating a transport bin and cradle for the bin.
Figure 21:
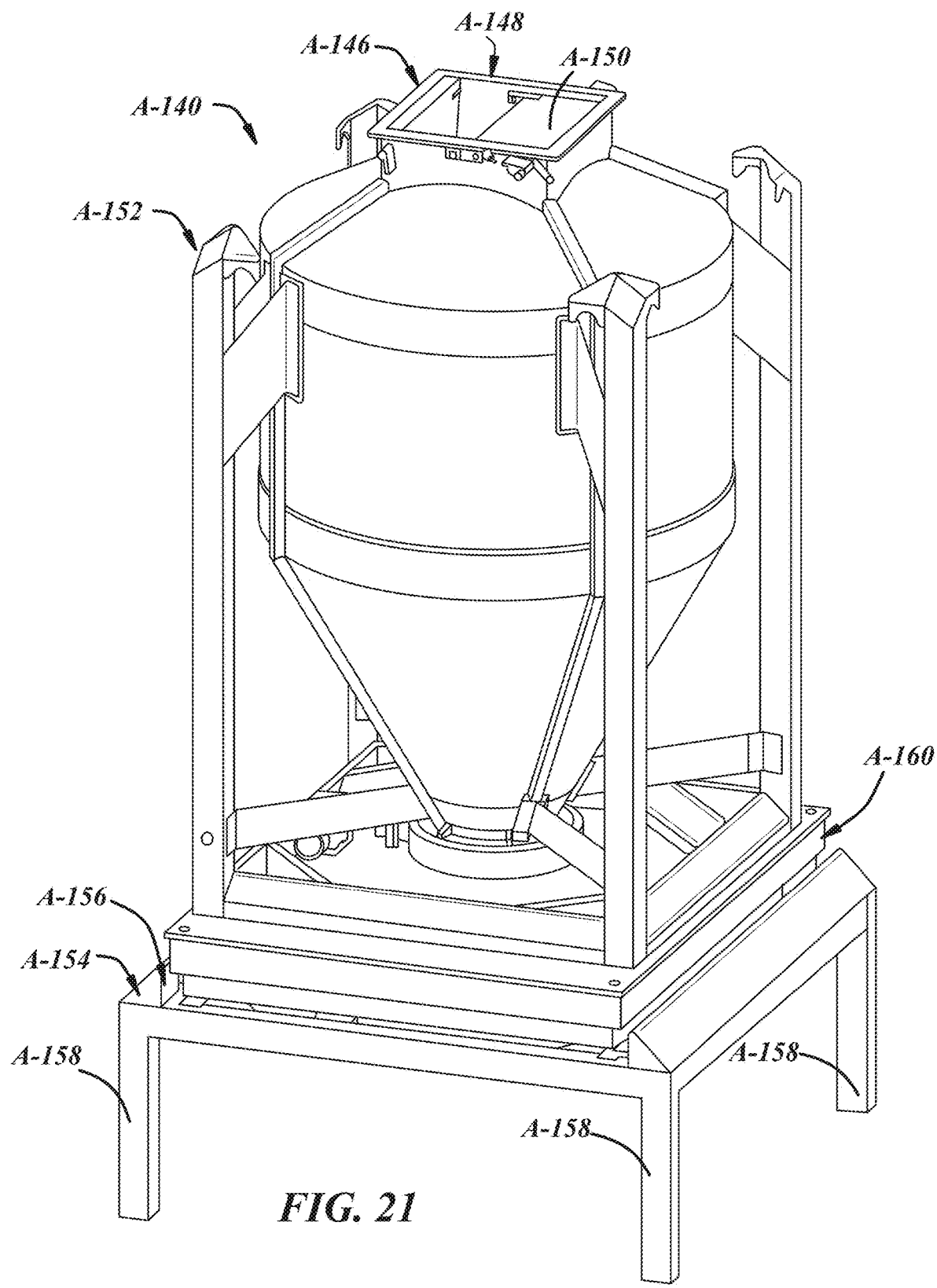
FIG. 21 is a perspective view of the transport bin of FIG. 11 and also illustrating a table supporting the cradle and transport bin and a scale therebetween.
Figure 22:
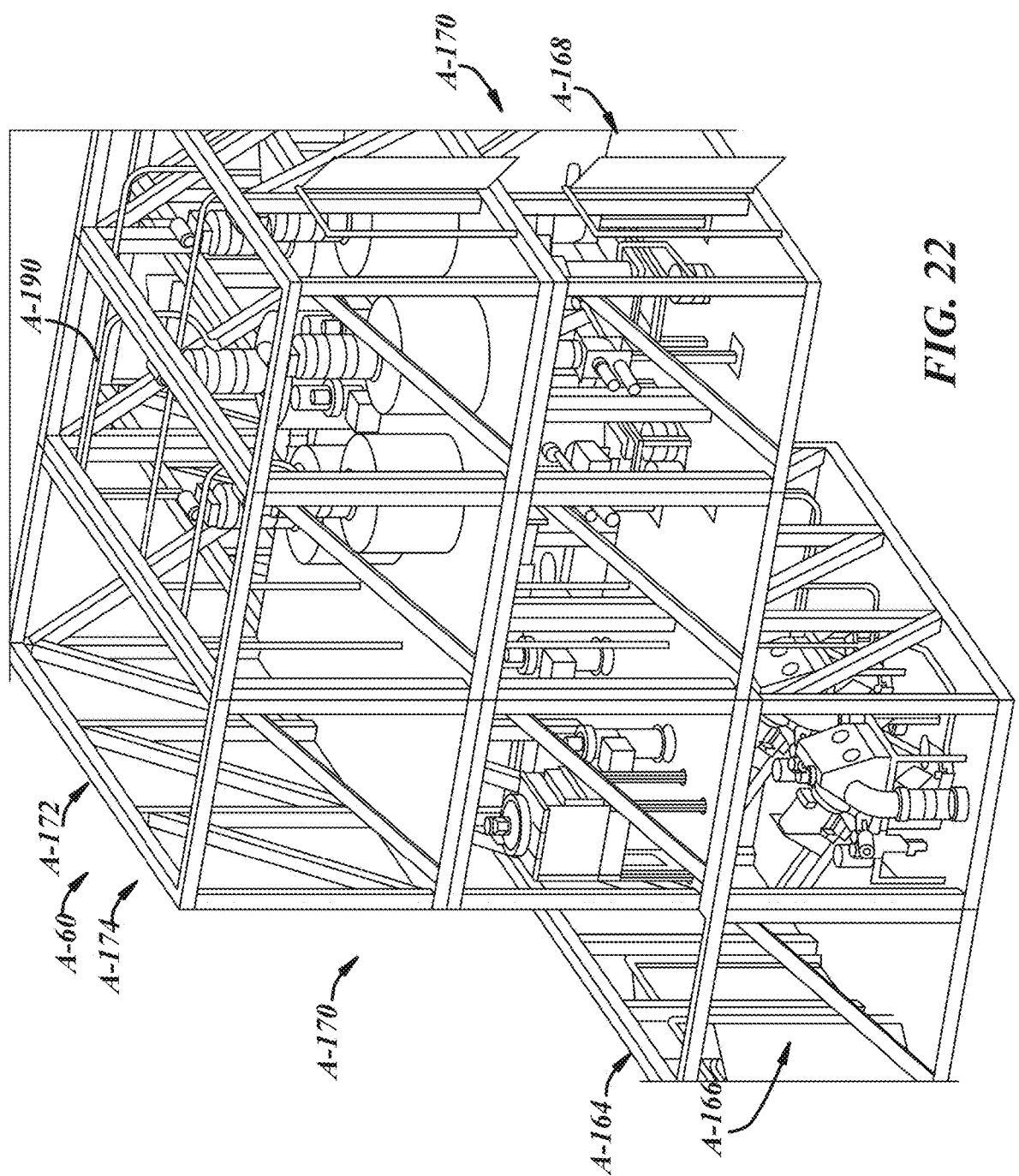
FIG. 22 is a fragmentary perspective view of a portion of a minors section of the feedstock subsystem of FIG. 11 and illustrating a minors container array in a habitable third level, dosing equipment in a habitable second level, and pneumatic conveying stations in a habitable first level.
Figure 23:
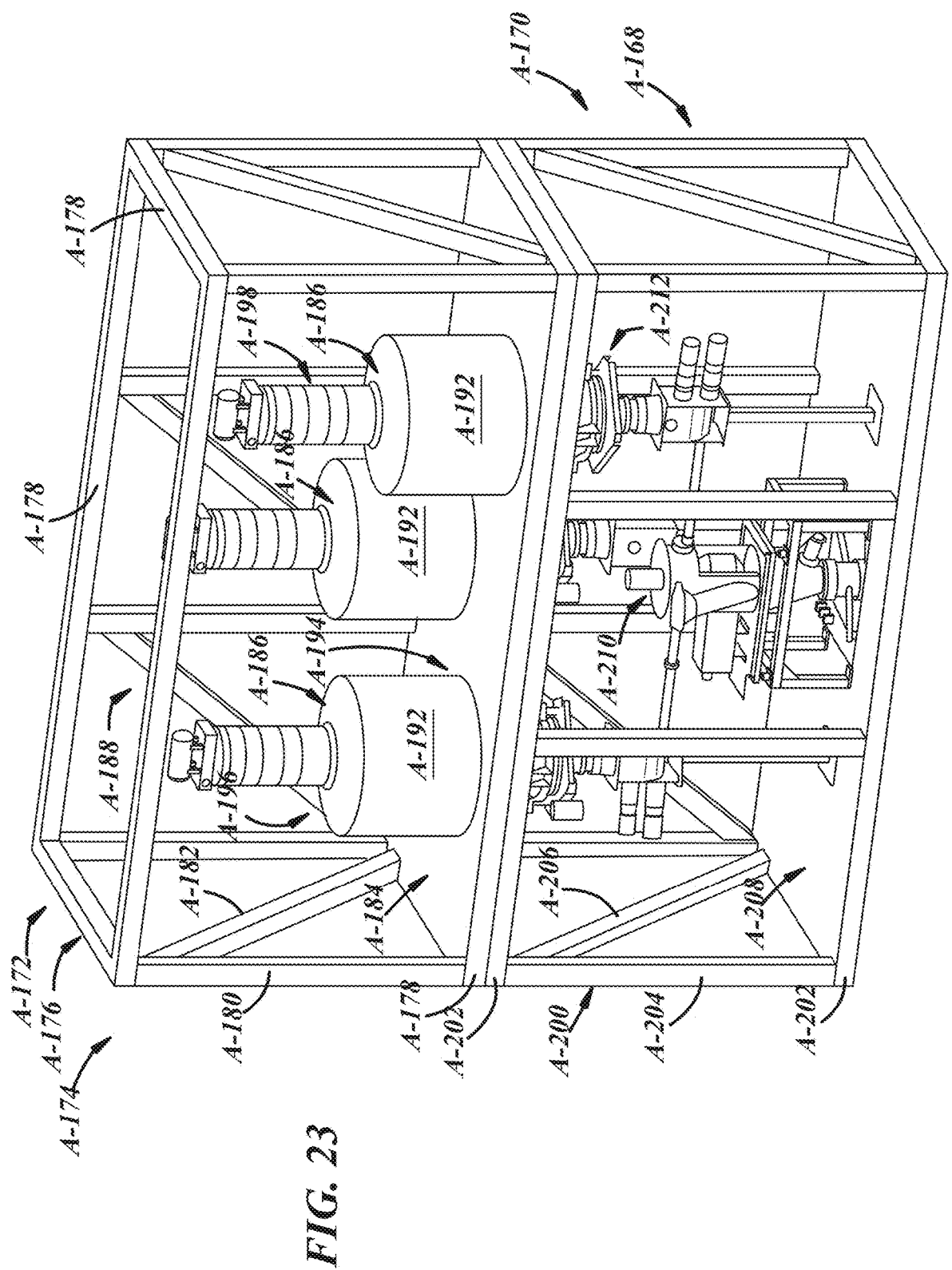
FIG. 23 is a perspective view of a minors container array module of the minors section of the feedstock subsystem of FIG. 11 stacked on top of a minors dosing module of the minors section of the feedstock subsystem of FIG. 11.
Figure 24:
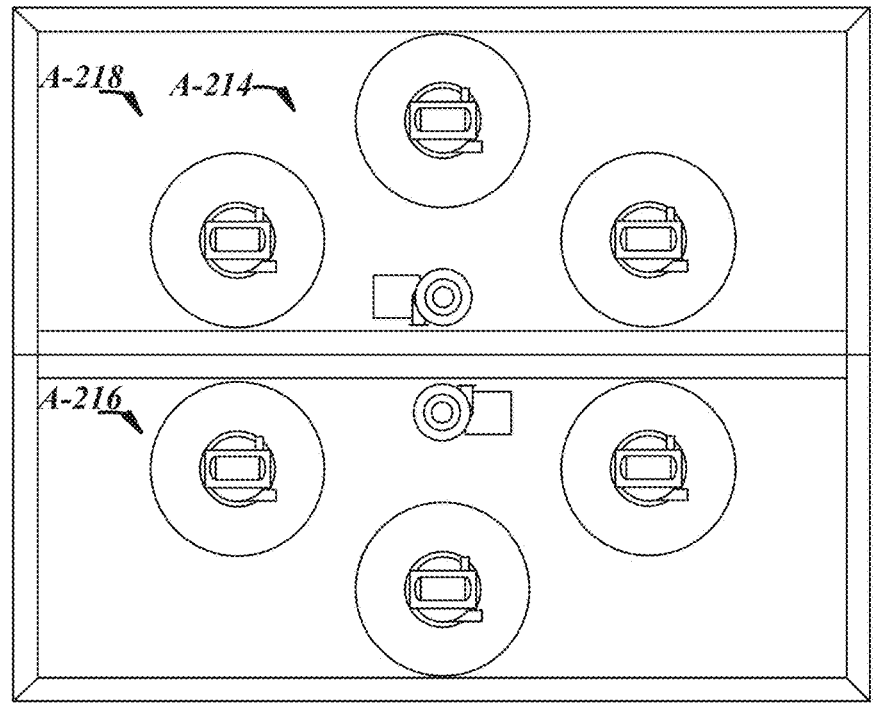
FIG. 24 is a top view of two minors container array modules of the minors section of the feedstock subsystem of FIG. 11 and arranged side by side to establish a complete minors array.
Figure 25:
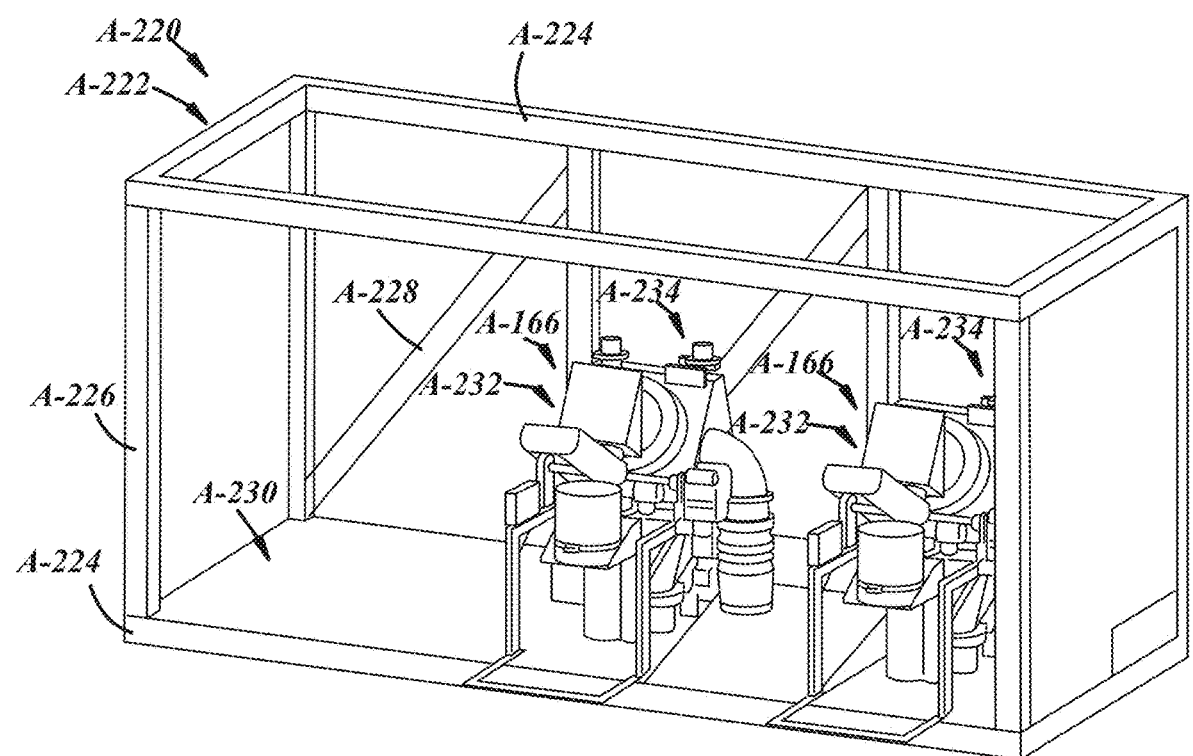
FIG. 25 is a perspective view of a small bag pneumatic conveying station module of the minors section of the feedstock subsystem of FIG. 11.
Figure 26:
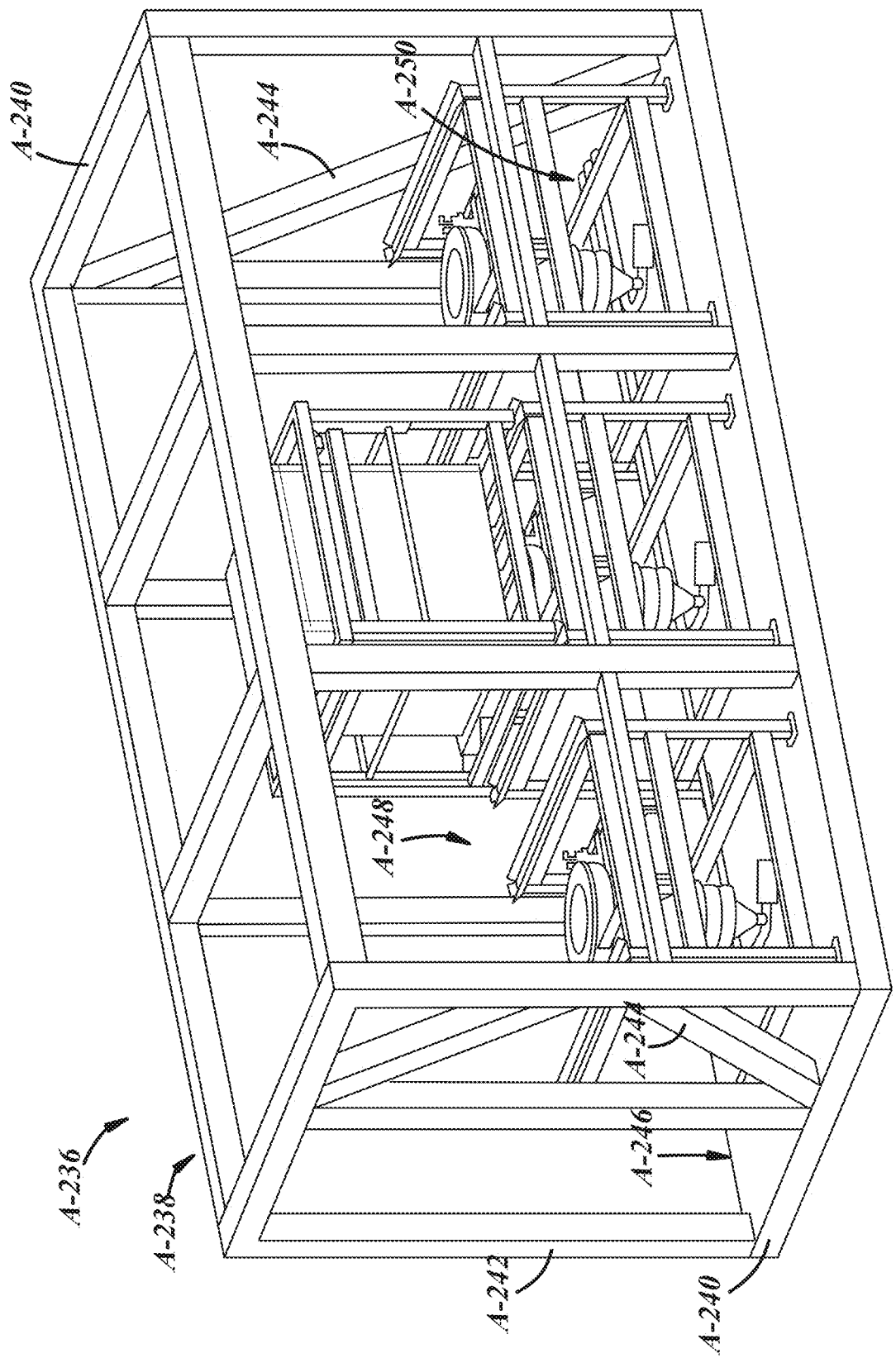
FIG. 26 is a perspective view of a big bag pneumatic conveying station module of the minors section of the feedstock subsystem of FIG. 11.
Figure 27:
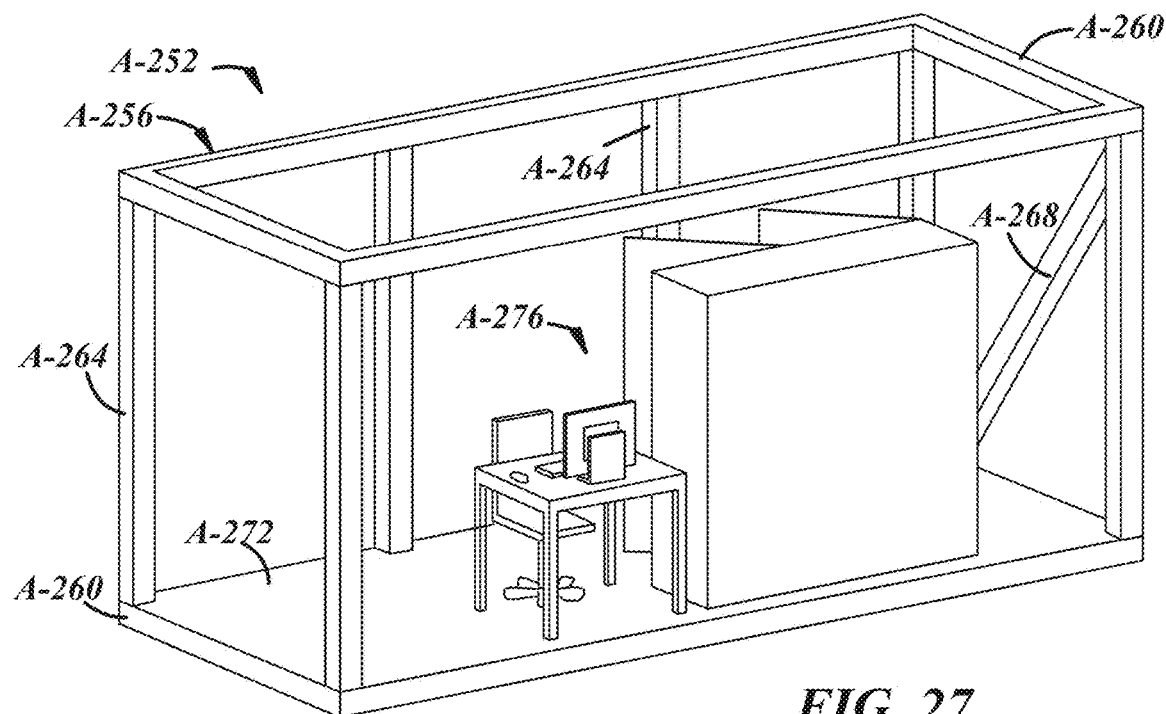
FIGS. 27 and 28 are perspective views of control equipment modules of the feedstock subsystem of FIG. 11.
Figure 28:
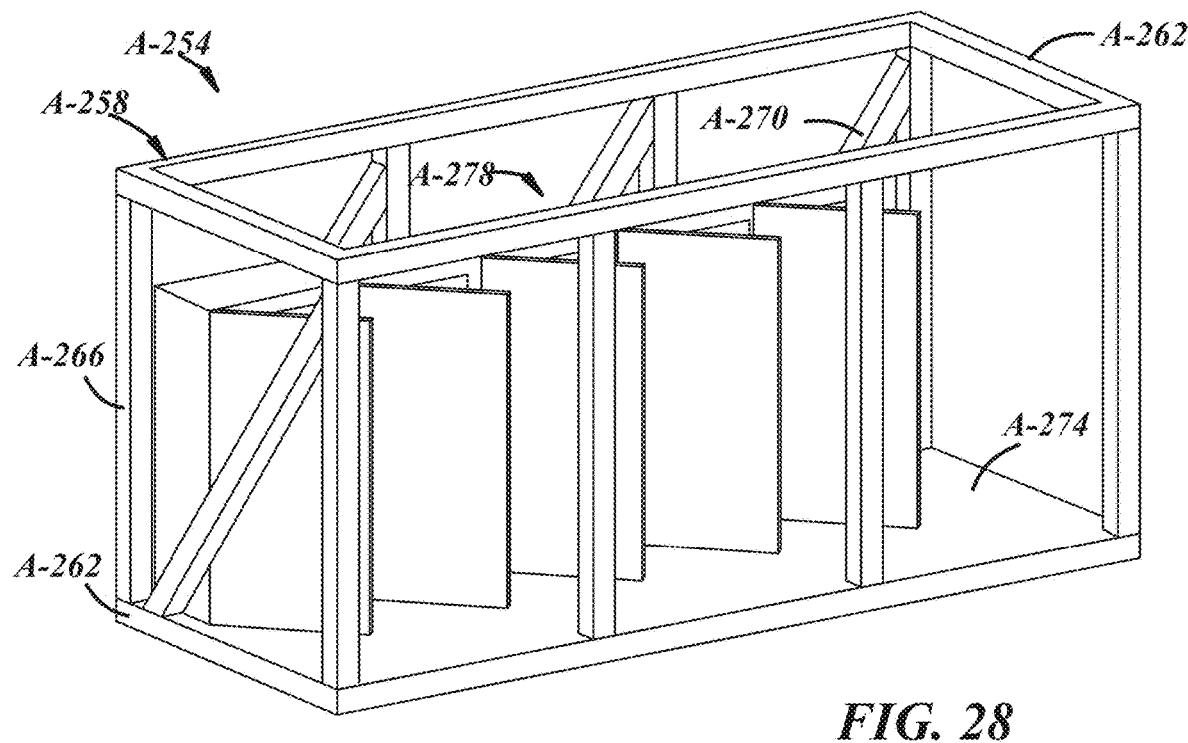
Figure 29:
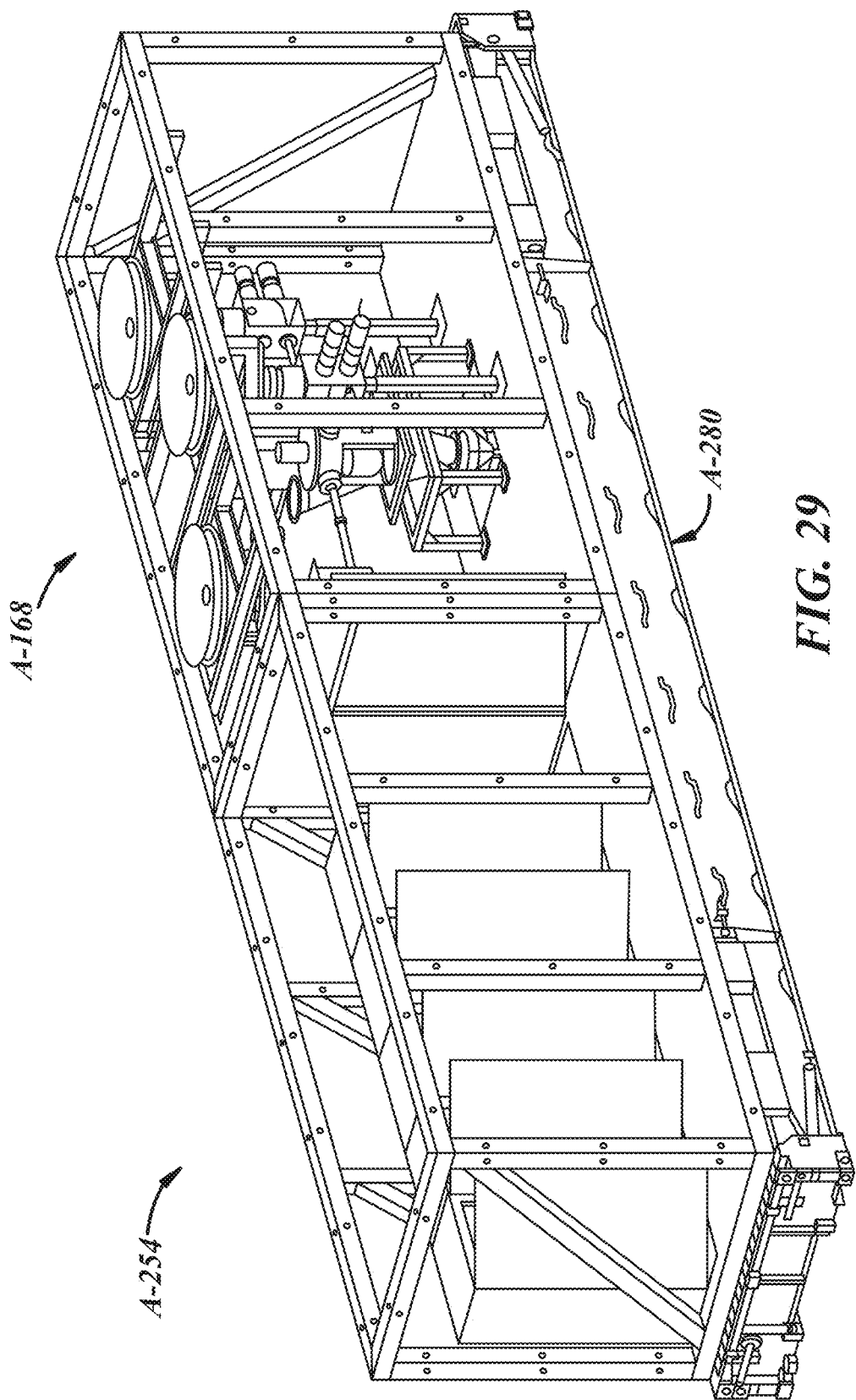
FIG. 29 is a perspective view of a control equipment module of the feedstock subsystem of FIG. 11 and a dosing equipment module of the feedstock subsystem of FIG. 11 carried on a single pallet.
Figure 30:
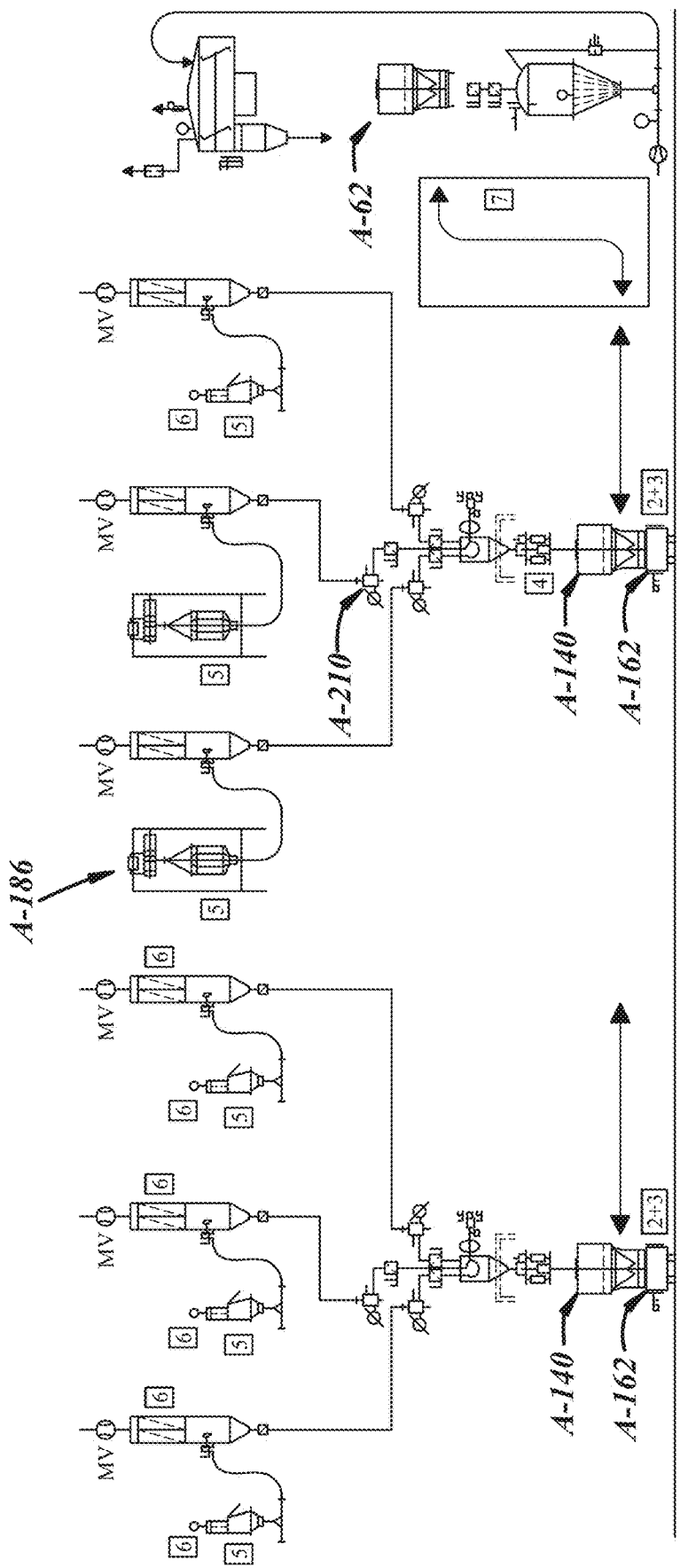
FIG. 30 is a fragmentary schematic view of a minors section of the feedstock subsystem of FIG. 11.
Figure 31:
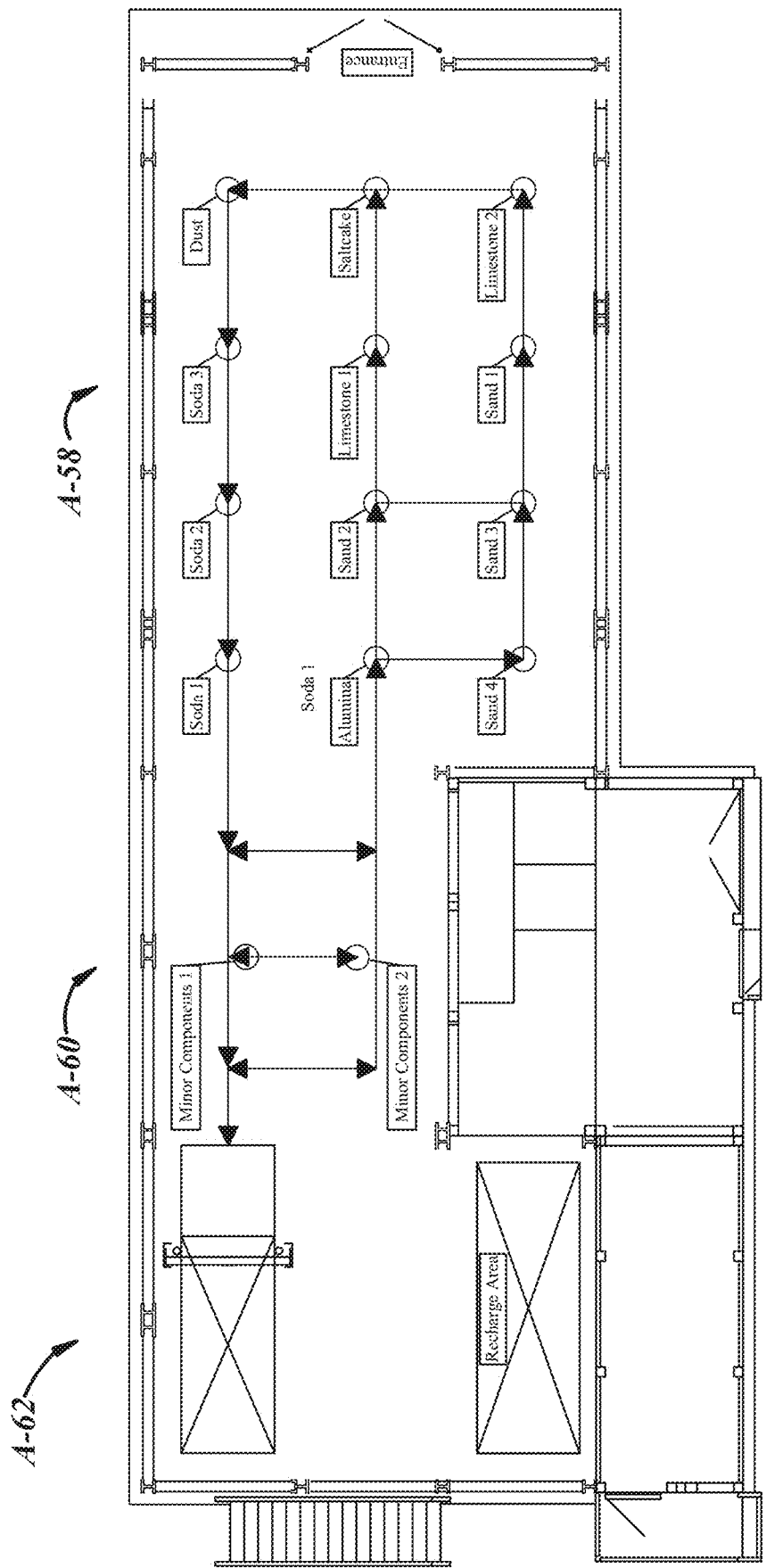
FIG. 31 shows an example flow path of an AGV and transport bin.
Figure 32:
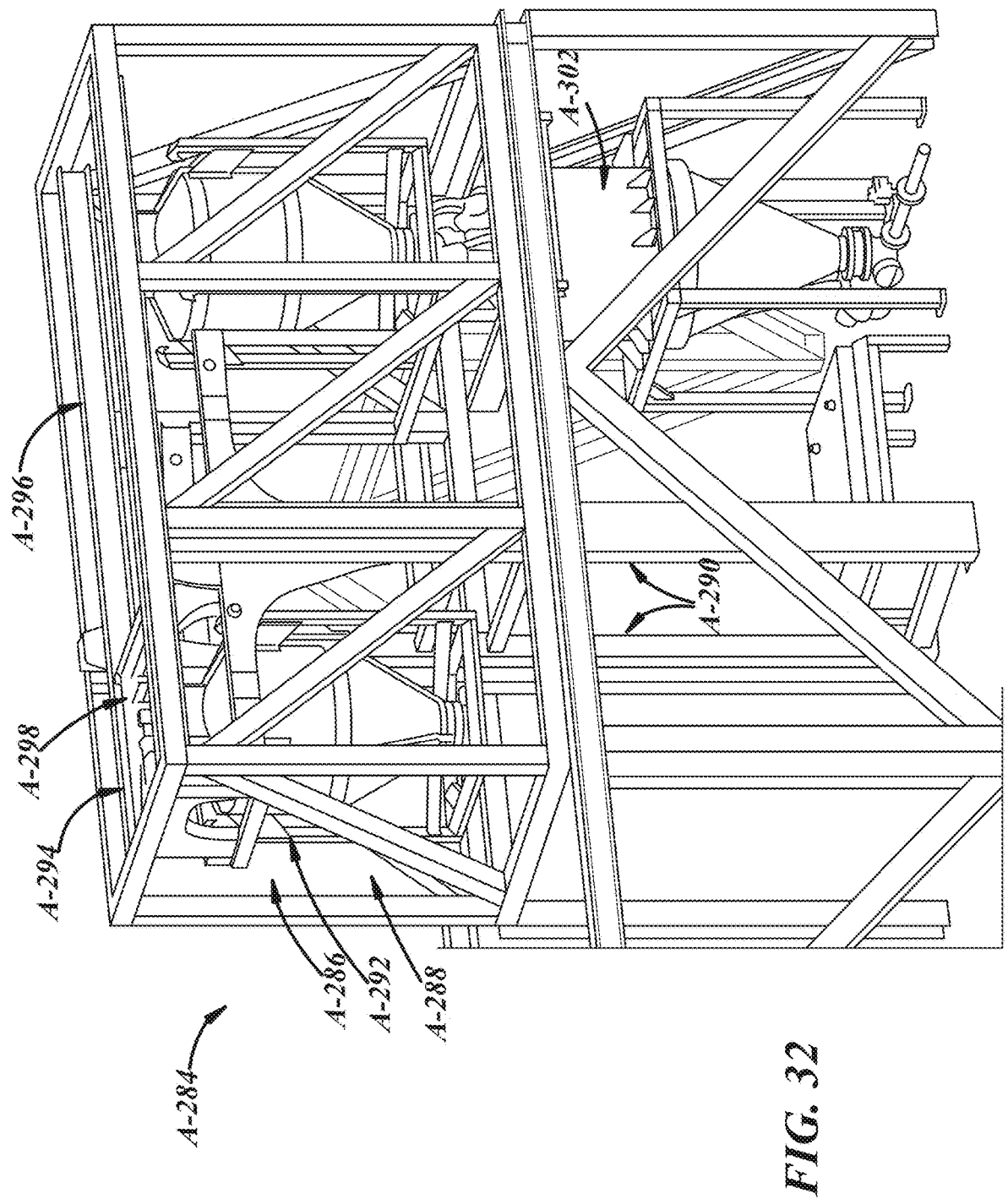
FIG. 32 shows a transmission section of the system.
Figure 33:
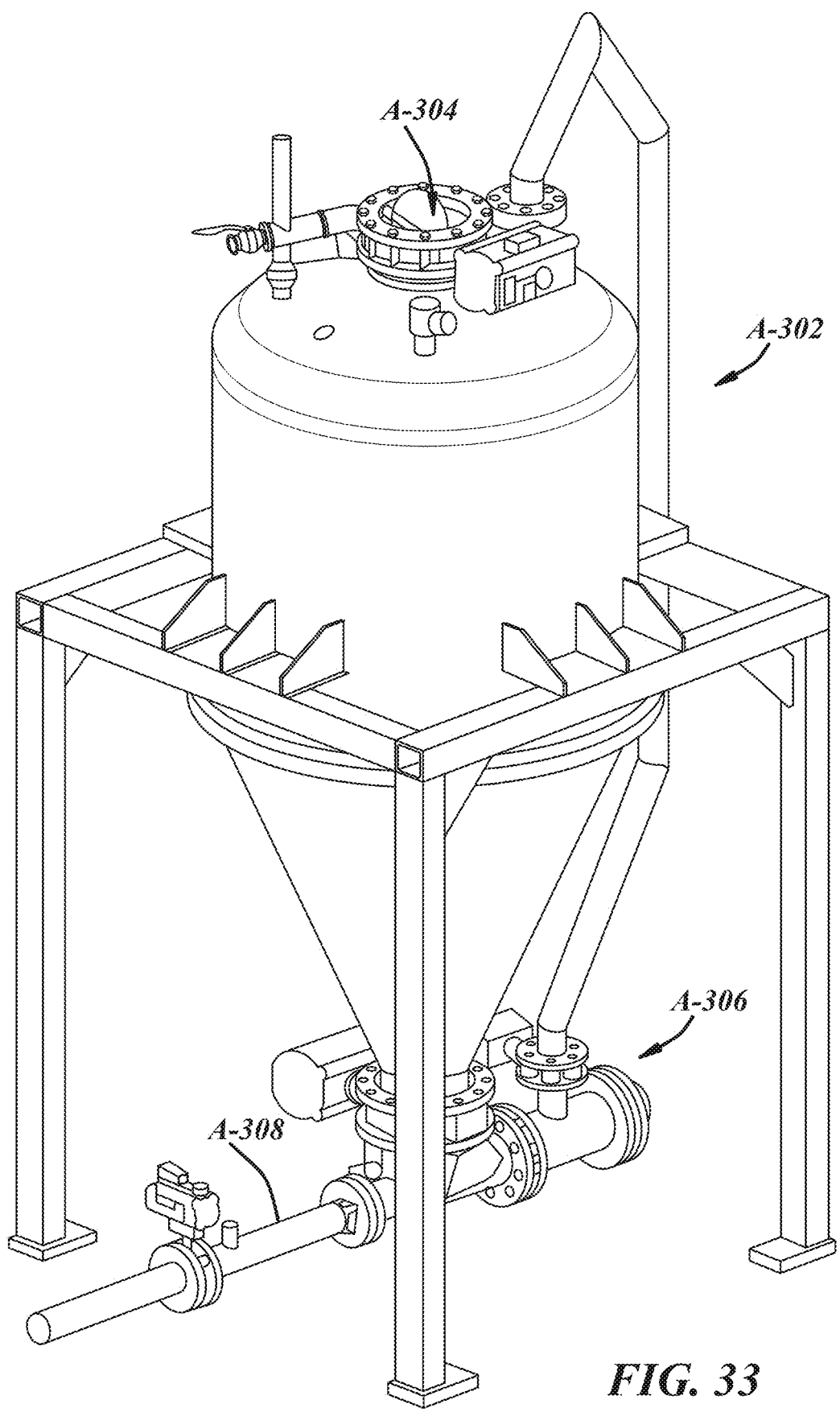
FIG. 33 shows a pneumatic hopper of the transmission section.

Column 9, Line 10: replace "...FIGS. A-1 through A-23." with "...FIGS. 11 through 33."
Column 20, Line 23: replace "...FIGS. A-1 and A-2..." with "...FIGS. 11 and 12..."
Column 20, Lines 37-38: replace "...FIGS. A-1 and A-2..." with "...FIGS. 11 and 12..."
Column 21, Line 4: replace "...FIG. A-1..." with "...FIG. 11..."
Column 21, Line 18: replace "...FIG. A-2..." with "...FIG. 12..."
Column 21, Line 22: replace "...FIG. A-3..." with "...FIG. 13..."
Column 21, Line 47: replace "...FIGS. A-3 and A-4..." with "...FIGS. 13 and 14..."
Column 22, Line 3: replace "...FIGS. A-5 through A-8..." with "...FIGS. 15 through 18..."
Column 22, Line 27: replace "...FIG. A-8..." with "...FIG. 18..."
Column 22, Line 32: replace "...FIG. A-9..." with "...FIG. 19..."
Column 22, Line 56: replace "...FIG. A-10..." with "...FIG. 20..."
Column 23, Line 4: replace "...FIG. A-11..." with "...FIG. 21..."
Column 23, Line 11: replace "...FIG. A-4..." with "...FIG. 14..."
Column 23, Line 26: replace "...FIGS. A-12 and A-13..." with "...FIGS. 22 and 23..."
Column 24, Line 11: replace "...FIG. A-14..." with "...FIG. 24..."
Column 24, Line 14: replace "...FIG. A-15..." with "...FIG. 25..."
Column 24, Line 26: replace "...FIG. A-16..." with "...FIG. 26..."
Column 24, Line 36: replace "...FIG. A-17 and A-18..." with "...FIGS. 27 and 28..."
Column 24, Line 46: replace "...FIG. A-19..." with "...FIG. 29..."
Column 24, Line 50: replace "...FIG. A-20..." with "...FIG. 30..."
Column 24, Line 60: replace "...FIG. A-21..." with "...FIG. 31..."
Column 25, Line 6: replace "...FIGS. A-22 and A-23..." with "...FIGS. 32 and 33..."
Column 25, Line 66: replace "...A-3, A-4, A-13, A-14, and A-19..." with "...13, 14, 23, 24, and 29..."

Signed and Sealed this
Twenty-seventh Day of August, 2024

Katherine Kelly Vidal
*Director of the United States Patent and Trademark Office*